US 11,658,546 B2

(12) United States Patent
Sprague et al.

(10) Patent No.: US 11,658,546 B2
(45) Date of Patent: May 23, 2023

(54) BATTERY-POWERED STAND-ALONE MOTOR UNIT

(71) Applicant: MILWAUKEE ELECTRIC TOOL CORPORATION, Brookfield, WI (US)

(72) Inventors: Connor P. Sprague, Milwaukee, WI (US); Evan M. Glanzer, Milwaukee, WI (US); John E. Koller, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 293 days.

(21) Appl. No.: 17/092,917

(22) Filed: Nov. 9, 2020

(65) Prior Publication Data

US 2021/0143710 A1 May 13, 2021

Related U.S. Application Data

(60) Provisional application No. 62/952,566, filed on Dec. 23, 2019, provisional application No. 62/932,703, filed on Nov. 8, 2019.

(51) Int. Cl.
*H02K 11/00* (2016.01)
*H02K 7/116* (2006.01)
(Continued)

(52) U.S. Cl.
CPC ...... *H02K 11/0094* (2013.01); *H01M 50/209* (2021.01); *H02K 7/116* (2013.01);
(Continued)

(58) Field of Classification Search
CPC .... H02K 11/0094; H02K 7/116; H02K 11/33; H02K 21/16; H01M 50/209;
(Continued)

(56) References Cited

U.S. PATENT DOCUMENTS 2,386,508 A  10/1945 Ripley
2,478,829 A  8/1949 Lechtenberg
(Continued)

FOREIGN PATENT DOCUMENTS

CN  201937372 U  8/2011
CN  208714950 U  4/2019
(Continued)

OTHER PUBLICATIONS

SAE International, "Surface Vehicle Recommended Practice," dated May 1958, revised Jul. 2003 (6 pages).
(Continued)

*Primary Examiner* — John K Kim
(74) *Attorney, Agent, or Firm* — Michael Best & Friedrich LLP

(57) ABSTRACT

A stand-alone motor unit includes a base having a first side and a second side adjacent the first side, an electric motor arranged in the base and including an output shaft, a power take-off shaft receiving torque from the motor and protruding from the second side of the base, a battery pack, and a battery module removably coupled to the base. The battery module includes a side wall and a battery receptacle for receiving the battery pack for providing power to the motor when the battery module is coupled to the base. The battery module is configured to be coupled to the base in a first position, in which the side wall of the battery module is parallel with the second side of the base, and in a second position, in which the side wall is perpendicular to the second side of the base.

27 Claims, 44 Drawing Sheets

(51) Int. Cl.
| | |
|---|---|
| *H02K 11/33* | (2016.01) |
| *H02K 21/16* | (2006.01) |
| *H01M 50/209* | (2021.01) |
| *F16F 15/04* | (2006.01) |
| *F16F 15/08* | (2006.01) |
| *E01C 19/40* | (2006.01) |

(52) U.S. Cl.
CPC ............ *H02K 11/33* (2016.01); *H02K 21/16* (2013.01); *E01C 19/402* (2013.01); *F16F 15/04* (2013.01); *F16F 15/08* (2013.01); *H01M 2220/30* (2013.01)

(58) Field of Classification Search
CPC ... H01M 2220/30; E01C 19/402; F16F 15/04; F16F 15/08
USPC .................................................. 310/50, 68 D
See application file for complete search history.

(56) References Cited

U.S. PATENT DOCUMENTS

| | | | |
|---|---|---|---|
| 2,930,322 | A | 3/1960 | Spencer |
| 3,040,590 | A | 6/1962 | Smithburn |
| 3,254,746 | A | 6/1966 | Myers |
| 4,145,864 | A | 3/1979 | Brewster |
| 4,500,226 | A | 2/1985 | Romand-Monnier et al. |
| 4,759,560 | A | 7/1988 | Virgulti |
| 4,810,174 | A | 3/1989 | Stuckey et al. |
| 4,848,961 | A | 7/1989 | Rouillard |
| 4,861,188 | A | 8/1989 | Rouillard |
| 5,111,127 | A | 5/1992 | Johnson |
| 5,423,102 | A * | 6/1995 | Madison ................ A47K 11/10 |
| | | | 15/28 |
| D375,963 | S | 11/1996 | Braun et al. |
| 5,583,416 | A | 12/1996 | Klang |
| 5,658,087 | A | 8/1997 | Butkovich et al. |
| 5,725,304 | A | 3/1998 | Inai |
| 5,765,671 | A | 6/1998 | Endo et al. |
| 5,782,717 | A | 7/1998 | Smothers et al. |
| 5,787,693 | A | 8/1998 | Dyke |
| 5,819,513 | A | 10/1998 | Braun et al. |
| 5,894,715 | A | 4/1999 | Braun et al. |
| 6,139,217 | A | 10/2000 | Reuter |
| 6,263,979 | B1 | 7/2001 | Dyke et al. |
| 6,296,467 | B1 | 10/2001 | Rouillard |
| 6,534,958 | B1 | 3/2003 | Graber et al. |
| 6,543,926 | B2 | 4/2003 | Sherez |
| 6,606,845 | B1 | 8/2003 | Spies |
| 6,707,203 | B2 | 3/2004 | Wickham |
| 6,751,109 | B2 | 6/2004 | Doss et al. |
| 6,922,981 | B1 | 8/2005 | Tyree |
| 6,928,353 | B2 | 8/2005 | Finley et al. |
| 6,963,153 | B1 | 11/2005 | Su |
| 7,021,599 | B2 | 4/2006 | Degrazia et al. |
| 7,097,384 | B2 | 8/2006 | Lindley |
| 7,153,058 | B2 | 12/2006 | Lindley |
| 7,526,833 | B2 | 5/2009 | Cochran et al. |
| 7,539,570 | B2 | 5/2009 | Normann |
| 7,549,822 | B2 | 6/2009 | Rouillard |
| 7,572,082 | B2 | 8/2009 | Rouillard |
| 7,621,194 | B1 | 11/2009 | Tyree |
| 7,653,963 | B2 | 2/2010 | Cochran et al. |
| 7,659,696 | B2 | 2/2010 | Zeiler et al. |
| 7,677,017 | B2 | 3/2010 | Holby |
| 7,738,979 | B2 | 6/2010 | Schmuck et al. |
| 7,832,513 | B2 | 11/2010 | Verbrugge et al. |
| 7,856,714 | B2 | 12/2010 | Hyde et al. |
| 8,303,266 | B2 | 11/2012 | Rush et al. |
| 8,365,350 | B2 | 2/2013 | Cochran et al. |
| 8,541,913 | B2 * | 9/2013 | Yoshida .................. B25F 5/02 |
| | | | 310/68 D |
| 8,575,800 | B1 | 11/2013 | Fox et al. |
| 8,601,685 | B2 | 12/2013 | Hyde et al. |
| 8,757,925 | B2 | 6/2014 | Banchio |
| 8,910,459 | B2 | 12/2014 | Abe et al. |
| 9,030,040 | B2 | 5/2015 | Tarasinki et al. |
| 9,063,530 | B2 | 6/2015 | Lougheed et al. |
| 9,139,966 | B1 | 9/2015 | Mikowychok |
| 9,233,461 | B2 * | 1/2016 | Tomayko .................. B25F 5/00 |
| 9,397,531 | B2 | 7/2016 | Mikowychok |
| 9,510,504 | B2 | 12/2016 | Morita et al. |
| 9,991,825 | B1 | 6/2018 | Ackerman et al. |
| 2002/0079853 | A1 | 6/2002 | Schmitz et al. |
| 2003/0144774 | A1 | 7/2003 | Trissei et al. |
| 2003/0209645 | A1 | 11/2003 | Degrazia et al. |
| 2004/0035625 | A1 | 2/2004 | Talbot et al. |
| 2005/0156564 | A1 | 7/2005 | Krieger |
| 2006/0048601 | A1 | 3/2006 | Chiao |
| 2006/0288680 | A1 | 12/2006 | Holby |
| 2007/0120366 | A1 | 5/2007 | Grant et al. |
| 2007/0130899 | A1 | 6/2007 | Osborne |
| 2008/0012521 | A1 | 1/2008 | Katsumata et al. |
| 2008/0038073 | A1 | 2/2008 | Paolicelli |
| 2008/0120955 | A1 | 5/2008 | Lucal et al. |
| 2008/0141542 | A1 | 6/2008 | Hung |
| 2008/0143201 | A1 | 6/2008 | Gannon et al. |
| 2008/0250570 | A1 | 10/2008 | Dayton et al. |
| 2008/0253221 | A1 | 10/2008 | Lindley |
| 2009/0028653 | A1 | 1/2009 | Wilbert et al. |
| 2009/0283343 | A1 | 11/2009 | Wurth |
| 2010/0025131 | A1 | 2/2010 | Gloceri et al. |
| 2010/0058726 | A1 | 3/2010 | Notaras et al. |
| 2010/0253162 | A1 * | 10/2010 | Sakamaki ............... B25D 16/00 |
| | | | 310/50 |
| 2010/0326481 | A1 | 12/2010 | Buckner |
| 2011/0094129 | A1 | 4/2011 | Rowe et al. |
| 2011/0115436 | A1 | 5/2011 | Zhang et al. |
| 2012/0007457 | A1 | 1/2012 | Andersson et al. |
| 2012/0227994 | A1 | 9/2012 | Yang et al. |
| 2012/0256568 | A1 | 10/2012 | Lee |
| 2012/0318600 | A1 | 12/2012 | Hakamata et al. |
| 2013/0036727 | A1 | 2/2013 | Heichel et al. |
| 2013/0040777 | A1 | 2/2013 | Gassmann et al. |
| 2013/0180495 | A1 | 7/2013 | Veerathappa et al. |
| 2014/0095002 | A1 | 3/2014 | Crecelius et al. |
| 2014/0241105 | A1 | 8/2014 | Jin |
| 2015/0003135 | A1 | 1/2015 | Chen et al. |
| 2015/0017632 | A1 | 1/2015 | Matsuzaki et al. |
| 2015/0061413 | A1 | 3/2015 | Janarthanam et al. |
| 2015/0084606 | A1 | 3/2015 | Nakamura et al. |
| 2015/0165602 | A1 | 6/2015 | Seith et al. |
| 2015/0171632 | A1 | 6/2015 | Fry et al. |
| 2015/0207431 | A1 | 7/2015 | Brotto et al. |
| 2015/0231975 | A1 | 8/2015 | Ishii et al. |
| 2015/0314692 | A1 | 11/2015 | Inoue |
| 2015/0316913 | A1 | 11/2015 | Rickey et al. |
| 2016/0007525 | A1 | 1/2016 | Drew et al. |
| 2016/0020443 | A1 | 1/2016 | White et al. |
| 2016/0061227 | A1 | 3/2016 | Spohr |
| 2016/0242356 | A1 | 8/2016 | Velderman et al. |
| 2016/0380510 | A1 * | 12/2016 | Niwa ..................... H02K 3/522 |
| | | | 310/50 |
| 2017/0015455 | A1 | 1/2017 | Baskin et al. |
| 2017/0120435 | A1 | 5/2017 | Palich et al. |
| 2017/0136864 | A1 | 5/2017 | Ito et al. |
| 2017/0271939 | A1 | 9/2017 | Kaneko et al. |
| 2017/0271941 | A1 | 9/2017 | Kaneko et al. |
| 2017/0306575 | A1 | 10/2017 | Utterodt et al. |
| 2018/0138839 | A1 | 5/2018 | Puzio et al. |
| 2018/0331597 | A1 | 11/2018 | Schulenberg |
| 2019/0237715 | A1 | 8/2019 | Seman et al. |
| 2019/0238083 | A1 | 8/2019 | White et al. |
| 2019/0290210 | A1 | 9/2019 | Mclaughlin |
| 2021/0143710 | A1 * | 5/2021 | Sprague .................. H02K 7/116 |

FOREIGN PATENT DOCUMENTS

| | | |
|---|---|---|
| DE | 4126311 A1 | 2/1993 |
| DE | 69530892 T2 | 2/2004 |
| EP | 0192469 A2 | 8/1986 |
| EP | 1304026 B1 | 9/2005 |
| EP | 2072192 A1 | 6/2009 |
| EP | 1267001 B1 | 9/2009 |

(56) References Cited

FOREIGN PATENT DOCUMENTS

| | | | |
|---|---|---|---|
| EP | 3322086 | A2 | 5/2018 |
| EP | 3523869 | A1 | 8/2019 |
| JP | 4193683 | B2 | 12/2008 |
| JP | 4337522 | B2 | 9/2009 |
| JP | 2015199175 | A | 11/2015 |
| WO | 91002845 | A1 | 3/1991 |
| WO | 9702415 | A1 | 1/1997 |
| WO | 2008113101 | A1 | 9/2008 |
| WO | 2013043117 | A1 | 3/2013 |
| WO | 2014157463 | A1 | 10/2014 |
| WO | 2016145324 | A1 | 9/2016 |
| WO | 2017220009 | A1 | 12/2017 |
| WO | 2018067506 | A1 | 4/2018 |
| WO | 2018067986 | A1 | 4/2018 |
| WO | 2018081397 | A1 | 5/2018 |
| WO | 2018085411 | A1 | 5/2018 |
| WO | 2018165453 | A1 | 9/2018 |
| WO | 2019058439 | A1 | 3/2019 |

OTHER PUBLICATIONS

International Search Report and Written Opinion for Application No. PCT/US2020/059660 dated Mar. 25, 2021 (15 pages).

\* cited by examiner

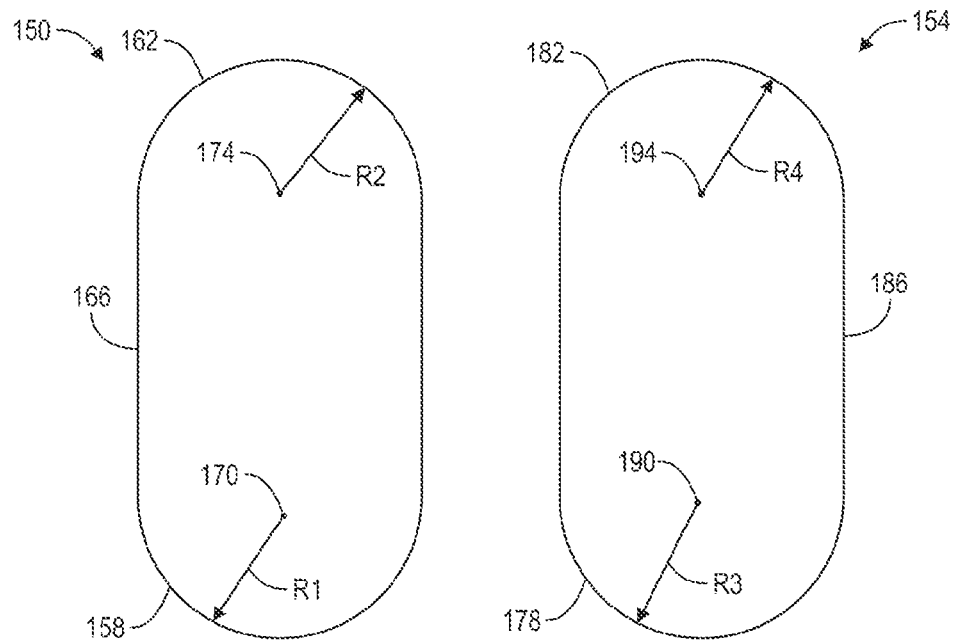
FIG. 17  FIG. 18
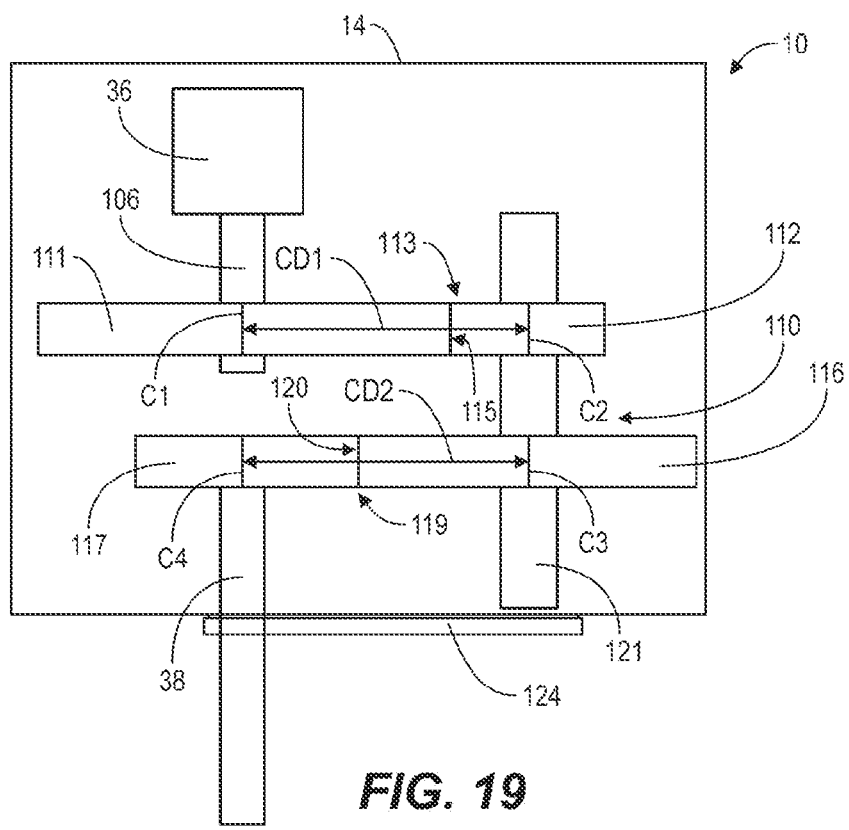
FIG. 19

BATTERY-POWERED STAND-ALONE MOTOR UNIT

CROSS-REFERENCE TO RELATED APPLICATIONS

This application claims priority to U.S. Provisional Patent Application No. 62/932,703 filed on Nov. 8, 2019, and to U.S. Provisional Patent Application No. 62/952,566 filed on Dec. 23, 2019, the entire contents of both of which is incorporated herein by reference.

FIELD OF THE INVENTION

The present invention relates to motor units, and more particularly to motor units for use with power equipment.

BACKGROUND OF THE INVENTION

Small, single or multi-cylinder gasoline engines can be mounted to power equipment to drive the equipment with a power take-off shaft.

SUMMARY OF THE INVENTION

The present invention provides, in one aspect, a stand-alone motor unit for use with a piece of power equipment. The motor unit comprises a base having a first side and a second side adjacent the first side, an electric motor arranged in the base and including an output shaft, a power take-off shaft receiving torque from the motor and protruding from the second side of the base, a battery pack, and a battery module removably coupled to the base. The battery module includes a side wall and a battery receptacle for receiving the battery pack, such that when the battery module is coupled to the base and the battery pack is received in the battery receptacle, the battery pack provides power to the motor. The battery module is configured to be coupled to the base in a first position, in which the side wall of the battery module is parallel with the second side of the base. The battery module is configured to be coupled to the base in a second position, in which the side wall is perpendicular to the second side of the base.

The present invention provides, in another aspect, a stand-alone motor unit for use with a piece of power equipment. The motor unit comprises a base having a first side and a second side adjacent the first side, an electric motor arranged in the base and including an output shaft, and a power take-off shaft receiving torque from the motor and protruding from the second side of the base. The power take-off shaft defines a rotational axis. The stand-alone motor unit further comprises a battery pack and a battery module removably coupled to the base. The battery module defines a battery module axis and includes a battery receptacle for receiving the battery pack, such that when the battery module is coupled to the base and the battery pack is received in the battery receptacle, the battery pack provides power to the motor. The battery module is configured to be coupled to the base in a first position, in which the battery module axis is non-parallel to the rotational axis of the power take off shaft. The battery module is configured to be coupled to the base in a second position, in which the battery module axis is parallel with the rotational axis of the power take off shaft.

The present invention provides, in yet another aspect, a stand-alone motor unit for use with a piece of power equipment. The motor unit comprises a housing and an electric motor including a stator and a rotor rotatable relative to the stator, the rotor including an output shaft. The electric motor also includes a housing in which the stator and rotor are arranged and an adapter plate coupled to the housing. The adapter plate includes a first plurality of holes defining a first hole pattern. The output shaft of the rotor protrudes from the adapter plate. The motor unit further comprises a battery pack for providing power to the motor, a power take-off shaft protruding from the housing, and a gearbox including a second plurality of holes defining a second hole pattern that is identical to the first hole pattern, such that when the first hole pattern is aligned with the second hole pattern, the gearbox is configured to be coupled to the adapter plate. The gearbox also includes a gear train for transferring torque from the output shaft of the rotor to the power take-off shaft when the gearbox is coupled to the adapter plate.

The present invention provides, in yet another aspect, a stand-alone motor unit for use with a piece of power equipment. The motor unit comprises a housing and an electric motor in the housing. The electric motor includes a stator and a rotor rotatable relative to the stator, the rotor including an output shaft. The electric motor also includes a housing in which the stator and rotor are arranged and an adapter plate coupled to the housing. The adapter plate includes a first plurality of holes defining a first hole pattern that matches an matches an identical, second hole pattern defined in the piece of power equipment. The output shaft of the rotor protrudes from the adapter plate. The motor unit further comprises a battery pack for providing power to the motor. When the first hole pattern is aligned with the second hole pattern, the adapter plate is configured to be coupled to the piece of power equipment, such that the output shaft can drive the piece of power equipment.

The present invention provides, in yet another aspect, a stand-alone motor unit assembly for use with a piece of power equipment. The motor unit assembly comprises a stand-alone motor unit including a housing and an electric motor including a stator and a rotor rotatable relative to the stator and including an output shaft, a housing in which the stator and rotor are arranged, and an adapter plate coupled to the housing. The adapter plate includes a first plurality of holes defining a first hole pattern. The output shaft of the rotor protrudes from the adapter plate. The motor unit also includes a battery pack for providing power to the motor and a power take-off shaft protruding from the housing. The motor unit assembly further comprises a first gearbox configured to be removably coupled to the adapter plate. The first gearbox includes a second plurality of holes defining a second hole pattern that is identical to the first hole pattern, such that when the first hole pattern is aligned with the second hole pattern of the first gearbox, the first gearbox is configured to be coupled to the adapter plate. The first gearbox also includes a first gear train for transferring torque from the output shaft of the rotor to the power take-off shaft when the first gearbox is coupled to the adapter plate. The motor unit assembly further comprises a second gearbox configured to be removably coupled to the adapter plate. The second gearbox includes a third plurality of holes also arranged in the second hole pattern, such that when the first hole pattern is aligned with the second hole pattern of the second gearbox, the second gearbox is configured to be coupled to the adapter plate. The second gearbox also includes a second gear train for transferring torque from the output shaft of the rotor to the power take-off shaft when the second gearbox is coupled to the adapter plate. The second gear train is different from the first gear train.

The present invention provides, in yet another aspect, a stand-alone motor unit for use with a piece of power equipment. The motor unit comprises a housing, an electric motor arranged in the housing, a battery pack to provide power to the electric motor, and a first plurality of holes in a side of the housing, the first plurality of holes defining a first hole pattern. The motor unit further comprises a first power take-off shaft extending from the side of the housing, a gearbox including a first gear train configured to transfer torque from the motor to the first power take-off shaft, and an external gearbox including a second gear train and a second plurality of holes defining a second hole pattern that is identical to the first hole pattern, such that the external gearbox is configured to be coupled to the side of the housing when the first hole pattern is aligned with the second hole pattern. The external gearbox also includes a second power take-off shaft receiving torque from the second gear train, and a third plurality of holes defining a third hole pattern that is identical to a fourth hole pattern on the piece of power equipment, such that the external gearbox is configured to couple to the piece of power equipment when the third hole pattern is aligned with the fourth hole pattern. When the external gearbox is coupled to the side of the housing and the piece of power equipment, the second power take-off shaft is configured to receive torque from the motor via the first gear train, first power take-off shaft, and second gear train.

Other features and aspects of the invention will become apparent by consideration of the following detailed description and accompanying drawings.

BRIEF DESCRIPTION OF THE DRAWINGS

FIG. 17 is an enlarged plan view of a first slot of the stand-alone motor unit of FIG. 1.

FIG. 18 is an enlarged plan view of a second slot of the stand-alone motor unit of FIG. 1.

FIG. 19 is a schematic view of a motor, a gear train, and a power take-off shaft of the stand-alone motor unit of FIG. 1 in a fourth configuration.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
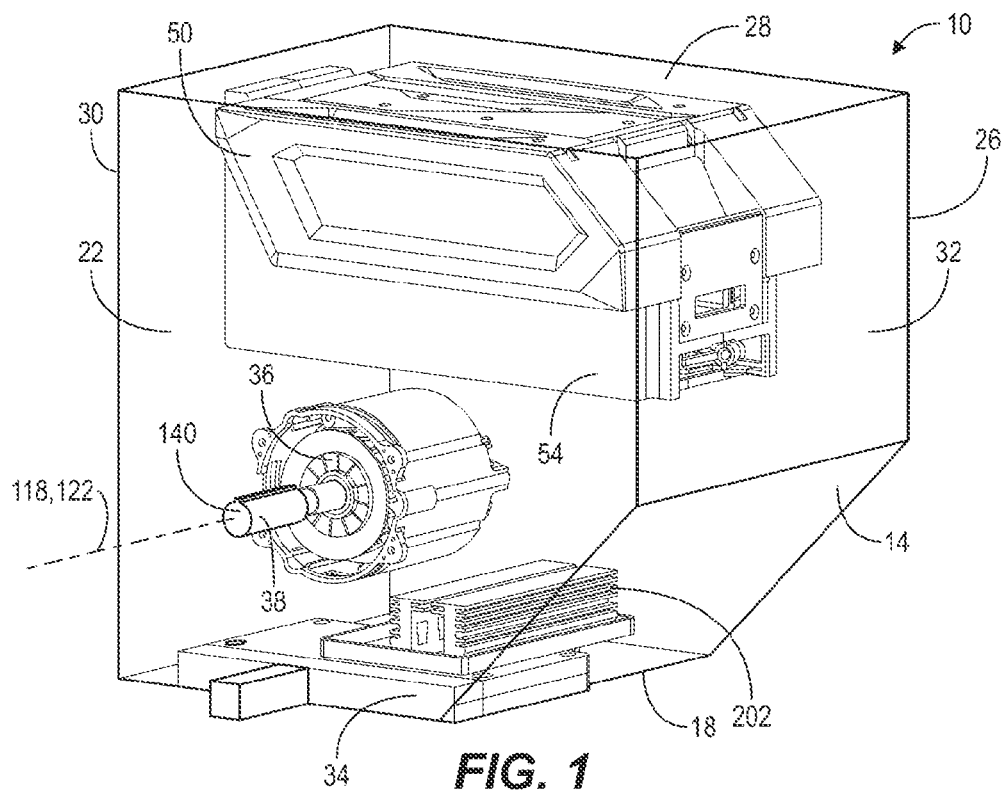
FIG. 1 is a perspective view of a stand-alone motor unit in accordance with an embodiment of the invention.
Figure 2:
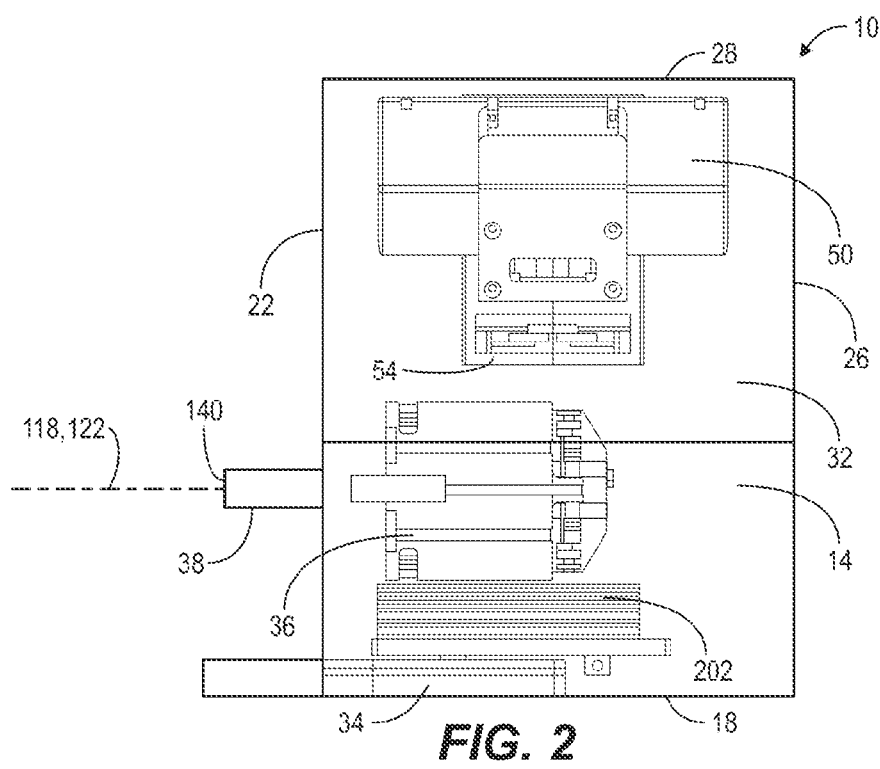
FIG. 2 is a plan view of the stand-alone motor unit of FIG. 1.
Figure 3:
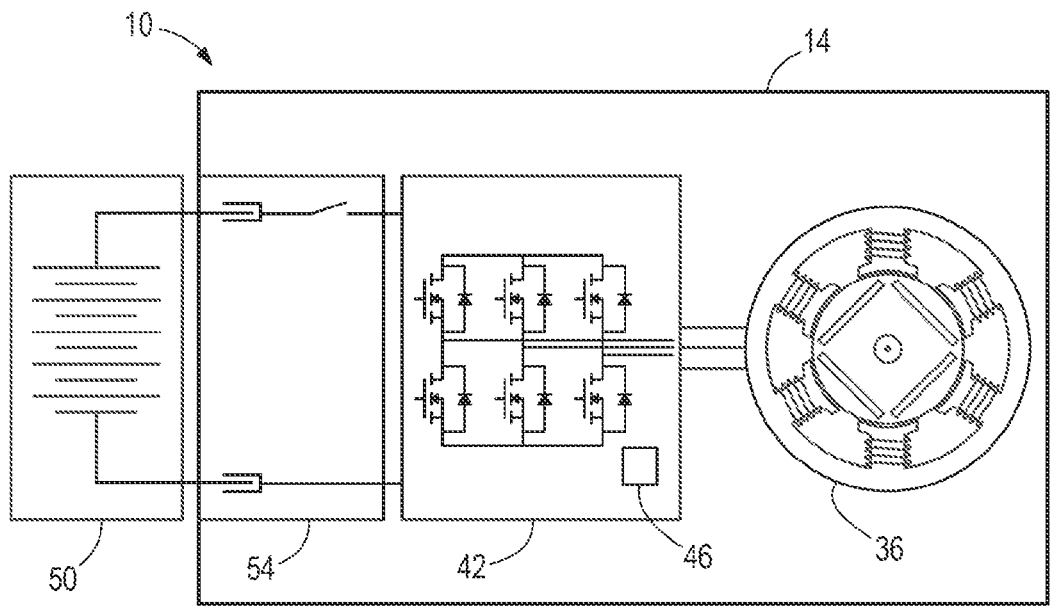
FIG. 3 is a schematic view of the stand-alone motor unit of FIG. 1.
Figure 42:
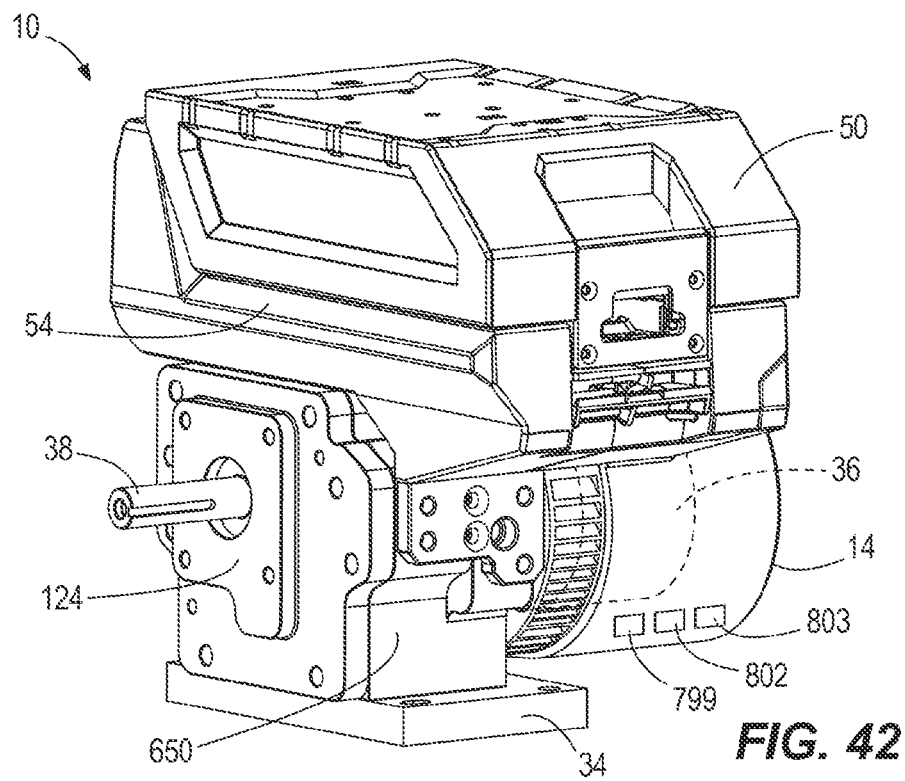
FIG. 42 is a perspective view of a motor unit according to another embodiment of the invention.
Figure 42A:
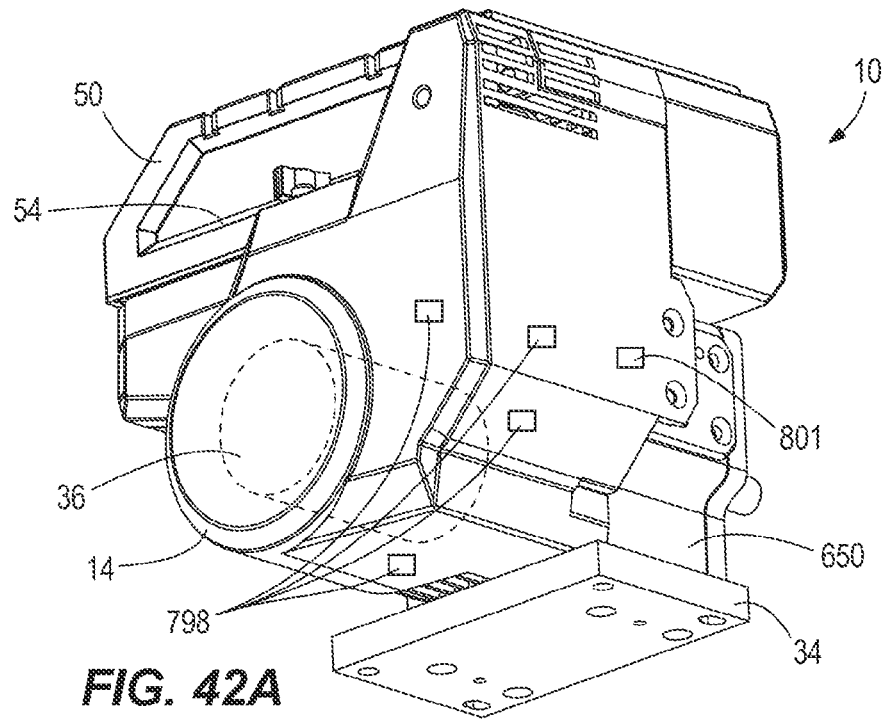
FIG. 42a is another perspective view of the motor unit of FIG. 42

As shown in FIGS. 1, 2, 14 and 15, a stand-alone motor unit 10 for use with a piece of power equipment includes a housing 14 with a first side 18, a second side 22 adjacent the first side 18, a third side 26 opposite the second side 22, a fourth side 28 opposite the first side 18, a fifth side 30 extending between the second and third sides 22, 26, and a sixth side 32 opposite the fifth side 30. The motor unit 10 also includes a flange 34 coupled to the housing 14 on the first side 18, an electric motor 36 located within the housing 14, and a power take-off shaft 38 that protrudes from the second side 22 and receives torque from the motor 36. As explained in further detail below, in some embodiments, the power take-off shaft 38 protrudes from the first side 18 and from the flange 34. As shown in FIGS. 3 and 16, the motor unit 10 also includes control electronics 42 positioned within the housing 14 and including wiring and a controller 46 that is electrically connected to the motor 36. In some embodiments, the control electronics 42 has a volume of up to about 820 mm$^3$. In some embodiments, the control electronics 42 has a weight of up to about 830 g. FIGS. 42 and 42a illustrate another embodiment of the motor unit 10, described in greater detail below.

Figure 4:
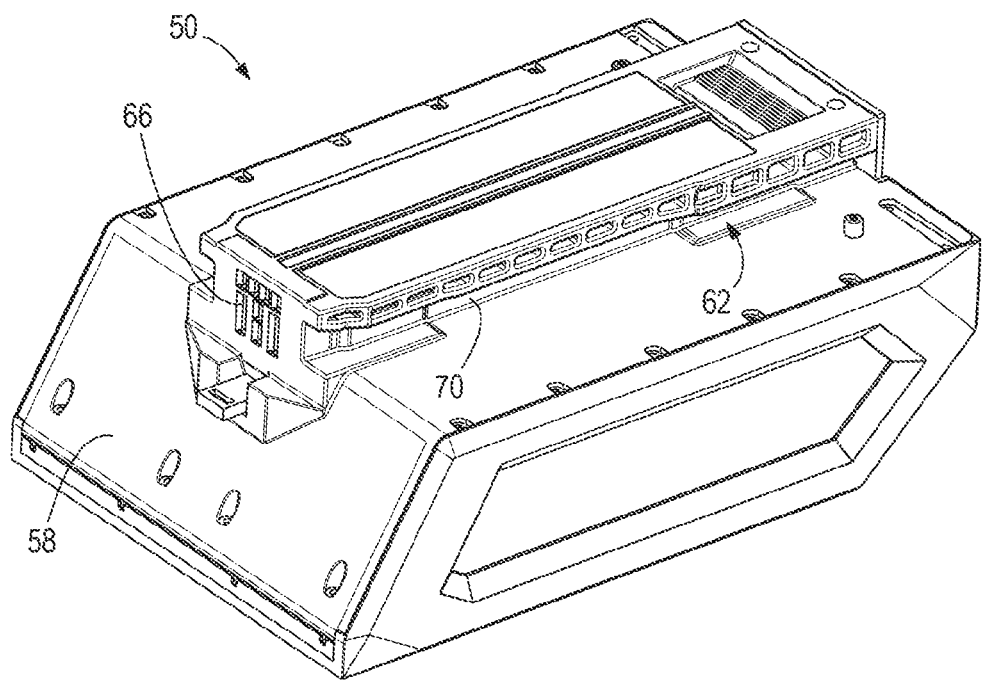
FIG. 4 is a perspective view of a battery pack of the stand-alone motor unit of FIG. 1.
Figure 5:
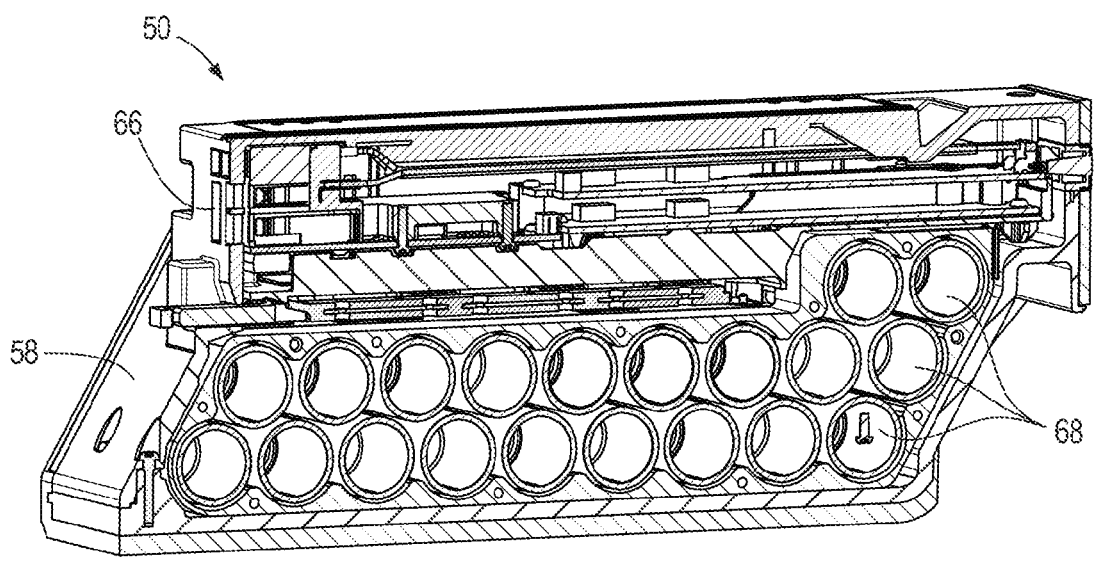
FIG. 5 is a cross-sectional view of the battery pack of FIG. 4.
Figure 6:
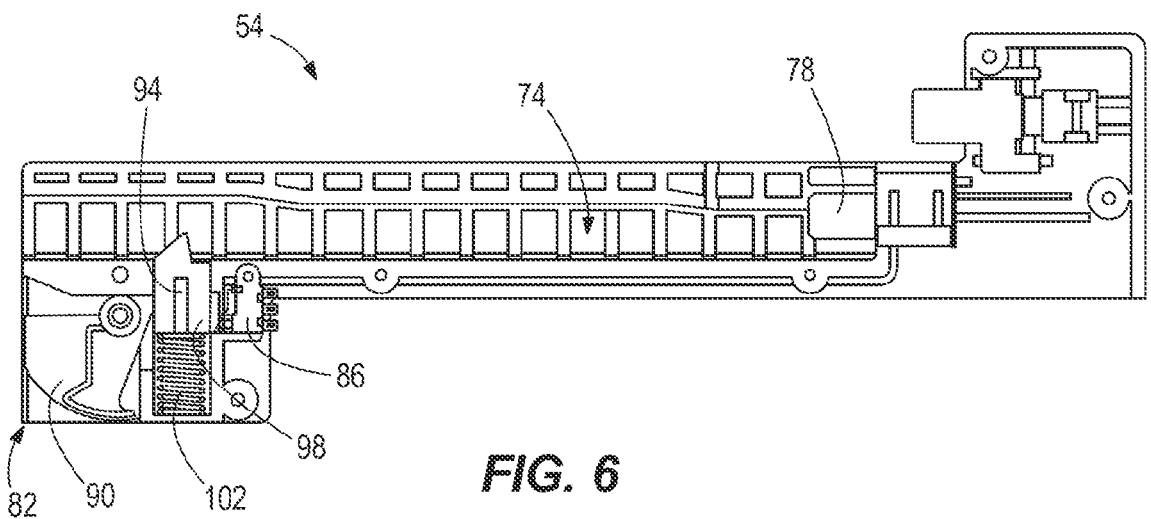
FIG. 6 is a cross-sectional view of a battery receptacle of the stand-alone motor unit of FIG. 1.

As shown in FIGS. 1-6, the motor unit 10 also includes a battery pack 50 that is removably received in a battery receptacle 54 in the housing 14 to transfer current from the battery pack 50 to the motor 36 via the control electronics 42. With reference to FIGS. 4-6, the battery pack 50 includes a battery pack housing 58 with a support portion 62 and a first terminal 66 that is electrically connected to a plurality of battery cells 68 supported by the pack housing 58. The support portion 62 provides a slide-on arrangement with a projection/recess portion 70 cooperating with a complementary projection/recess portion 74 (shown in FIG. 6) of the battery receptacle 54. In the embodiment illustrated in FIGS. 4-6, the projection/recess portion 70 of the battery pack 50 is a guide rail and the projection/recess portion 74 of the battery receptacle 54 is a guide recess. A similar battery pack is described and illustrated in U.S. patent application Ser. No. 16/025,491 filed Jul. 2, 2018, the entire content of which is incorporated herein by reference. In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about 40 A and about 60 A. In some embodiments, each of the battery cells 68 has a capacity of between about 3.0 Ah and about 5.0 Ah.

FIG. 6 illustrates the battery receptacle 54 of the motor unit 10 in accordance with some embodiments. The battery receptacle 54 includes the projection/recess 74, a second terminal 78, a latching mechanism 82, and a power disconnect switch 86. The projection/recess 74 cooperates with the projection/recess 70 of the battery pack 50 to attach the battery pack 50 to the battery receptacle 54 of the motor unit 10. When the battery pack 50 is attached to the motor unit 10, the second terminal 78 and the first terminal 66 are electrically connected to each other. The latching mechanism 82 protrudes from a surface of the battery receptacle 54 and is configured to engage the battery pack 50 to maintain engagement between the battery pack 50 and the battery receptacle 54. Thus, the battery pack 50 is connectable to and supportable by the battery receptacle 54 such that the battery pack 50 is supportable by the housing 14 of the stand-alone motor unit 10. In some embodiments, the battery pack receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery pack receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery receptacle 54) such that the latching mechanism 82 engages corresponding structure on the battery pack 50 to maintain engagement between the battery pack 50 and the battery receptacle 54. The latching mechanism 82 includes a pivotable actuator or handle 90 operatively engaging a latch member 94. The latch member 94 is slidably disposed in a bore 98 of the receptacle 54 and is biased toward a latching position by a biasing member 102 (e.g., a spring) to protrude through a surface of the battery receptacle 54 and into a cavity in the battery pack 50.

The latching mechanism also 82 includes the power disconnect switch 86 (e.g., a micro-switch) facilitating electrical connecting/disconnecting the battery pack 50 from the battery receptacle 54 during actuation of the handle 90 to withdraw the latch member 94 from the battery pack 50. The power disconnect switch 86 may act to electrically disconnect the battery pack 50 from the motor unit 10 prior to removal of the battery pack 50 from the battery receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the motor unit 10. When the controller 46 receives the interrupt, the controller 46 begins a power down operation to safely power down the control electronics 42 of the motor unit 10. A similar latching mechanism and disconnect switch is described and illustrated in U.S. patent application Ser. No. 16/025,491, which has been incorporated herein by reference.

Figure 7:
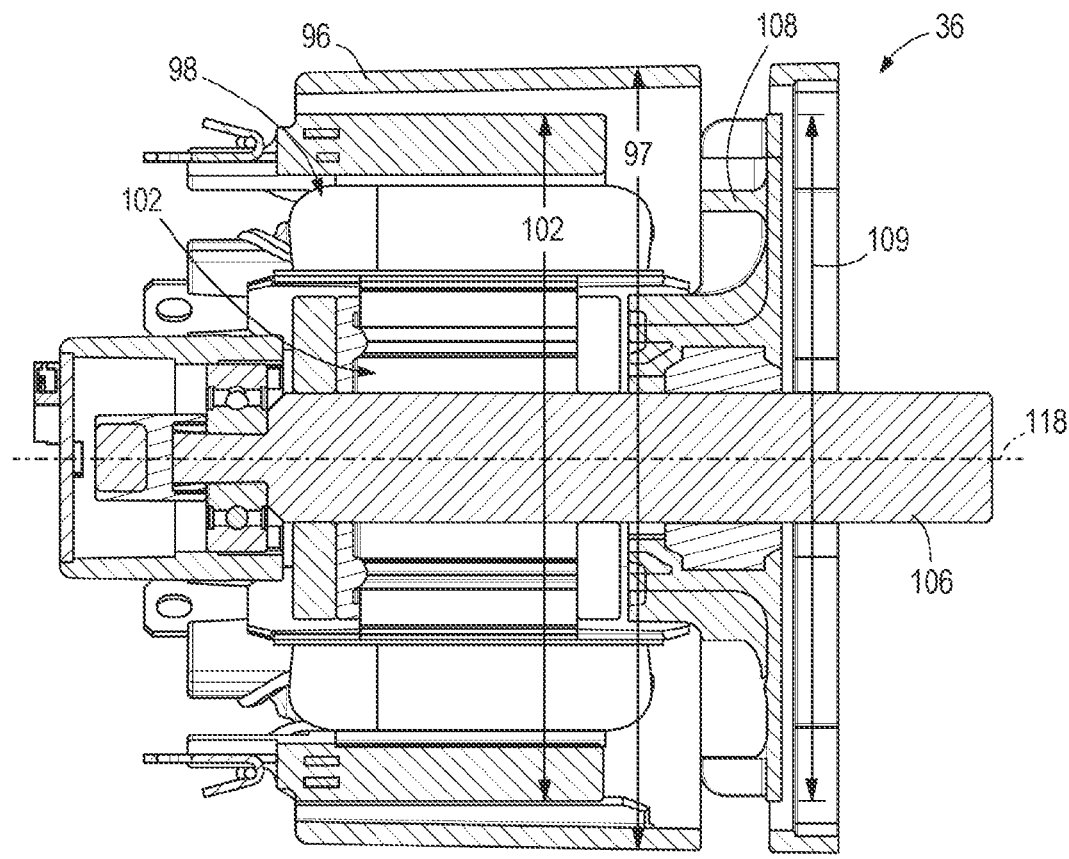
FIG. 7 is a cross-sectional view of a motor of the stand-alone motor unit of FIG. 1.

As shown in FIG. 7, the motor 36 includes a motor housing 96 having an outer diameter 97, a stator 98 having a nominal outer diameter 102 of up to about 80 mm, a rotor 102 having an output shaft 106 and supported for rotation within the stator 98, and a fan 108. A similar motor is described and illustrated in U.S. patent application Ser. No. 16/025,491, which has been incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger than the diameter 97 of the motor housing 96. In some embodiments, the motor 36 can be stopped with an electronic clutch (not shown) for quick overload control. In some embodiments, the motor 36 has a volume of up to about 443,619 mm$^3$. In some embodiments, the motor has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor is a 36 is an internal rotor motor, but in other embodiments, the motor 36 can be an outer rotor motor with a nominal outer diameter (i.e. the nominal outer diameter of the rotor) of up to about 80 mm.

Figure 8:
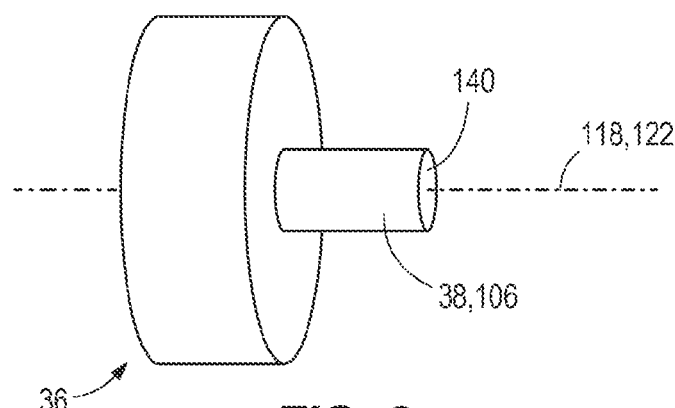
FIG. 8 is a schematic view of a motor of the stand-alone motor unit of FIG. 1.
Figure 9:
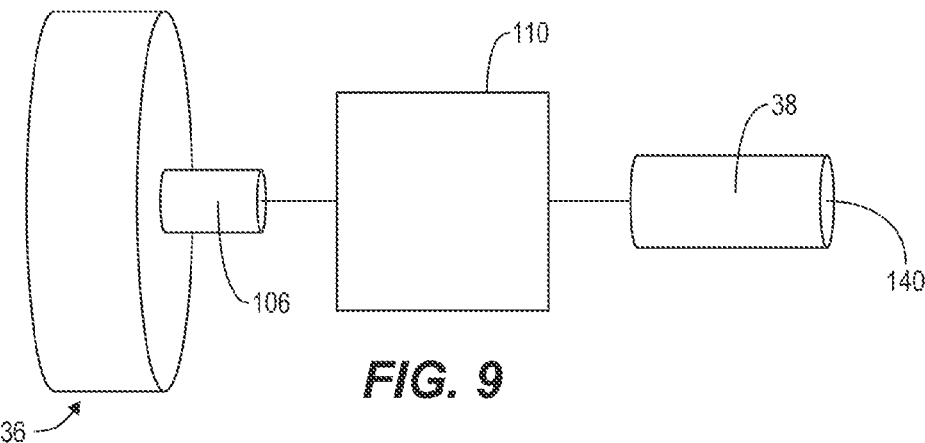
FIG. 9 is a schematic view of a motor, a gear train, and a power take-off shaft of the stand-alone motor unit of FIG. 1.
Figure 10:
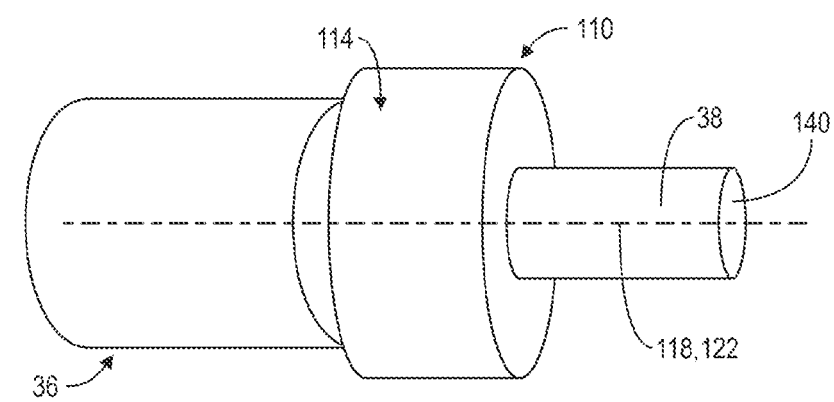
FIG. 10 is a schematic view of a motor, a gear train, and a power take-off shaft of the stand-alone motor unit of FIG. 1 in a first configuration.
Figure 11:
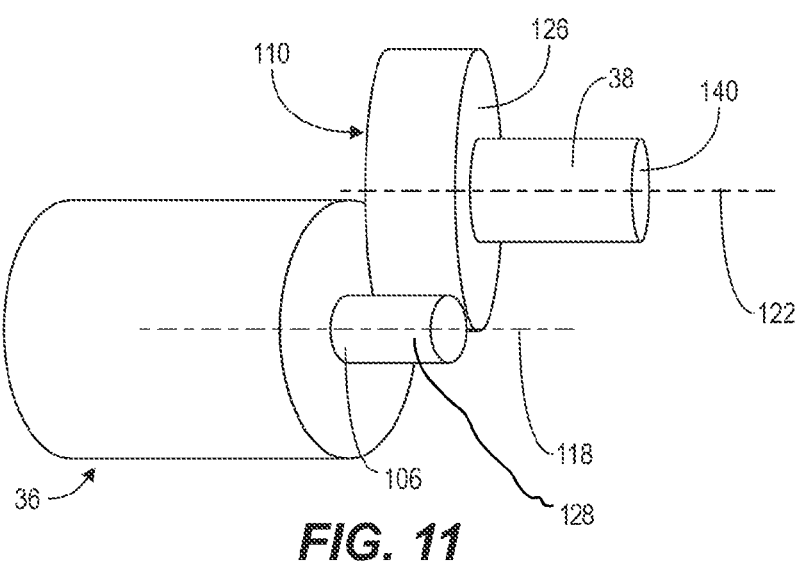
FIG. 11 is a schematic view of a motor, a gear train, and a power take-off shaft of the stand-alone motor unit of FIG. 1 in a second configuration.

With reference to FIGS. 8-12, the motor 36 can transfer torque to the power take-off shaft 38 in a variety of configurations. In the embodiment shown in FIG. 8, the output shaft 106 is also the power take-off shaft 38, such that the motor 36 directly drives the power take-off shaft 38 without any intermediate gear train. For example, the motor 36 may be a direct drive high pole count motor. As shown in FIG. 9, in other embodiments, the motor unit 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In the embodiment shown in FIG. 10, the gear train 110 includes a planetary transmission 114 that transfers torque from the output shaft 106 to the power take-off shaft 38, and a rotational axis 118 of the output shaft 106 is coaxial with a rotational axis 122 of the power take-off shaft 38. In the embodiment shown in FIG. 11, the gear train 110 includes a spur gear 126 engaged with a motor pinion 128 on the output shaft 106 of the rotor, such that the rotational axis 118 of the output shaft 106 is offset from and parallel to the rotational axis 122 of the power take-off shaft 38, allowing for a more compact design envelope for the housing 14. The single stage spur gear train 110 of FIG. 11 reduces the speed and increases the torque of the power take-off shaft 38 relative to the motor pinion 128. The single stage spur gear train 110 arrangement also reduces parts and costs. In some embodiments of the single stage spur gear train 110, the motor pinion 128 and the spur gear 126 are straight cut, external, or internal tooth gears.

Figure 12:
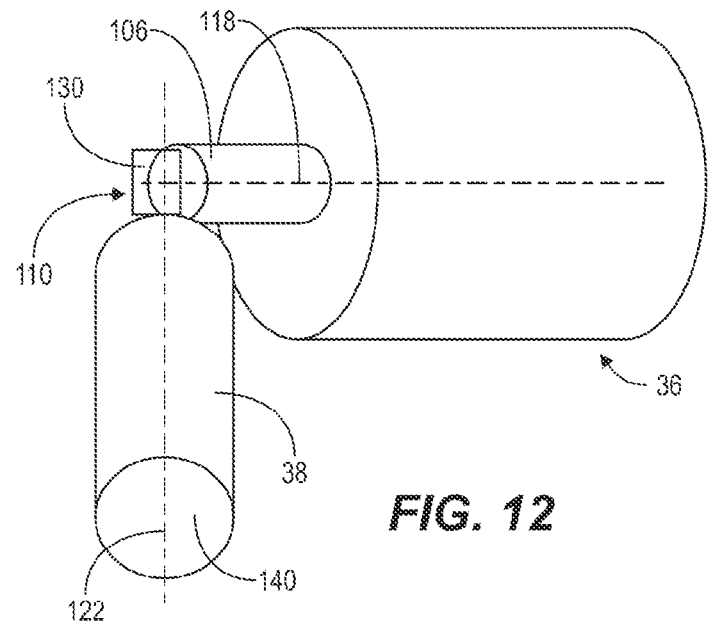
FIG. 12 is a schematic view of a motor, a gear train, and a power take-off shaft of the stand-alone motor unit of FIG. 1 in a third configuration.

In the embodiment shown in FIG. 12, the gear train 110 includes a bevel gear 130, such that the rotational axis 118 of the output shaft 106 is perpendicular to the rotational axis 122 of the power take-off shaft 38. Thus, in the embodiment of FIG. 12, the rotational axis 118 of the output shaft 106 intersects the second side 22 of the housing 14 and the power take-off shaft 38 protrudes from the flange 34. In other embodiments utilizing a bevel gear, the rotational axis 118 of the output shaft 106 is not perpendicular, parallel, or coaxial to the rotational axis 122 of the power take-off shaft 38, and the power-take off shaft 38 protrudes from the flange 34.

In the embodiment illustrated in FIG. 19, the gear train 110 includes a first gear 111 and a second gear 112 making up a first gear set 113 with a first reduction stage 115, and a third gear 116 and a fourth gear 117 making up second gear set 119 with a second reduction stage 120. The first gear 111 has a rotational center C1 and is coupled for rotation with the output shaft 106 of the motor 36. The second and third gears 112, 116 have respective rotational centers C2, C3 and are coupled for rotation with a second shaft 121 that is parallel to the output shaft 106 and the power take-off shaft 38. The power take-off shaft 38 is coupled for rotation with the fourth gear 117, which has a rotational center C4. A first center distance CD1 is defined between the rotational centers C1 and C2 of the first and second gears 111, 112. A second center distance CD2 is defined between the rotational centers C3 and C4 of the third and fourth gears 116, 117. In the illustrated embodiment, the first center distance CD1 is equal to the second center distance CD2. However, in other embodiments, the first center distance CD1 may be different than the second center distance CD2.

With continued reference to the embodiment illustrated in FIG. 19, the housing 14 includes a removable faceplate 124 that allows the operator to remove the faceplate 124 to access the first, second, third, and fourth gears 111, 112, 115, 116 and to slide them off the output shaft 106, the second shaft 120 and the power take-off shaft 38. Thus, the operator may replace the first gear set 113 with a different gear set with two gears having the same first center distance CD1 between their rotational centers to change the reduction ratio of the first reduction stage 115. Similarly, the operator may replace the second gear set 119 with a different gear set with two gears having the same second center distance CD2 between their rotational centers to change the reduction ratio of the second reduction stage 120. Thus, the motor unit 10 can implement a variety of reduction ratios to work with a broad range of power equipment, and the removable faceplate 124 makes it easy for an operator to quickly change these reduction ratios. Also the faceplate 124 makes it easy for an operator to change out the power take-off shaft 38 to replace it with a custom power take-off shaft for any given application. Also, the faceplate 124 is easily replaced with a different faceplate to fit a unique or custom mounting configuration.

Figure 13:
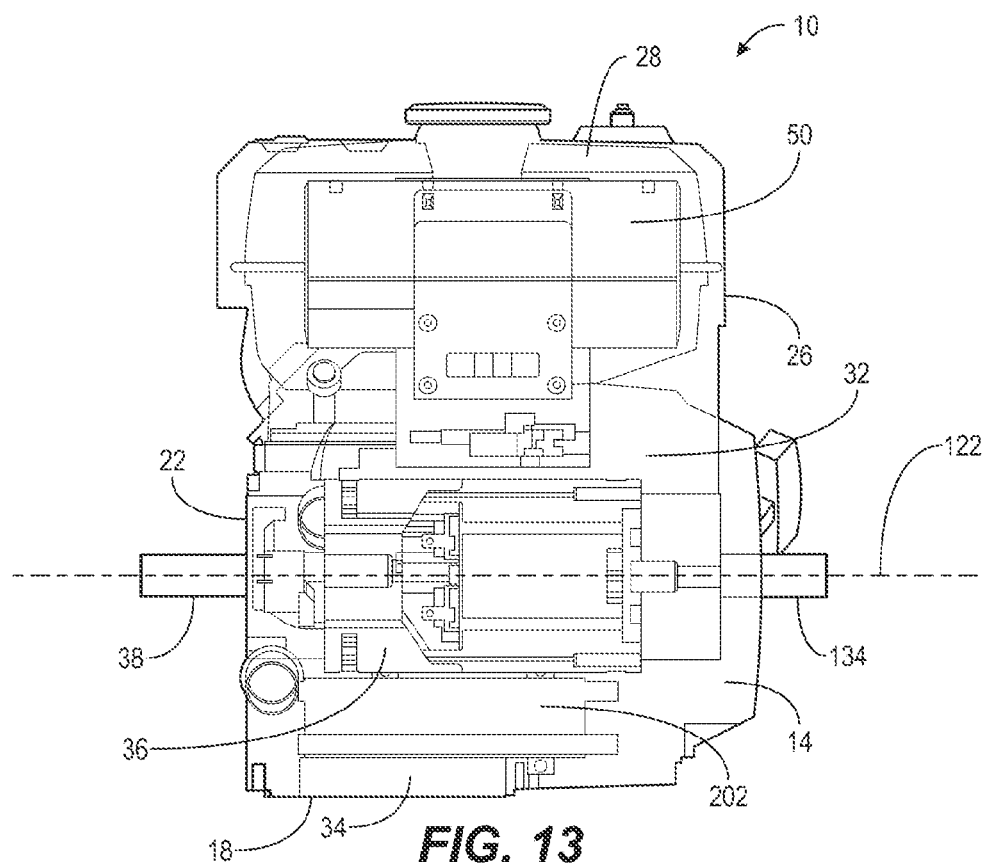
FIG. 13 is a plan view of a stand-alone motor unit in accordance with another embodiment of the invention.
Figure 14:
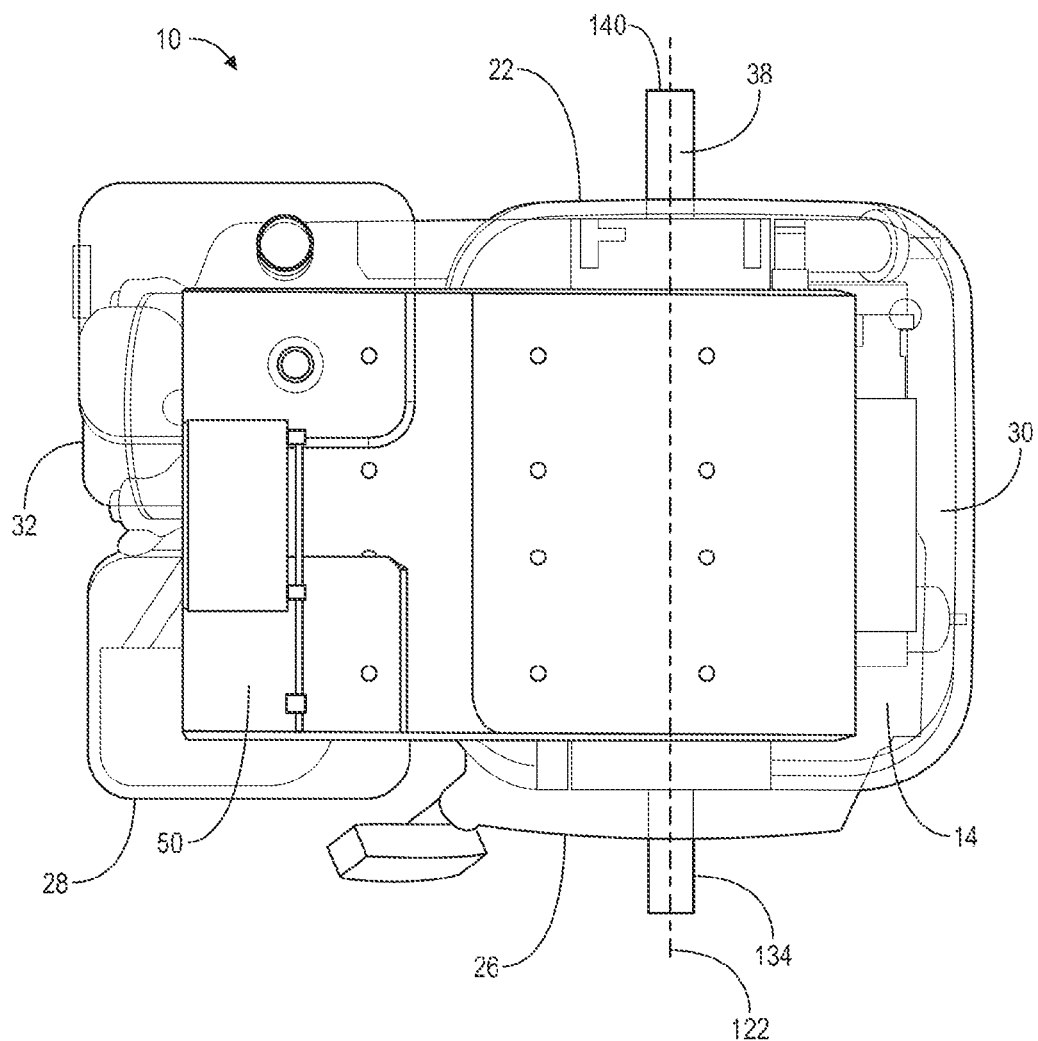
FIG. 14 is a plan view of the stand-alone motor unit of FIG. 13.

In the embodiment shown in FIGS. 13 and 14, the power-take off shaft 38 is a first power take-off shaft and the motor unit 10 includes a second power take-off shaft 134 that also extends along the rotational axis 122 of the first power take off shaft 38. The motor 36 drives the first and second power take-off shafts 38, 134 simultaneously, such that the motor unit 10 can be used with, for example, tillers, saws, and snow blowers.

Figure 15:
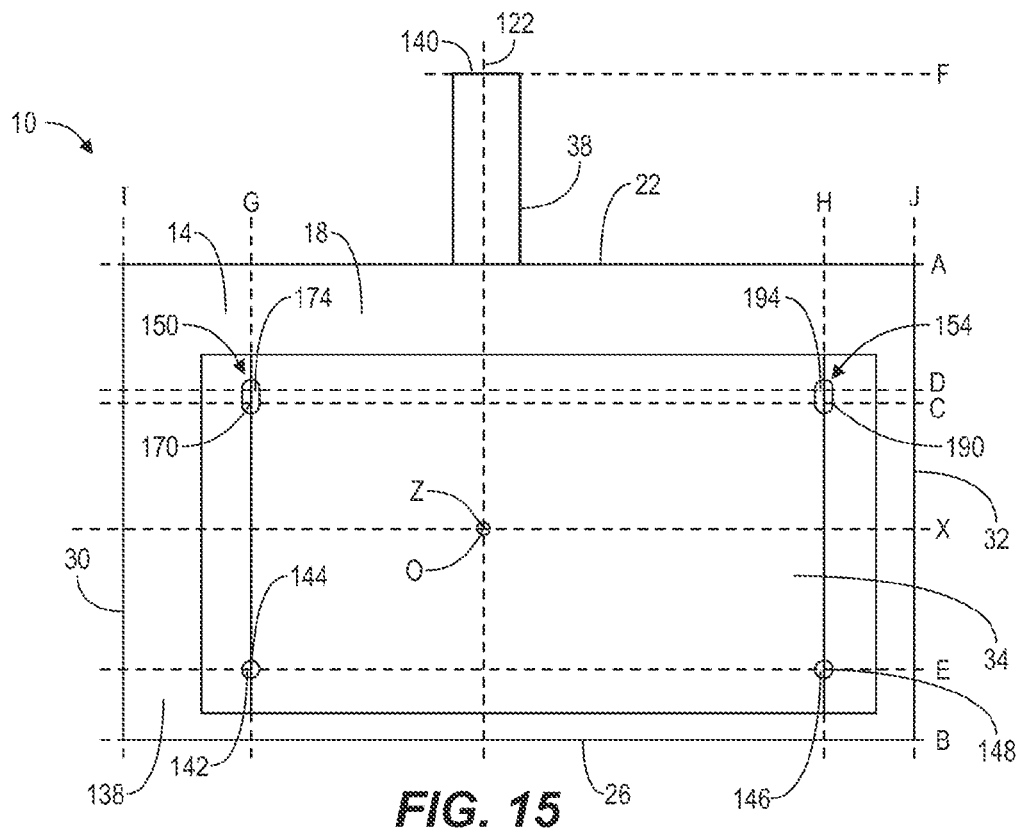
FIG. 15 is a schematic view of a first side of the stand-alone motor unit of FIG. 1.
Figure 16:
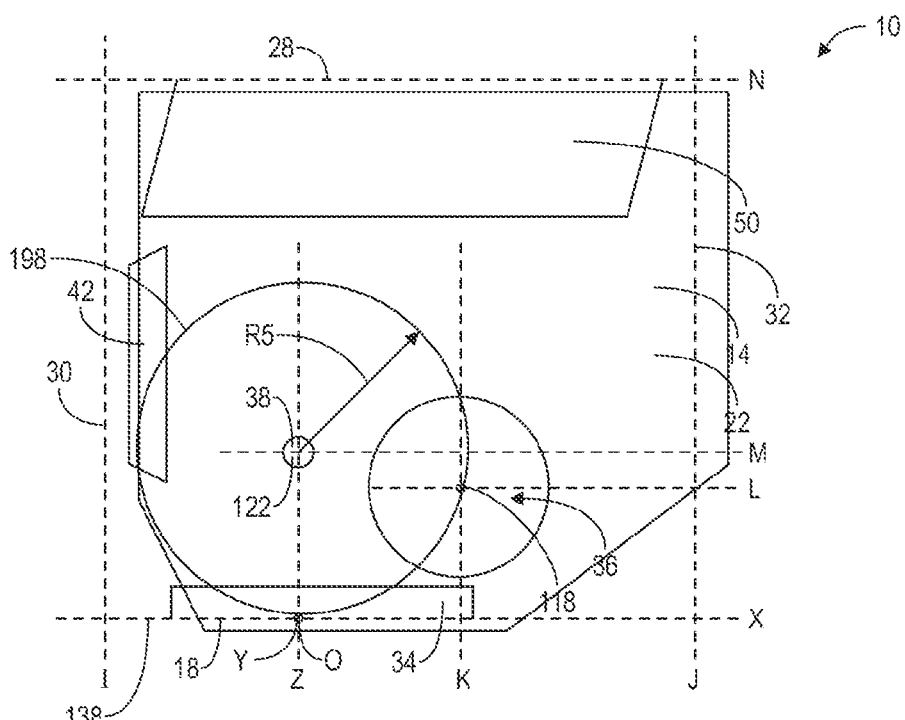
FIG. 16 is a schematic view of a second side of the stand-alone motor unit of FIG. 1.

FIGS. 15 and 16 illustrate embodiments of the motor unit 10 in which the power take-off shaft 38 protrudes through the second side 22 of the housing 14. As shown in FIG. 15, a plane 138 is defined on the first side 18 of the housing 14 on which the flange 34 is coupled. The plane 138 contains orthogonal X and Y axes that intersect at an origin O. As shown in FIG. 16, the power take-off shaft 38 extends parallel to the Y-axis and as shown in FIG. 15, the power take-off shaft 38 has an end 140. The X-axis extends parallel to the second and third sides 22, 26 and the Y-axis extends parallel to the fifth and sixth sides 30, 32.

With continued reference to FIG. 15, the flange 34 includes a plurality of apertures therethrough, including a first hole 142 having a center 144, a second hole 146 having a center 148, a first slot 150, and a second slot 154. The plurality of apertures collectively define a first bolt pattern that matches an "identical", second bolt pattern defined in a piece of power equipment to which the motor unit 10 can be mounted. "Identical" does not mean that each of the plurality of apertures defining the first bolt pattern identically aligns with each of the plurality of apertures defining the second bolt pattern. In other words, not all of the first hole 142, second hole 146, first slot 150, and second slot 154 need align with a corresponding aperture in the second bolt pattern. Rather, at least two of the first hole 142, second hole 146, first slot 150, and second slot 154 will at least partially align with two corresponding apertures in the second bolt pattern, such that at least two fasteners, such as bolts, may be respectively inserted through at least two of the at least partially-aligned respective apertures of the first and second bolt patterns in order to couple the motor unit 10 to the piece of power equipment. Thus, for the first bolt pattern to match an "identical" second bolt pattern, at least two apertures in the first bolt pattern are configured to at least partially align with two apertures of the second bolt pattern. In the disclosed embodiment, the plurality of apertures defining the first bolt pattern includes four apertures (first hole 142, second hole 146, first slot 150, and second slot 154) but in other embodiments, the plurality of apertures defining the first bolt pattern could include more or fewer apertures.

In some embodiments, the flange 34 may include one or more intermediate mounting members or adapters arranged between the flange 34 itself and the flange of the piece of power equipment having the second bolt pattern, such that the adapter(s) couple the flange 34 to the piece of power equipment. In these embodiments, the adapter includes both the second bolt pattern and the first bolt pattern, such that the first bolt pattern of the flange 34 aligns with the first bolt pattern of the adapter and the second bolt pattern of the adapter aligns with the second bolt pattern defined in the piece of power equipment, thereby allowing the flange 34 of the motor unit 10 to be coupled to the piece of power equipment.

As shown in FIG. 17, the first slot 150 includes a first semi-circular portion 158 having a radius R1, a second semi-circular portion 162 having a radius R2, and a straight portion 166 that connects the first and second semi-circular portions 158, 162. The first semi-circular portion 158 has a center 170 from which radius R1 is defined and the second semi-circular portion 162 has a center 174 from which radius R2 is defined. The centers 170, 174 can define points where a bolt is inserted through the first slot 150 when the first slot 150 is aligned with a corresponding aperture in the second bolt pattern in the piece of power equipment, but the bolt may also be inserted anywhere along the straight portion 166.

As also shown in FIG. 18, the second slot 154 includes a first semi-circular portion 178 having a radius R3, a second semi-circular portion 182 having a radius R4, and a straight portion 186 that connects the first and second semi-circular portions 178, 182. The first semi-circular portion 178 has a center 190 from which radius R3 is defined and the second semi-circular portion 182 has a center 194 from which radius R4 is defined. The centers 170, 174 can define points where a bolt is inserted through the second slot 154 when the second slot 154 is aligned with a corresponding aperture in the second bolt pattern in the piece of power equipment, but the bolt may also be inserted anywhere along the straight portion 186. In the embodiment illustrated in FIGS. 15 and 17, R1, R2, R3, and R4 are all equal, but in other embodiments, one or more of the radii R1, R2, R3, R4 may be different from one another.

With reference again to FIG. 15, Table 1 below lists the distances of various components and reference points with respect to the X-axis and the Y-axis.

TABLE 1

|  | Distance from X-axis | Distance from Y-axis |
| --- | --- | --- |
| Center 144 of first hole 142 | E | G |
| Center 148 of second hole 146 | E | H |
| Center 170 of first semi-circular portion 158 of first slot 150 | C | G |
| Center 174 of second semi-circular portion 162 of first slot 150 | D | G |
| Center 190 of first semi-circular portion 178 of second slot 154 | C | H |
| Center 194 of second semi-circular portion 182 of second slot 154 | D | H |
| Second side 22 of housing 14 | A | Perpendicular to Y-axis |
| Third side 26 of housing 14 | B | Perpendicular to Y-axis |
| End 140 of power take-off shaft 38 | F | Perpendicular to Y-axis |
| Fifth side 30 of housing 14 | Perpendicular to X-axis | I |
| Sixth side 32 of housing 14 | Perpendicular to X-axis | J |

Table 2 below lists five different embodiments of the stand-alone motor unit 10 of FIG. 1, which is also schematically illustrated in FIGS. 15 and 16, in which the values of the distances from Table 1, in millimeters, are provided:

TABLE 2

|  | A | B | C | D | E | F | G | H | I | J |
| --- | --- | --- | --- | --- | --- | --- | --- | --- | --- | --- |
| Embodiment 1 | 75.2-75.5 | 168.6 | 34.5 | 39.5 | 40.5 | 115.4 | 66 | 96 | 115 | 231 |
| Embodiment 2 | 75.2-75.5 | 175.6 | 34.5 | 39.5 | 40.5 | 139.9 | 66 | 96 | 123 | 239 |
| Embodiment 3 | 75.2-75.5 | 184.6 | 34.5 | 39.5 | 40.5 | 136.9 | 66 | 96 | 123 | 253 |
| Embodiment 4 | 75.2-75.5 | 203.1 | 34.5 | 39.5 | 40.5 | 128.4 | 66 | 96 | 135.3 | 278.3 |
| Embodiment 5 | 75.2-75.5 | 221.5 | 34.5 | 39.5 | 40.5 | 128.4 | 66 | 96 | 147.6 | 303.6 |

In some embodiments, dimension F, the length to the end 140 of the power take-off shaft 38, can be modified or customized besides the dimensions listed in Table 2.

As shown in FIG. 16, a Z-axis intersects the origin O of plane 138 and the first and fourth sides 18, 28 of the housing 14. The Z-axis is arranged perpendicular to the X-axis and Y-axis of the plane 138. The Z-axis is also arranged perpendicular to the first and fourth 18, 28 sides of the housing 14. The Z-axis is also arranged parallel to the fifth and sixth sides 30, 32 of the housing 14. As also shown in FIG. 16, a radius R5 extending from the rotational axis 122 of the power take-off shaft 38 defines a circle 198. The rotational axis 118 of the output shaft 106 of the rotor 102 is intersected by the circle 198, such that a distance R5 is defined between the rotational axis 118 of the output shaft 106 and the rotational axis 122 of the power take-off shaft 38. Table 3 below identifies the distances of various components and reference points with respect to the X-axis and Z-axis.

TABLE 3

|  | Distance from X-axis | Distance from Z-axis |
| --- | --- | --- |
| Rotational axis 118 of output shaft 106 | L | K |
| Rotational axis 122 of power take-off shaft 38 | M | Intersected by Z-axis |
| Fourth side 28 of housing 14 | N | Perpendicular to Z-axis |
| Fifth side 30 of housing 14 | Perpendicular to X-axis | I |
| Sixth side 32 of housing 14 | Perpendicular to X-axis | J |

Table 4 below lists the five different embodiments from Table 2 and provides the values of the distances from Table 3, as well as R5, in millimeters, for each embodiment:

TABLE 4

|  | K | L | M | N | I | J | R5 |
| --- | --- | --- | --- | --- | --- | --- | --- |
| Embodiment 1 | 46.9 | 95.3 | 106 | 329 | 115 | 231 | 48.1 |
| Embodiment 2 | 46.9 | 95.3 | 106 | 346 | 123 | 239 | 48.1 |
| Embodiment 3 | 46.9 | 95.3 | 106 | 346 | 123 | 253 | 48.1 |
| Embodiment 4 | 46.9 | 95.3 | 106 | 380.6 | 135.3 | 278.3 | 48.1 |
| Embodiment 5 | 46.9 | 95.3 | 106 | 415.2 | 147.6 | 303.6 | 48.1 |

With continued reference to the embodiment illustrated in FIG. 16, the control electronics 42 are vertically oriented relative to flange 34 and positioned between the Z-axis and the fifth side 30 of the housing 14, while being closer to the fifth side 30 of the housing 14. As also shown in the embodiment illustrated in FIG. 16, the battery pack 50 is horizontally oriented relative to flange 34 and positioned between the rotational axis 122 of the power take-off shaft 38 and the fourth side 28 of the housing 14, while being closer to the fourth side 28 of the housing 14. However, in other embodiments, the battery pack 50 may be closer to the rotational axis 122 of the power take-off shaft 38. Thus, in all five embodiments, even when the design envelope of the housing 14 of the motor unit 10 is changed, each of the battery 50, the battery receptacle 54, the control electronics 42, and the motor 36 fit within the housing 14. In some embodiments, the total weight of the motor unit 10 including each of the battery 50, the battery receptacle 54, the control electronics 42, and the motor 36, is 37.05 lbs. In contrast, when fully loaded with fluids, some 120 cc gas engine units can weigh up to 33.50 lbs, some 160 cc gas engine units can weigh up to 40.10 lbs, and some 200 cc gas engine units can weigh up to 41.30 lbs.

In some embodiments, the motor unit 10 includes a "kill switch" (not shown) that can be used when the motor unit 10 is coupled to, e.g., a riding lawnmower with a seat. Thus, when an operator intentionally or inadvertently gets off the seat, the kill switch discontinues power to the motor 36 and/or control electronics 42. In some embodiments, the kill switch stops the motor 36 and/or power take-off shaft 38, but maintains power to the power electronics 42 so that the motor unit 10 may be kept in an armed or ready state. In some embodiments, the motor unit 10 requires two or more actions required to turn on the motor 36 because unlike a gas engine, it may be difficult to determine whether the electric motor 36 is on or not. Specifically, the electric motor 36 is much quieter than a gas engine. Thus, simply hitting an "on" switch may not be enough to indicate to the operator that the motor 36 has been turned on, because of its relative silence. Thus, by forcing the operator to make two actions, such as holding an "on" switch and then depressing a second actuator, the operator is made to feel more certain that the motor 36 has been turned on.

In some embodiments, a control interface to control the power equipment and/or the motor unit 10 is built into the motor unit 10. In some embodiments, the motor unit 10 includes a communication port and a wiring harness electrically connects the motor unit 10 to the piece of power equipment, thus allowing the operator to control the motor unit 10 from the piece of power equipment 10, or vice versa. For example, if the motor unit 10 is mounted to a lawn mower, the operator may arrange the wiring harness between the lawn mower and the communication port on the motor unit 10. The wiring harness could electrically connect a kill switch on a handlebar of the lawnmower, for example, to the motor 36 of the motor unit 10. Thus, if the kill switch is intentionally or inadvertently released during operation of the lawn mower, the motor 36 of the motor unit 10 stops via the electrical communication through the wiring harness and communication port on the motor unit 10. Thus, the control interface and communication port allow the operator flexibility in controlling the motor unit 10 and/or the piece of power equipment.

In some embodiments, the motor unit 10 includes ON/OFF indicators (not shown). In some embodiments, the motor unit 10 includes a filter (not shown) to keep airborne debris out of the motor 36 and control electronics 42. In some embodiments, the filter includes a dirty filter sensor (not shown) and a self-cleaning mechanism (not shown). In some embodiments, the motor 36 will mimic a gas engine response when encountering resistance, such as slowing down or bogging. In some embodiments, the motor unit 10 includes a heat sink 202 in the housing 14 for air-cooling the control electronics 42 (FIGS. 1 and 2). In some embodiments, the motor unit 10 is liquid cooled.

In some embodiments, the output shaft 106 of the rotor 102 has both forward and reverse capability. In some embodiments, the forward and reverse capability is controllable without shifting gears of the gear train 110, in comparison to gas engines, which cannot achieve forward/reverse capability without extra gearing and time delay. Thus, the motor unit 10 provides increased speed, lower weight, and lower cost. Because the motor unit 10 has fewer moving parts and no combustion system, as compared with a gas engine, it also provides additional speed, weight, and cost advantages.

In some embodiments, the motor unit 10 is able to start under a "heavy" load. For example, when the motor unit 10 is mounted to a riding lawnmower and the lawnmower is started over a patch of thick grass, the motor unit 10 is able to start the motor 36 in the thick grass. Thus, unlike gas engines, the motor unit 10 does not require a centripetal clutch. Rather, the motor 36 would always be engaged. Additionally, the motor unit 10 does not need a centrifugal clutch, in comparison to gas engines, which need a centrifugal clutch to idle and disengage from the load, or risk stalling.

The motor unit 10 is able to operate in any orientation (vertical, horizontal, upside down) with respect to a ground surface for a prolonged period of time, giving it an advantage over four-cycle gas engines, which can only be operated in one orientation and at slight inclines for a shorter period of time. Because the motor unit 10 does not require gas, oil, or other fluids, it can run, be transported, and be stored upside down or on any given side without leaking or flooding In operation, the motor unit 10 can be used to replace a gas engine system. Specifically, the motor unit 10 can be mounted to the piece of power equipment having the second bolt pattern by aligning the first bolt pattern defined by the plurality of apertures in the flange 34 with the second bolt pattern. Thus, the power take-off shaft 38 of the motor unit 10 can be used to drive the equipment.

During operation, the housing 14 of the motor unit 10 is comparably much cooler than the housing of an internal combustion unit because there is no combustion in the motor unit 10. Specifically, when a gas engine unit runs, the housing of the gas engine unit is 220 degrees Celsius or higher. In contrast, when the motor unit 10 runs, all of the exterior surfaces of the housing 14 are less than 95 degrees Celsius. Tables 5 and 6 below list with further specificity the temperature limits of different components on the housing 14 of the motor unit 10.

Table 5 below lists the Underwriter's Laboratories (UL) temperature limits of different components typically used in power tools, with respect to whether those components are formed of metal, plastic, rubber, wood, porcelain, or vitreous. The plastic rated temperatures are never exceeded.

TABLE 5

|  | Metal | Plastic/Rubber/Wood | Porcelain/Vitreous |
|---|---|---|---|
| Casual Contact | 85° C. | 85° C. | 85° C. |
| Handles and knobs that are continuously held | 55° C. | 75° C. | 65° C. |
| Handles and knobs that are only briefly held (i.e. switches) | 60° C. | 80° C. | 70° C. |

Table 6 below lists the UL temperature limits of different components of the battery pack housing 58 of the battery pack 50, with respect to whether those components are formed of metal, plastic or rubber. The plastic rated temperatures are never exceeded.

TABLE 6

|  | Metal | Plastic/Rubber |
|---|---|---|
| Casual Contact | 70° C. | 95° C. |
| Handles and knobs that are continuously held | 55° C. | 75° C. |
| Handles and knobs that are only briefly held (i.e. switches) | 60° C. | 85° C. |

Figure 20:
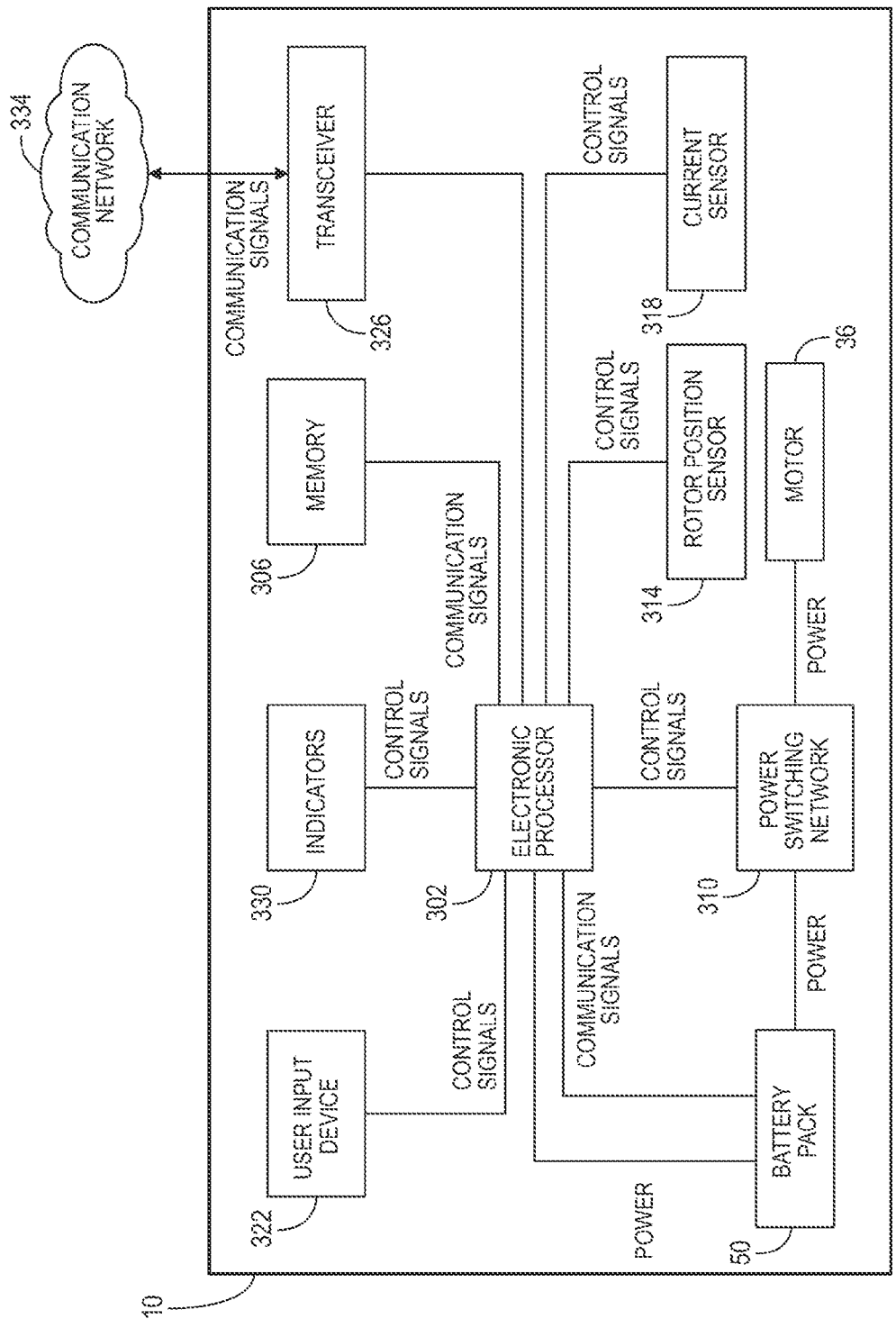
FIG. 20 is a block diagram of the stand-alone motor unit of FIG. 1.

FIG. 20 illustrates a simplified block diagram of the motor unit 10 according to one example embodiment. As shown in FIG. 20, the motor unit 10 includes an electronic processor 302, a memory 306, the battery pack 50, a power switching network 310, the motor 36, a rotor position sensor 314, a current sensor 318, a user input device (e.g., a trigger or power button) 322, a transceiver 326, and indicators (e.g., light-emitting diodes) 330. In some embodiments, the motor unit 10 includes fewer or additional components than those shown in FIG. 20. For example, the motor unit 10 may include a battery pack fuel gauge, work lights, additional sensors, kill switch, the power disconnect switch 86, etc. In some embodiments, elements of the motor unit 10 illustrated in FIG. 20 including one or more of the electronic processor 302, memory 306, power switching network 310, rotor position sensor 314, current sensor 318, user input device (e.g., a trigger or power button) 322, transceiver 326, and indicators (e.g., light-emitting diodes) 330 form at least part of the control electronics 42 shown in FIG. 3, with the electronic processor 302 and the memory 306 forming at least part of the controller 46 shown in FIG. 3.

The memory 306 includes read only memory (ROM), random access memory (RAM), other non-transitory computer-readable media, or a combination thereof. The electronic processor 302 is configured to communicate with the memory 306 to store data and retrieve stored data. The electronic processor 302 is configured to receive instructions and data from the memory 306 and execute, among other things, the instructions. In particular, the electronic processor 302 executes instructions stored in the memory 306 to perform the methods described herein.

As described above, in some embodiments, the battery pack 50 is removably attached to the housing of the motor unit 10 such that a different battery pack 50 may be attached and removed to the motor unit 10 to provide different amount of power to the motor unit 10. Further description of the battery pack 50 (e.g., nominal voltage, sustained operating discharge current, size, number of cells, operation, and the like), as well as the motor 36 (e.g., power output, size, operation, and the like), is provided above with respect to FIGS. 1-19.

The power switching network 310 enables the electronic processor 302 to control the operation of the motor 36. Generally, when the user input device 322 is depressed (or otherwise actuated), electrical current is supplied from the battery pack 50 to the motor 36, via the power switching network 310. When the user input device 322 is not depressed (or otherwise actuated), electrical current is not supplied from the battery pack 50 to the motor 36. In some embodiments, the amount in which the user input device 322 is depressed is related to or corresponds to a desired speed of rotation of the motor 36. In other embodiments, the amount in which the user input device 322 is depressed is related to or corresponds to a desired torque. In other embodiments, a separate input device (e.g., slider, dial, or the like) is included on the motor unit 10 in communication with the electronic processor 302 to provide a desired speed of rotation or torque for the motor 36.

In response to the electronic processor 302 receiving a drive request signal from the user input device 322, the electronic processor 302 activates the power switching network 310 to provide power to the motor 36. Through the power switching network 310, the electronic processor 302 controls the amount of current available to the motor 36 and thereby controls the speed and torque output of the motor 36. The power switching network 310 may include numerous field-effect transistors (FETs), bipolar transistors, or other types of electrical switches. For instance, the power switching network 310 may include a six-FET bridge that receives pulse-width modulated (PWM) signals from the electronic processor 302 to drive the motor 36.

The rotor position sensor 314 and the current sensor 318 are coupled to the electronic processor 302 and communicate to the electronic processor 302 various control signals indicative of different parameters of the motor unit 10 or the motor 36. In some embodiments, the rotor position sensor 314 includes a Hall sensor or a plurality of Hall sensors. In other embodiments, the rotor position sensor 314 includes a quadrature encoder attached to the motor 36. The rotor position sensor 314 outputs motor feedback information to the electronic processor 302, such as an indication (e.g., a pulse) when a magnet of a rotor of the motor 36 rotates across the face of a Hall sensor. In yet other embodiments, the rotor position sensor 314 includes, for example, a voltage or a current sensor that provides an indication of a back electro-motive force (back emf) generated in the motor coils. The electronic processor 302 may determine the rotor position, the rotor speed, and the rotor acceleration based on the back emf signals received from the rotor position sensor 314, that is, the voltage or the current sensor. The rotor position sensor 314 can be combined with the current sensor 318 to form a combined current and rotor position sensor. In this example, the combined sensor provides a current flowing to the active phase coil(s) of the motor 36 and also provides a current in one or more of the inactive phase coil(s) of the motor 36. The electronic processor 302 measures the current flowing to the motor based on the current flowing to the active phase coils and measures the motor speed based on the current in the inactive phase coils.

Based on the motor feedback information from the rotor position sensor 314, the electronic processor 302 can determine the position, velocity, and acceleration of the rotor. In response to the motor feedback information and the signals from the user input device 322, the electronic processor 302 transmits control signals to control the power switching network 310 to drive the motor 36. For instance, by selectively enabling and disabling the FETs of the power switching network 310, power received from the battery pack 50 is selectively applied to stator windings of the motor 36 in a cyclic manner to cause rotation of the rotor of the motor 36. The motor feedback information is used by the electronic processor 302 to ensure proper timing of control signals to the power switching network 310 and, in some instances, to provide closed-loop feedback to control the speed of the motor 36 to be at a desired level. For example, to drive the motor 36, using the motor positioning information from the rotor position sensor 314, the electronic processor 302 determines where the rotor magnets are in relation to the stator windings and (a) energizes a next stator winding pair (or pairs) in the predetermined pattern to provide magnetic force to the rotor magnets in a direct of desired rotation, and (b) de-energizes the previously energized stator winding pair (or pairs) to prevent application of magnetic forces on the rotor magnets that are opposite the direction of rotation of the rotor.

The current sensor 318 monitors or detects a current level of the motor 36 during operation of the motor unit 10 and provides control signals to the electronic processor 302 that are indicative of the detected current level. The electronic processor 302 may use the detected current level to control the power switching network 310 as explained in greater detail below.

The transceiver 326 allows for communication between the electronic processor 302 and an external device (for example, the user equipment 338 of FIG. 21) over a wired or wireless communication network 334. In some embodiments, the transceiver 326 may comprise separate transmitting and receiving components. In some embodiments, the transceiver 326 may comprise a wireless adapter attached to the motor unit 10. In some embodiments, the transceiver 326 is a wireless transceiver that encodes information received from the electronic processor 302 into a carrier wireless signal and transmits the encoded wireless signal to the user equipment 338 over the communication network 334. The transceiver 326 also decodes information from a wireless signal received from the user equipment 338 over the communication network 334 and provides the decoded information to the electronic processor 302.

The communication network 334 provides a wired or wireless connection between the motor unit 10 and the user equipment 338. The communication network 334 may comprise a short range network, for example, a BLUETOOTH network, a Wi-Fi network or the like, or a long range network, for example, the Internet, a cellular network, or the like.

As shown in FIG. 20, the indicators 330 are also coupled to the electronic processor 302 and receive control signals from the electronic processor 302 to turn on and off or otherwise convey information based on different states of the motor unit 10. The indicators 330 include, for example, one or more light-emitting diodes ("LEDs"), or a display screen. The indicators 330 can be configured to display conditions of, or information associated with, the motor unit 10. For example, the indicators 330 are configured to indicate measured electrical characteristics of the motor unit 10, the status of the motor unit 10, the mode of the motor unit 10, etc. The indicators 330 may also include elements to convey information to a user through audible or tactile outputs. In some embodiments, the indicators 330 include an eco-indicator that indicates an amount of power being used by the load during operation.

The connections shown between components of the motor unit 10 are simplified in FIG. 20. In practice, the wiring of the motor unit 10 is more complex, as the components of a motor unit are interconnected by several wires for power and control signals. For instance, each FET of the power switching network 310 is separately connected to the electronic processor 302 by a control line; each FET of the power switching network 310 is connected to a terminal of the motor 36; the power line from the battery pack 50 to the power switching network 310 includes a positive wire and a negative/ground wire; etc. Additionally, the power wires can have a large gauge/diameter to handle increased current. Further, although not shown, additional control signal and power lines are used to interconnect additional components of the motor unit 10.

Figure 21:
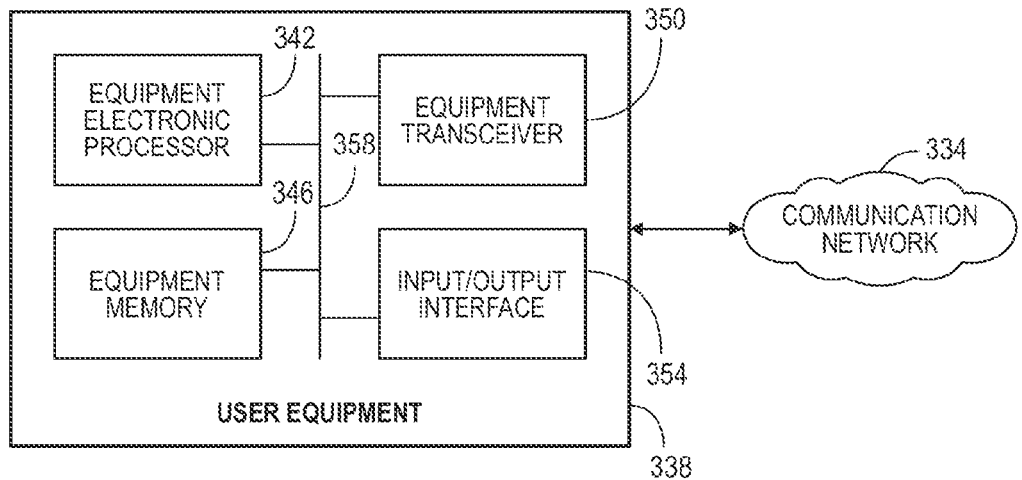
FIG. 21 is a block diagram of a user equipment communicating with the motor unit of FIG. 1.

FIG. 21 illustrates a simplified block diagram of the user equipment 338 according to one example embodiment. The user equipment 338 is, for example, a smart telephone, a tablet computer, a laptop computer, a personal digital assistant, and the like, and may also be referred to as a personal electronic communication device. The user equipment 338 allows the user to customize settings of the motor unit 10 and receive operation information from the motor unit 10. As shown in FIG. 20, the user equipment 338 includes an equipment electronic processor 342, an equipment memory 346, an equipment transceiver 350, and an input/output interface 354. The equipment electronic processor 342, the equipment memory 346, the equipment transceiver 350, and the input/output interface 354 communicate over one or more control and/or data buses (e.g., a communication bus 358). The equipment electronic processor 342, the equipment memory 346, and the equipment transceiver 350 may be implemented similar to the electronic processor 302, the memory 306, and the transceiver 326 of the motor unit 10. Particularly, the equipment electronic processor 342 executed a motor unit application stored on the equipment memory 346 to perform functionality described herein. The input/output interface 354 includes one or more input components (e.g., a keypad, a mouse, and the like), one or more output components (e.g., a speaker, a display, and the like), or both (e.g., a touch screen display).

Figure 22:
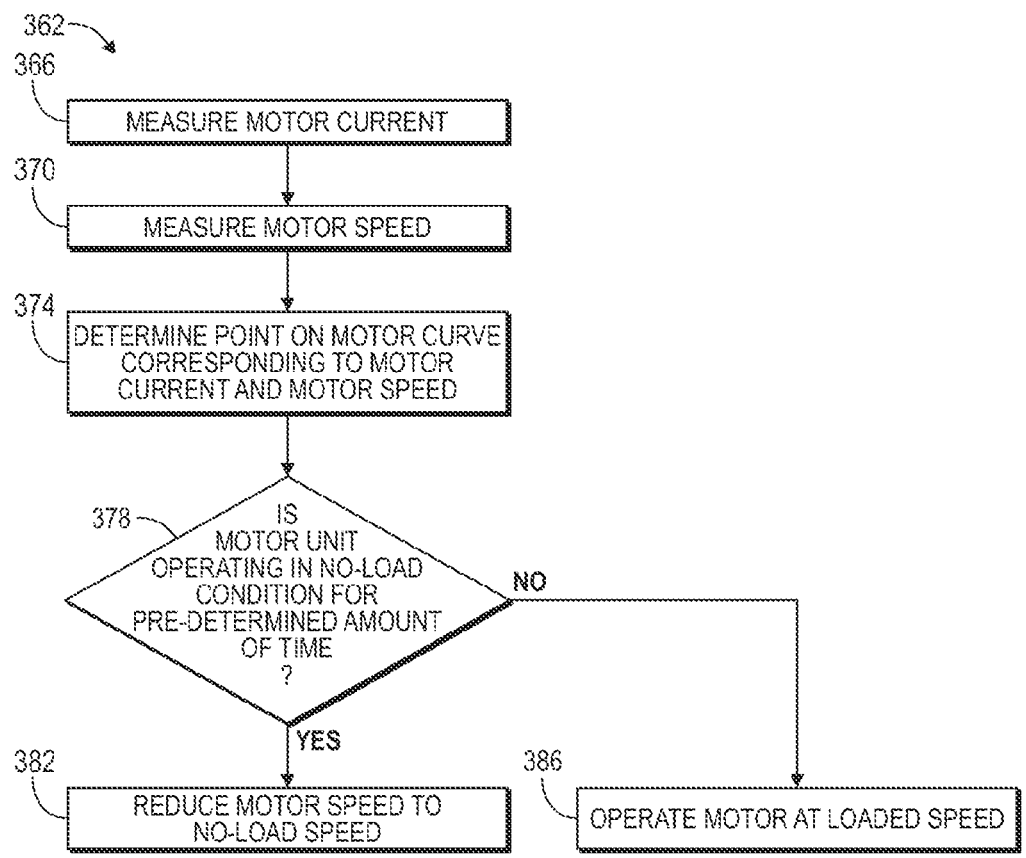
FIG. 22 is a flowchart of a method for no-load operation of the motor unit of FIG. 1.

FIG. 22 illustrates a flowchart of a method 362 for no-load operation of the motor unit 10. In the example illustrated, the method 362 includes measuring, using the current sensor 318, a motor current (at block 366). The electronic processor 302 detects the current flowing through the motor using the current sensor 318 as described above. The current sensor 318 may detect the current level at discrete time intervals, for example, every 2 milli-seconds, and provide the control signals indicating the current level at the discrete time intervals to the electronic processor 302. The method 362 also includes measuring, using the rotor position sensor 314, the motor speed (at block 370). The electronic processor 302 receives feedback from the rotor position sensor 314 when a magnet of the rotor rotates across the face of a Hall sensor. The electronic processor 302 determines the speed of the motor 36 based on the frequency of the pulses received from the rotor position sensor 314.

The method 362 further includes determining, using the electronic processor 302, a point on the motor power curve corresponding to the measured motor current and the measured motor speed (at block 374). In one example, the electronic processor 302 constructs a motor power graph having motor speed on the X-axis and motor current on the Y-axis. The point on the motor power curve is the point corresponding to the measured motor current and the measured motor speed on the motor power graph.

The method 362 also includes determining, using the electronic processor 302, whether the motor unit 10 is operating in a no-load condition for a pre-determined period of time based on the point on the motor power curve (at block 378). The motor 36 may be operating at full power (or 100% duty cycle) or at a selected power or duty cycle corresponding to the position of the user input device 322. The amount of current flowing to the motor 36 is proportional to the load on the motor 36. That is, when there is a high load on the motor unit 10, the motor 36 draws higher current from the battery pack 50 and when there is a lighter load on the motor unit 10, the motor 36 draws lower current from the battery pack 50. The electronic processor 302 determines the load on the motor unit 10 based on the point on the motor power curve. For example, for a measured speed, the electronic processor 302 determines whether the measured current is below a current threshold corresponding to the measured speed. When the measured current is below the current threshold, the electronic processor 302 determines that the motor unit 10 is operating in a no-load condition and, when the measured current is above the current threshold, the electronic processor 302 determines that the motor unit 10 is not operating in a no-load condition. The electronic processor 302 may then further determine whether the motor unit 10 is operating in the no-load condition for the pre-determined period of time. For example, the electronic processor 302 determines whether the measured current is below the current threshold corresponding to the measured speed for the pre-determined period of time.

The method 362 further includes, in response to determining that the motor unit 10 is operating in the no-load condition for a pre-determined period of time, reducing, using the electronic processor 302, the motor speed of the motor 36 to a no-load speed (at block 382). As discussed above, the electronic processor 302 may provide control signals to the power switching network 310 to control the speed of the motor 36 by selecting a particular pulse width modulated (PWM) duty cycle for driving the power switching network 310. The speed control may be open loop or closed loop. The electronic processor 302 may also shut-off (i.e., reduce the duty cycle to zero) the motor when the electronic processor 302 determines that the motor unit 10 is operating in the no-load condition for the pre-determined period of time. In one example, the electronic processor 302 reduces the speed of the motor 36 to a no-load speed by reducing a duty cycle of the pulse width modulated signals provided to the power switching network 310 to 5%, 10%, or 15%. The method 362 also includes, in response to determining that the motor unit 10 is not operating in the no-load condition for the pre-determined period of time, operating, using the electronic processor 302, the motor 36 at a loaded speed that is greater than the no-load speed (at block 386). For example, to operate at the loaded speed, the electronic processor 302 controls the power switching network 310 to operate the motor 36 according to the power or speed corresponding to the position of the user input device 322 or at full power (i.e., 100% duty cycle) (for example, when the motor unit 10 does not include a variable speed trigger). After block 382 and 386, respectively, the electronic processor 302 may loop back to execute block 366, thus providing continued load-based operation control throughout an operation of the motor unit 10.

Figure 23:
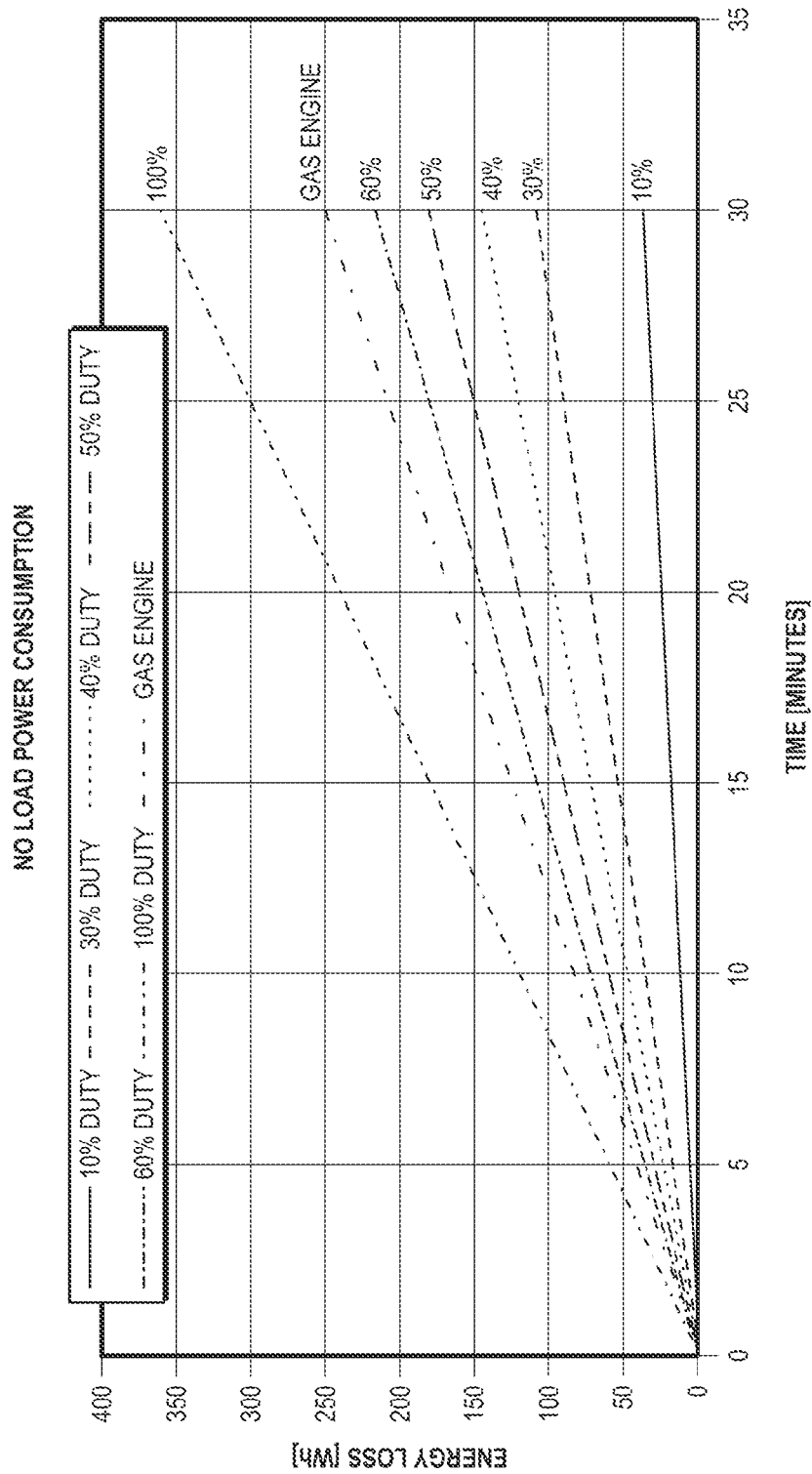
FIG. 23 is a graphical illustration of power savings offered by the motor unit of FIG. 1 implementing the method of FIG. 22.

Typical gasoline engines that drive power equipment are not controlled to reduce speed or power when the gasoline engine is operating in a no-load condition. Accordingly, gasoline engines continue to burn excess amounts of fuel and expend energy even when the gasoline engines are operating under no-load. The electronic processor 302 executing the method 362 detects when the motor unit 10 is operating under no-load and reduces the motor speed or power to provide additional energy savings and then returns to normal power when loaded to meet the demand of a task. In one example, as shown in FIG. 23, by reducing the duty cycle to 10% in the no-load condition, the motor unit 10 provides energy savings of about 5 times that of a gasoline engine operating at no-load. Energy saving resulting from other reduced duty cycle levels are also illustrated in FIG. 23.

During operation of gas engines, an excessive input force exerted on the gas engine or a large load encountered by the power equipment powered by the gas engine may cause a resistive force impeding further operation of the gas engine. For example, a gas engine encountering higher than usual loads may have its motor slowed or bogged-down because of the excessive load. This bog-down of the motor can be sensed (e.g., felt and heard) by a user, and is a helpful indication that an excessive input, which may potentially damage the gas engine or the power equipment, has been encountered. In contrast, high-powered electric motor driven units, similar to the motor unit 10, for example, do not innately provide the bog-down feedback to the user. Rather, in these high-powered electric motor driven units, excessive loading of the motor unit 10 causes the motor to draw excess current from the power source or battery pack 50. Drawing excess current from the battery pack 50 may cause quick and potentially detrimental depletion of the battery pack 50.

Figure 24:
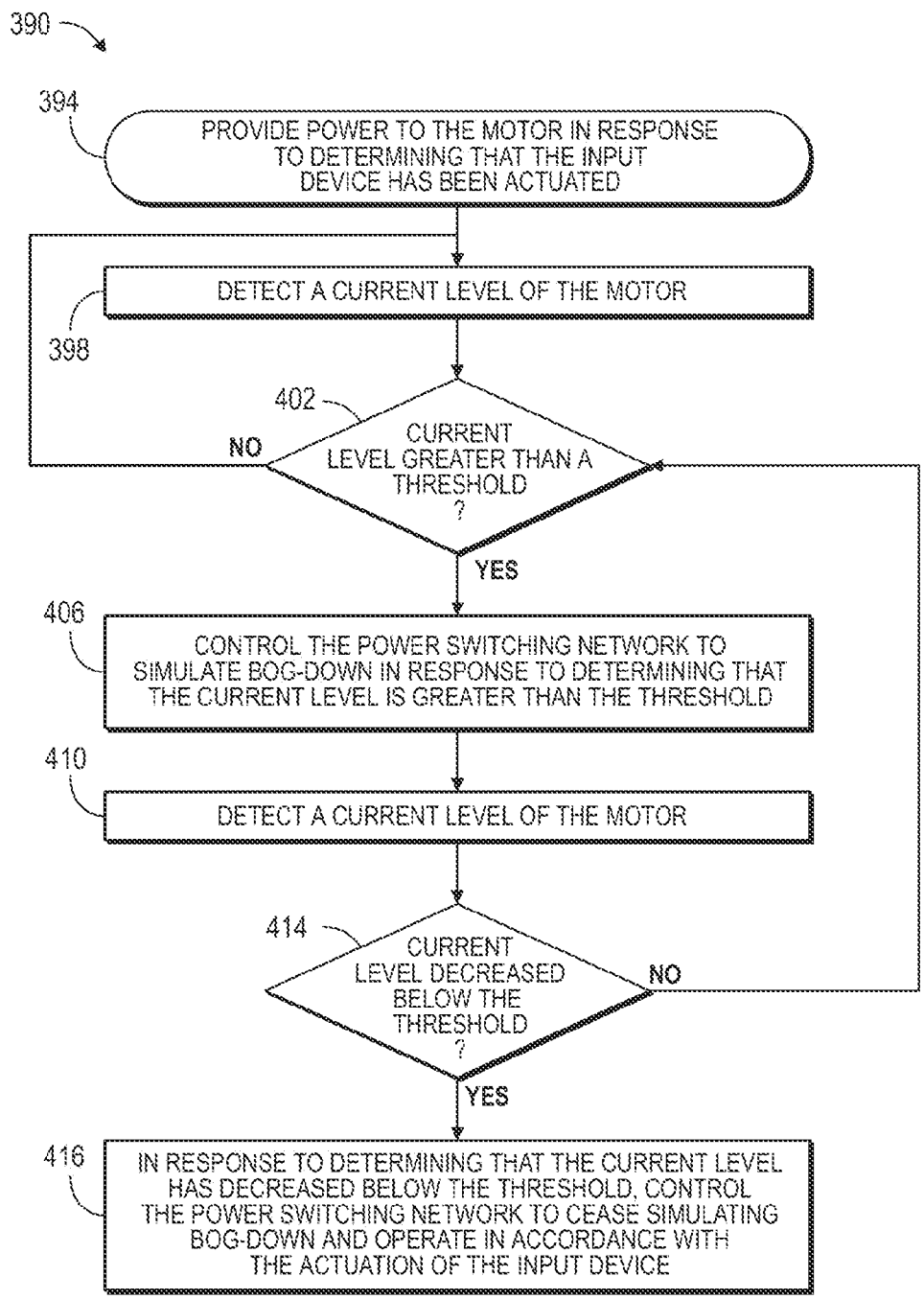
FIG. 24 is a flowchart of a method for providing simulated bog-down operation of the motor unit of FIG. 1 that is similar to actual bog-down experienced by gas engines.

Accordingly, in some embodiments, the motor unit 10 includes a simulated bog-down feature to provide an indication to the user that excessive loading of the motor unit 10 or power equipment is occurring during operation. FIG. 24 illustrates a flowchart of a method 390 for providing simulated bog-down operation of the motor unit 10 that is similar to actual bog-down experienced by gas engines.

The method 390 includes controlling, using the electronic processor 302, the power switching network 310 to provide power to the motor 36 in response to determining that the user input device 322 has been actuated (at block 394). For example, the electronic processor 302 provides a PWM signal to the FETs of the power switching network 310 to drive the motor 36 in accordance with the drive request signal from the user input device 322. The method 390 further includes detecting, using the current sensor 318, a current level of the motor 36 (at block 398). Block 398, at least in some embodiments, may be performed using similar techniques as described above for block 366 with respect to FIG. 22. The method 390 also includes comparing, using the electronic processor 302, the current level to a bog-down current threshold (at block 402). In response to determining that the current level is lower than the bog-down current threshold, the method 390 proceeds back to block 398 such that the electronic processor 302 repeats blocks 398 and 402 until the current level is greater than the bog-down current threshold.

In response to determining that the current level is greater than the bog-down current threshold, the method 390 includes controlling, using the electronic processor 302, the power switching network 310 to simulate bog-down (at block 406). In some embodiments, the electronic processor 302 controls the power switching network 310 to decrease the speed of the motor 36 to a non-zero value. For example, the electronic processor 302 reduces a duty cycle of the PWM signal provided to the FETs of the power switching network 302. In some embodiments, the reduction in the duty cycle (i.e., the speed of the motor 36) is proportional to an amount that the current level is above the bog-down current threshold (i.e., an amount of excessive load). In other words, the more excessive the load of the motor unit 10, the further the speed of the motor 36 is reduced by the electronic processor 302. For example, in some embodiments, the electronic processor 302 determines, at block 406, the difference between the current level of the motor 36 and the bog-down current threshold to determine a difference value. The electronic processor 302 determines the amount of reduction in the duty cycle based on the difference value (e.g., by using a look-up table that maps the difference value to a motor speed or duty cycle).

In some embodiments, at block 406, the electronic processor 302 controls the power switching network 310 in a different or additional manner to provide an indication to the user that excessive loading of the motor unit 10 is occurring during operation. In such embodiments, the behavior of the motor 36 may provide a more noticeable indication to the user that excessive loading of the motor unit 10 is occurring than the simulated bog-down described above. As one example, the electronic processor 302 controls the power switching network 310 to oscillate between different motor speeds. Such motor control may be similar to a gas engine-powered power equipment stalling and may provide haptic feedback to the user to indicate that excessive loading of the motor unit 10 is occurring. In some embodiments, the electronic processor 302 controls the power switching network 310 to oscillate between different motor speeds to provide an indication to the user that very excessive loading of the motor unit 10 is occurring. For example, the electronic processor 302 controls the power switching network 310 to oscillate between different motor speeds in response to determining that the current level of the motor 36 is greater than a second bog-down current threshold that is greater than the bog-down current threshold described above with respect to simulated bog-down. As another example, the electronic processor 302 controls the power switching network 310 to oscillate between different motor speeds in response to determining that the current level of the motor 36 has been greater than the bog-down current threshold described above with respect to simulated bog-down for a predetermined time period (e.g., two seconds). In other words, the electronic processor 302 may control the power switching network 310 to simulate bog-down when excessive loading of the motor unit 10 is detected and may control the power switching network 310 to simulate stalling when excessive loading is prolonged or increases beyond a second bog-down current threshold.

With respect to any of the embodiments described above with respect to block 406, other characteristics of the motor unit 10 and the motor 36 may provide indications to the user that excessive loading of the motor unit 10 is occurring (e.g., tool vibration, resonant sound of a shaft of the motor 36, and sound of the motor 36). In some embodiments, these characteristics change as the electronic processor 302 controls the power switching network 310 to simulate bog-down or to oscillate between different motor speeds as described above.

The method 390 further includes detecting, using the electronic processor 302, the current level of the motor 36 (at block 410). The method 390 also includes comparing, using the electronic processor 302, the current level of the motor 36 to the bog-down current threshold (at block 414). When the current level remains above the bog-down current threshold, the method 362 proceeds back to block 402 such that the electronic processor 302 repeats blocks 402 through 414 until the current level decreases below the bog-down current threshold. In other words, the electronic processor 302 continues to simulate bog-down until the current level decreases below the bog-down current threshold. Repetition of blocks 402 through 414 allows the electronic processor 302 to simulate bog-down differently as the current level changes but remains above the bog-down current threshold (e.g., as mentioned previously regarding proportional adjustment of the duty cycle of the PWM provided to the FETs).

When the current level of the motor 36 decreases below the bog-down current threshold (e.g., in response to the user reducing the load on the motor unit 10), the method 390 includes controlling, using the electronic processor 302, the power switching network 310 to cease simulating bog-down and operate in accordance with the actuation of the user input device 322 (i.e., in accordance with the drive request signal from the user input device 322) (at block 416). In other words, the electronic processor 302 controls the power switching network 310 to increase the speed of the motor 36 from the reduced simulated bog-down speed to a speed corresponding to the drive request signal from the user input device 322. For example, the electronic processor 302 increases the duty cycle of the PWM signal provided to the FETs of the power switching network 310. In some embodiments, the electronic processor 302 gradually ramps the speed of the motor 36 up from the reduced simulated bog-down speed to the speed corresponding to the drive request signal from the user input device 322. Then, the method 390 proceeds back to block 394 to allow the electronic processor 302 to continue to monitor the motor unit 10 for excessive load conditions. In some embodiments of the method 390, in block 414, a second current threshold different than the bog-down threshold of block 402 is used. For example, in some embodiments, the bog-down threshold is greater than the second current threshold.

Figure 25:
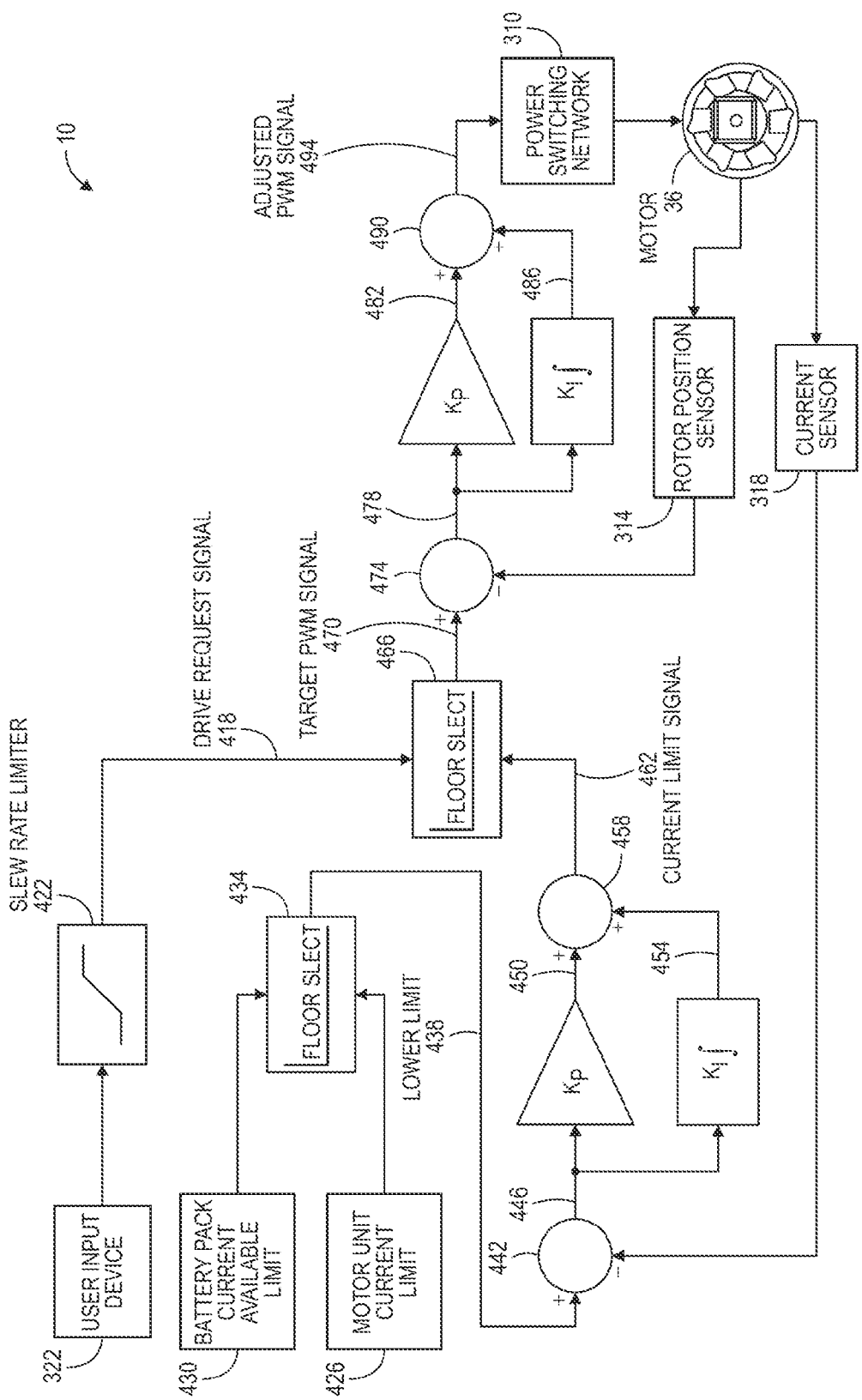
FIG. 25 is a schematic diagram of the motor unit of FIG. 1 that shows how an electronic processor of the motor unit implements the methods of FIG. 24.

FIG. 25 illustrates a schematic control diagram of the motor unit 10 that shows how the electronic processor 302 implements the method 390 according to one example embodiment. The electronic processor 302 receives numerous inputs, makes determinations based on the inputs, and controls the power switching network 310 based on the inputs and determinations. As shown in FIG. 25, the electronic processor 302 receives a drive request signal 418 from the user input device 322 as explained previously herein. In some embodiments, the motor unit 10 includes a slew rate limiter 422 to condition the drive request signal 418 before the drive request signal 418 is provided to the electronic processor 302. The drive request signal 418 corresponds to a first drive speed of the motor 36 (i.e., a desired speed of the motor 36 based on an amount of depression of the user input device 322 or based on the setting of a secondary input device). In some embodiments, the drive request signal 418 is a desired duty ratio (e.g., a value between 0-100%) of the PWM signal for controlling the power switching network 310.

The electronic processor 302 also receives a motor unit current limit 426 and a battery pack current available limit 430. The motor unit current limit 426 is a predetermined current limit that is, for example, stored in and obtained from the memory 306. The motor unit current limit 426 indicates a maximum current level that can be drawn by the motor unit 10 from the battery pack 50. In some embodiments, the motor unit current limit 426 is stored in the memory 306 during manufacturing of the motor unit 10. The battery pack current available limit 430 is a current limit provided by the battery pack 50 to the electronic processor 302. The battery pack current available limit 430 indicates a maximum current that the battery pack 50 is capable of providing to the motor unit 10. In some embodiments, the battery pack current available limit 430 changes during operation of the motor unit 10. For example, as the battery pack 50 becomes depleted, the maximum current that the battery pack 50 is capable of providing decreases, and accordingly, as does the battery pack current available limit 430. The battery pack current available limit 430 may also be different depending on the temperature of the battery pack 50 and/or the type of battery pack 50. Although the limits 426 and 430 are described as maximum current levels for the motor unit 10 and battery pack 50, in some embodiments, these are firmware-coded suggested maximums or rated values that are, in practice, lower than true maximum levels of these devices.

As indicated by floor select block 434 in FIG. 25, the electronic processor 302 compares the motor unit current limit 426 and the battery pack current available limit 430 and determines a lower limit 438 using the lower of the two signals 426 and 430. In other words, the electronic processor 302 implementing a function, floor select 434, determines which of the two signals 426 and 430 is lower, and then uses that lower signal as the lower limit 438. The electronic processor 302 also receives a detected current level of the motor 36 from the current sensor 318. At node 442 of the schematic diagram, the electronic processor 302 determines an error (i.e., a difference) 446 between the detected current level of the motor 36 and the lower limit 438. The electronic processor 302 then applies a proportional gain to the error 446 to generate a proportional component 450. The electronic processor 302 also calculates an integral of the error 446 to generate an integral component 454. At node 458, the electronic processor 302 combines the proportional component 450 and the integral component 454 to generate a current limit signal 462. The current limit signal 462 corresponds to a drive speed of the motor 36 (i.e., a second drive speed) that is based on the detected current level of the motor 36 and one of the motor unit current limit 426 and the battery pack current available limit 430 (whichever of the two limits 426 and 430 is lower). In some embodiments, the current limit signal 462 is in the form of a duty ratio (e.g., a value between 0-100%) for the PWM signal for controlling the power switching network 310.

As indicated by floor select block 466 in FIG. 25, the electronic processor 302 compares the current limit signal 462 and the drive request signal 418 and determines a target PWM signal 470 using the lower of the two signals 462 and 418. In other words, the electronic processor 302 determines which of the first drive speed of the motor 36 corresponding to the drive request signal 418 and the second drive speed of the motor 36 corresponding to the current limit signal 462 is less. The electronic processor 302 then uses the signal 418 or 462 corresponding to the lowest drive speed of the motor 36 to generate the target PWM signal 470.

Figure 26:
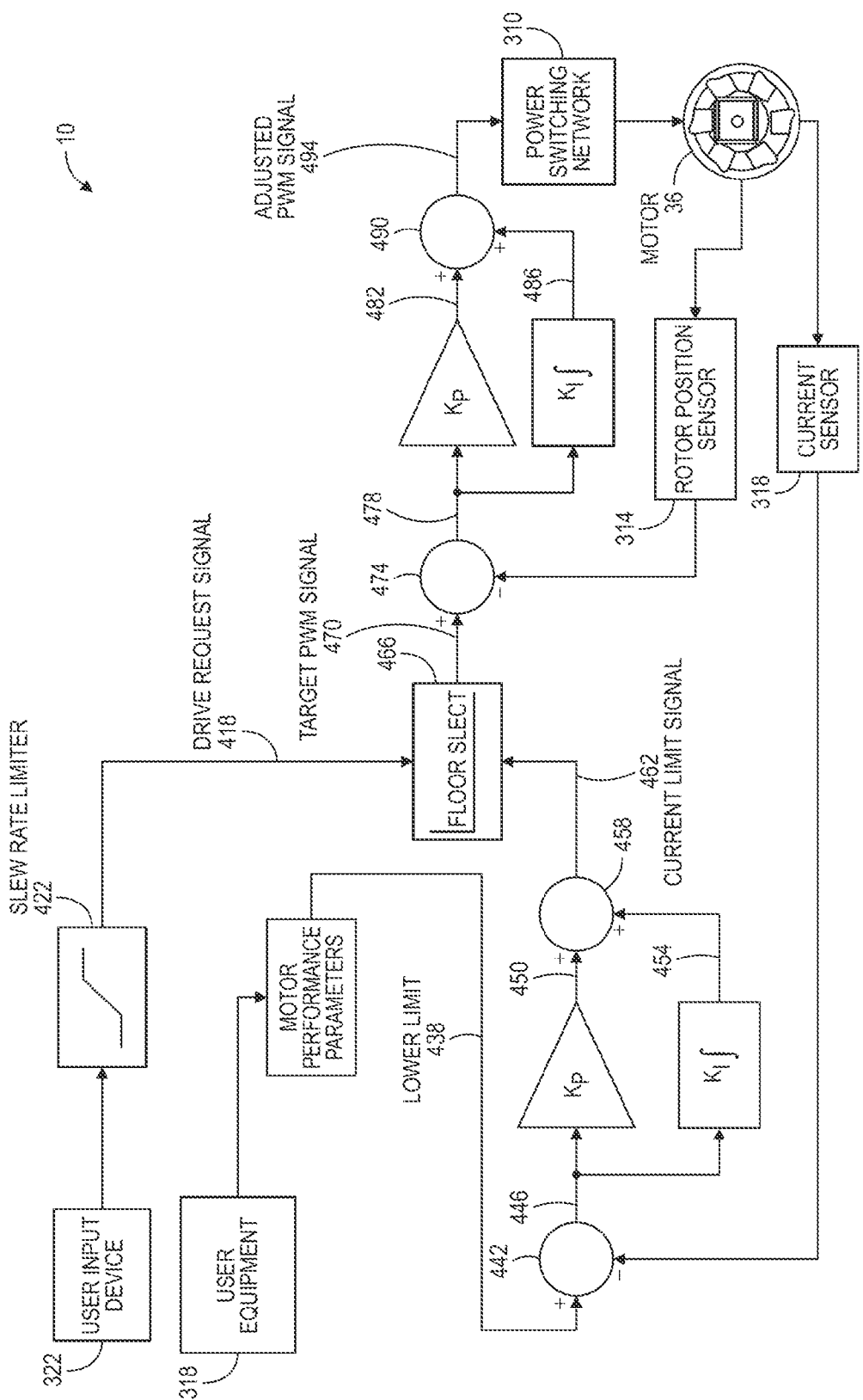
FIG. 26 is a schematic diagram of the motor unit of FIG. 1 that shows how an electronic processor of the motor unit implements the method of FIG. 24 with user customization.

The electronic processor 302 also receives a measured rotational speed of the motor 36, for example, from the rotor position sensor 314. At node 474 of the schematic diagram, the electronic processor 302 determines an error (i.e., a difference) 478 between the measured speed of the motor 36 and a speed corresponding to the target PWM signal 470. The electronic processor 302 then applies a proportional gain to the error 478 to generate a proportional component 482. The electronic processor 302 also calculates an integral of the error 478 to generate an integral component 486. At node 490, the electronic processor 302 combines the proportional component 482 and the integral component 486 to generate an adjusted PWM signal 494 that is provided to the power switching network 310 to control the speed of the motor 36. The components of the schematic diagram implemented by the electronic processor 302 as explained above allow the electronic processor 302 to provide simulated bog-down operation of the motor unit 10 that is similar to actual bog-down experienced by gas engines. In other words, in some embodiments, by adjusting the PWM signal 494 in accordance with the schematic control diagram, the motor unit 10 lowers and raises the motor speed in accordance with the load on the motor unit 10, which is perceived by the user audibly and tactilely, to thereby simulate bog down. FIGS. 25 and 26 illustrate a closed loop speed control of the motor 36. In some embodiments, the method 390 uses open loop speed control of the motor 36. For example, in FIGS. 25 and 26, the method 390 can be adapted for open loop speed control by eliminating node 474, the proportional component 482, the integral component 486, the node 490, and the feedback signal from the rotor positions sensor 314.

FIG. 26 illustrates a schematic control diagram of the motor unit 10 that shows how the electronic processor 302 implements the method 390 according to another example embodiment. The control process illustrated in FIG. 26 is similar to the control process illustrated in FIG. 25. However, rather than determining the lower limit 438 based on the motor unit current limit 426 and the battery pack current available limit 430, the electronic processor 302 determines the lower limit 438 based on an input received from the user equipment 338. For example, the user may define the motor performance on the user equipment 338 by providing current, power, torque, or performance parameters (referred to as motor performance parameters) over the input/output interface of the user equipment 338. The user equipment 338 communicates the motor performance parameters defined by the user to the electronic processor 302 over the communication network 334. The electronic processor 302 determines the lower limit 438 based on the motor performance parameters. For example, the electronic processor 302 uses the current defined in the motor performance parameters as the lower limit 438. The control process shown in FIG. 26 provides the user the ability to customize performance of the motor unit 10 according to the needs of the power equipment.

In some embodiments, the motor performance parameters may be defined based on an application of the motor unit 10. The motor unit 10 may be used to power different kinds of power equipment for different applications. The user may select the application that the motor unit 10 is being used for on the input/output interface 354 of the user equipment 338. The equipment electronic processor 342 may determine the motor performance parameters based on the application selected by the user. For example, the equipment electronic processor 342 may refer to a look-up table in the equipment memory 346 mapping each application of the motor unit 10 to a set of motor performance parameters. The equipment electronic processor 342 may then provide the motor performance parameters to the electronic processor 302. In some embodiments, the user equipment 338 may provide the application selected by the user to the electronic processor 302. The electronic processor 302, rather than the equipment electronic processor 338, may determine the motor performance parameters based on the application selected by the user. For example, the electronic processor 302 may refer a look-up table in the memory 306 mapping each application of the motor unit 10 to a set of motor performance parameters.

Figure 27:
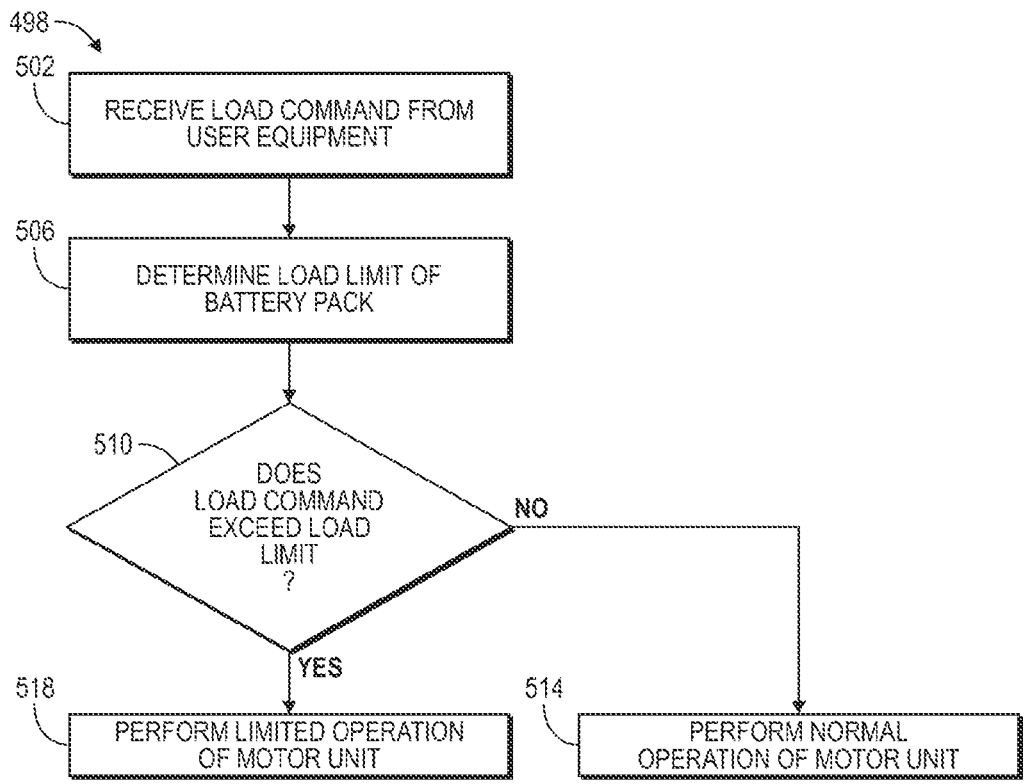
FIG. 27 is a flowchart of a method for checking compatibility of the motor unit of FIG. 1 for a user-selected application.

In some embodiments, the electronic processor 302 may perform a system compatibility check prior to each power-up to determine whether the motor unit 10 is capable of the power outputs defined by the user. FIG. 27 is a flowchart of a method 498 for system compatibility check according to one example embodiment. As shown in FIG. 27, the method 498 includes receiving, via the transceiver 326, a load command from the user equipment 338 (at block 502). For example, the electronic processor 302 receives the motor performance parameters from the equipment electronic processor 342 as described above. The motor performance parameters may include an output power requirement (i.e., the load command) of the motor unit 10. In some embodiments, the load command is a rotation speed of the motor unit 10 (e.g., 5000 RPM). For example, the user may select the rotation speed or an application that maps to the rotation speed on the user equipment 338. The electronic processor 302 determines the amount of load or current draw required to operate the motor at the selected speed (i.e., the load command). The method 498 also includes determining, using the electronic processor 302, a load limit of the battery pack 50 (at block 506). The electronic processor 302 determines the load limit based on, for example, battery type, battery state of charge, battery age, and the like. In some embodiments, the electronic processor 302 determines the load limit based on the battery pack current available limit 430. In some embodiments, the load limit is a maximum speed that can be attained based on the battery conditions. For example, the electronic processor may determine that the maximum rotational speed that can be achieved based on the power available through the battery pack 50 is 4000 RPM.

The method 498 further includes determining, using the electronic processor 302, whether the load command exceeds the load limit (at block 510). The electronic processor 302 compares the load command to the load limit to determine whether the load command exceeds the load limit. In response to determining that the load command does not exceed the load limit, the method 498 includes performing, using the electronic processor 302, normal operation of the motor unit 10 (at block 514). Performing normal operation of the motor unit 10 includes controlling the power switching network 310 to operate the motor 36 according to the load command provided by the user and the input from the user input device 322. For example, the electronic processor 302 provides a PWM signal to the FETs of the power switching network 310 to drive the motor 36 in accordance with the drive request signal from the user input device 322. In response to determining that the load command exceeds the load limit, the method 498 includes performing, using the electronic processor 302, limited operation of the motor unit 10 (at block 518). Performing limited operation may include for example, turning off the motor 36, running the motor 36 with limited power within the load limit of the battery pack 50, or the like. In one example, performing limited operation may include simulating bog-down of the motor unit 10 as described above. In some embodiments, the electronic processor 302 may also warn the user that the load command exceeds the load limit. For example, the electronic processor 302 may provide an indication to the user equipment 338 that the load command exceeds the load limit. The user equipment 338 in response to receiving the indication from the electronic processor 302 provides an audible, tactile, or visual feedback to the user indicating that the load command exceeds the load limit. For example, the user equipment 338 displays a warning text on the input/output interface 354 that the load command exceeds the load limit. In some embodiments, the electronic processor 302 activates the indicators 330 to warn the user that the load command exceeds the load limit. The user may then adjust the load command based on the warning received from the electronic processor 302. After block 514 and 518, respectively, the electronic processor 302 loops back to the block 502.

Figure 28:
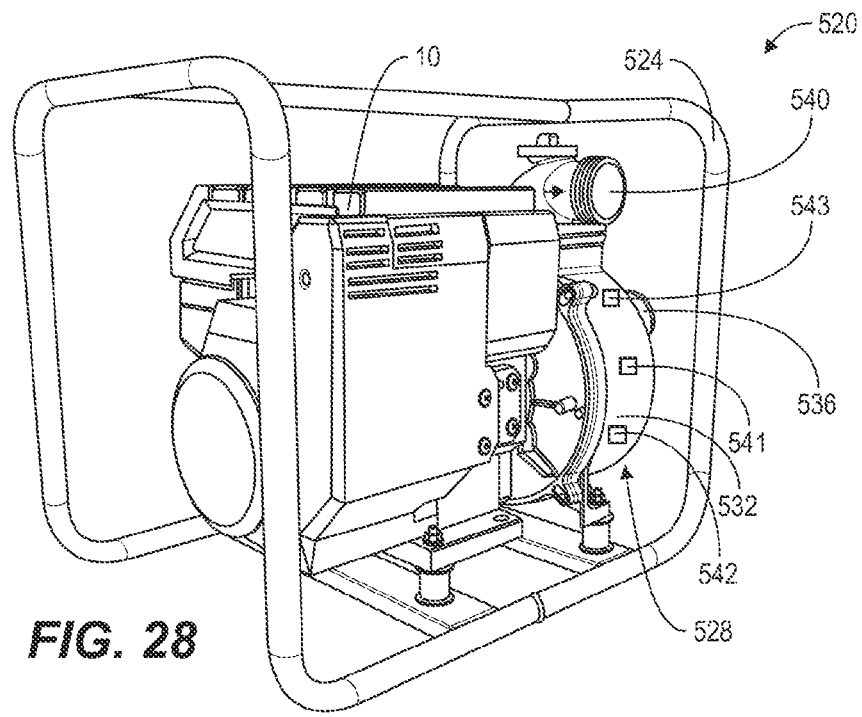
FIG. 28 is a perspective view of a pump system including a stand-alone motor unit of FIG. 42.

FIG. 28 illustrates a pump system 520 including a frame 524 supporting the stand-alone motor unit 10 and a pump 528 with the motor unit 10 operable to drive the pump 528. The illustrated pump 528 is a centrifugal pump having an impeller positioned within a housing 532 of the pump 528 that is rotatable about an axis to move material from an inlet 536 of the pump 528 to an outlet 540 of the pump 528. Specifically, the pump 528 is a "trash pump" that includes enough clearance between the impeller of the pump 528 and the housing 532 (e.g., 8 millimeters) to provide a mixture of a liquid (e.g., water) and debris (e.g., solid material like mud, small rocks, leases, sand, sludge, etc.) to pass through the pump 528 from the inlet 536 to the outlet 540 without the debris getting trapped within the pump 528 and decreasing the performance of the pump system 520. The pump system 520 driven by the motor unit 10 includes many advantages over a conventional pump driven by an internal combustion engine, some of which are discussed below.

The motor unit 10 of the pump system 520:
- drives the pump 528 in two different directions to clear the pump 528 if debris is stuck within the pump 528 (without utilizing a transmission including a forward gear and a rearward gear);
- is operable by AC power (e.g., from a standard 120 volt outlet) or DC power (e.g., from a battery pack) to drive the pump 528 to eliminate a downtime refueling period of the internal combustion engine;
- eliminates an air intake and an exhaust outlet such that the motor unit 10 can be fluidly sealed in a water proof housing;
- is operable in a wider speed range than a comparable internal combustion engine, for example, the motor unit 10 is operable at a lower speed range (e.g., less than 2,000 revolutions per minute) than a comparable internal combustion engine to increase runtime of the motor unit 10, and the motor unit 10 is also operable at a higher speed range (e.g., greater than 3,600 revolutions per minute) than a comparable internal combustion engine to provide a broader output capability;
- operates the pump 528 regardless of the orientation of the motor unit 10, unlike an internal combustion engine that can only can operate in one orientation (e.g., an upright orientation); and
- eliminates fuel and oil to operate—unlike an internal combustion engine—allowing the pump system 520 to run, be transported, or stored at any orientation (e.g., upside down or on its side) without the motor unit 10 leaking oil or flooding with fuel.

In addition, the electronic processor 302 of the motor unit 10 can, for example:
- via first sensors 541 in the pump 528 that are in communication with the electronic processor 302, detect an amount of liquid being moved through the pump 528 to enable operation of the pump 528 if the amount of liquid is at or above a threshold level and automatically stops operation of the pump 528 if the amount of liquid is below the threshold level. However, in other embodiments, the electronic processor 302 can simply monitor the current drawn by the motor 36 to determine whether to slow down or stop the motor 36;
- provide a battery status that at least represents a power level of the battery pack of the motor unit 10;
- be in communication with a remote control to start or stop the motor unit 10 remotely with the remote control including status indicators of the motor unit 10;
- turn ON/OFF the motor unit 10—and ultimately the pump 528, change a speed of the motor unit 10, change a flow rate of liquid and debris exiting the outlet 540, provide a timer (e.g., automatically turn OFF the motor unit 10), provide a delayed start of the motor unit 10—all of which can occur without direct user input (e.g., via sensors or programs);
- be in communication with other power tools to provide tool-to-tool communication and coordination;
- be in communication with a wireless network to track the location of the pump system 520, report the pump system 520 usage and performance data, disable/enable the pump system 520 remotely, change the performance of the pump system 520 remotely, etc.;
- be in communication with digital controls on a customizable user interface (e.g., a touch display) that control, regulate, measure different aspects of the motor unit 10 and/or the pump 528;
- via second sensors 542 on the pump 528 that are in communication with the electronic processor 302 and arranged in an impeller reservoir, monitor suction or fluid level in the impeller reservoir and signal that the pump 528 is not adequately primed or automatically shut off the pump 528 to protect the pump system 520;
- electronically control a valve 543 on the pump 528 to adjust an exhaust opening to support an auto-priming capability;

electronically control the valve 543 to adjust the exhaust opening so that only air exits and slowly reopen the valve 543 until suction is established;

adjust pressure or flow rate of the pump 528 with the speed of the motor unit 10 instead of a throttle; and control a priming mode or "soft start" that optimizes the speed of the impeller of the pump 528 for self-priming, and governing to a slower speed until full suction is achieved.

Test specifications of the pump system 520 appear in Table 7 below:

TABLE 7

| | Full Speed | Low Speed |
|---|---|---|
| Motor Speed (RPM) | 19,627 | 7,452 |
| Average Current (Amperes) | 38.0 | 2.11 |
| Peak Current (95%) (Amperes) | 43 | 2 |
| Instantaneous Peak Current (Amperes) | 46 | 43 |
| Average Voltage (V) | 69.9 | 76.41 |
| Average Power (HP) | 3.56 | 0.22 |
| Peak Power (95%) (HP) | 4.16 | 0.23 |
| Runtime (Minutes) | 9.20 | 96.86 |
| Flow Rate (Gallons per Minute) | 120.3 | 48.9 |
| Total Pumped (Gallons) | 1,098 | 4,753 |

The values listed in Table 7 were measured during a full discharge cycle of the battery pack 50 (i.e., full charge to shutoff due to the voltage of the battery pack 50 dropping below a predetermined value).

Figure 29:
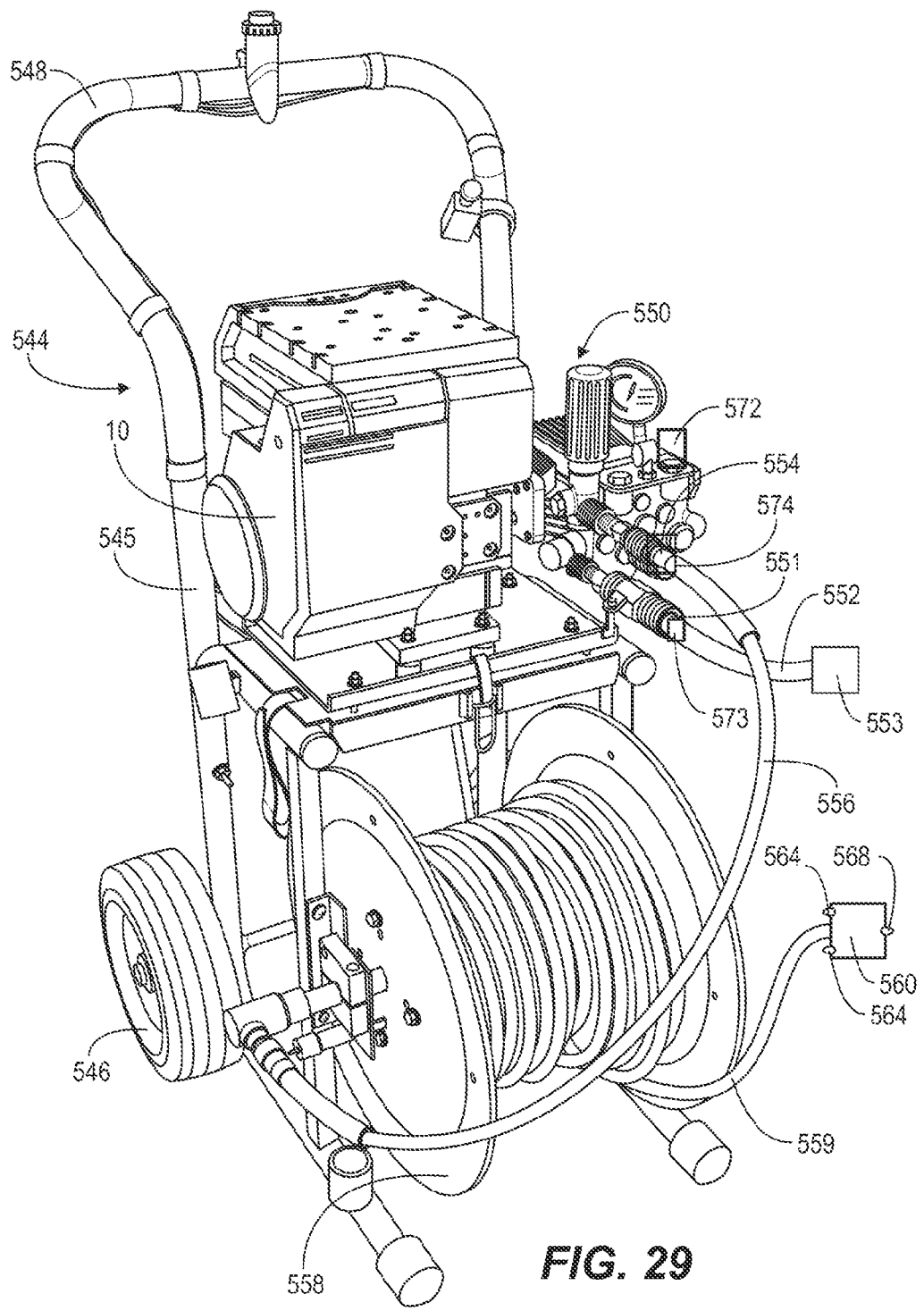
FIG. 29 is a perspective view of a jetter including the stand-alone motor unit of FIG. 42.

FIG. 29 illustrates a jetter 544 including a frame 545 with a pair of wheels 546 and a handle 548. The frame 545 supports the stand-alone motor unit 10 and a pump 550 driven by the motor unit 10. The pump 550 includes an inlet 551 that receives fluid from an inlet line 552 connected to a fluid source 553 (e.g. a spigot or reservoir). The pump 550 also includes an outlet 554 from which an outlet line 556 extends. The frame 545 supports a hose reel 558 that supports a hose 559 that is fluidly coupled to the outlet line 556 and includes a jetter nozzle 560. The hose 559 and jetter nozzle 560 are fluidly coupled with the pump 550 via the outlet line 556, such that the pump 550 pumps fluid from the fluid source 553 to the jetter nozzle 560. The jetter nozzle 560 includes back jets 564 and one or more front jets 568.

In operation, the motor unit 10 drives the pump 550, which supplies water or another fluid from the fluid source 553 to the nozzle 560, such that the back jets 564 of the jetter nozzle 560 propel the jetter nozzle 560 and 559 hose through a plumbing line while front jets 568 of the nozzle 560 are directed forward to break apart clogs in the plumbing line, blasting through sludge, soap, and grease. Once propelled a sufficient distance through the plumbing line, an operator may use the hose reel 558 to retract the hose 559 and jetter nozzle 560 back through the plumbing line, while the pump 550 continues to supply fluid to the back and front jets 564, 568 to break up debris in the line and flush debris therethrough. The jetter 544 including the motor unit 10 possesses advantages over a conventional jetter with an internal combustion engine, some of which are discussed below. For instance, the motor unit 10 can be pulsed to clear a jam in the plumbing line.

In addition, the electronic processor 302 of the motor unit 10 can, for example:

Communicate with fluid level sensors 572 on the pump 550 to detect whether an adequate level of fluid is available;

Communicate with inlet and outlet sensors 573, 574 respectively located at the inlet and outlet lines 552, 556 to prevent the motor unit 10 from being activated until the inlet and outlet lines 552, 556 for the pump 550 are sufficiently bled of air;

adjust pressure or flow rate of the pump 550 with the speed of the motor unit 10 instead of a throttle or regulator; and turn ON/OFF the motor unit 10—and ultimately the pump 550, change a speed of the motor unit 10, change a flow rate of liquid through the pump 550, provide a timer (e.g., automatically turn OFF the motor unit 10), provide a delayed start of the motor unit 10—all of which can occur without direct user input (e.g., via sensors or programs).

Test specifications of the jetter 544 appear in Table 8 below:

TABLE 8

| | Full Speed |
|---|---|
| Motor Speed (RPM) | 17,773 |
| Average Current (Amperes) | 55.7 |
| Peak Current (95%) (Amperes) | 64 |
| Instantaneous Peak Current (Amperes) | 67 |
| Average Voltage (V) | 65.4 |
| Average Power (HP) | 5.29 |
| Peak Power (95%) (HP) | 6.18 |
| Runtime (Minutes) | 5.7 |
| Peak Jet Pressure (PSI) | 2070 |

The values listed in Table 8 were measured during a full discharge cycle of the battery pack 50 (i.e., full charge to shutoff due to the voltage of the battery pack 50 dropping below a predetermined value).

Figure 30:
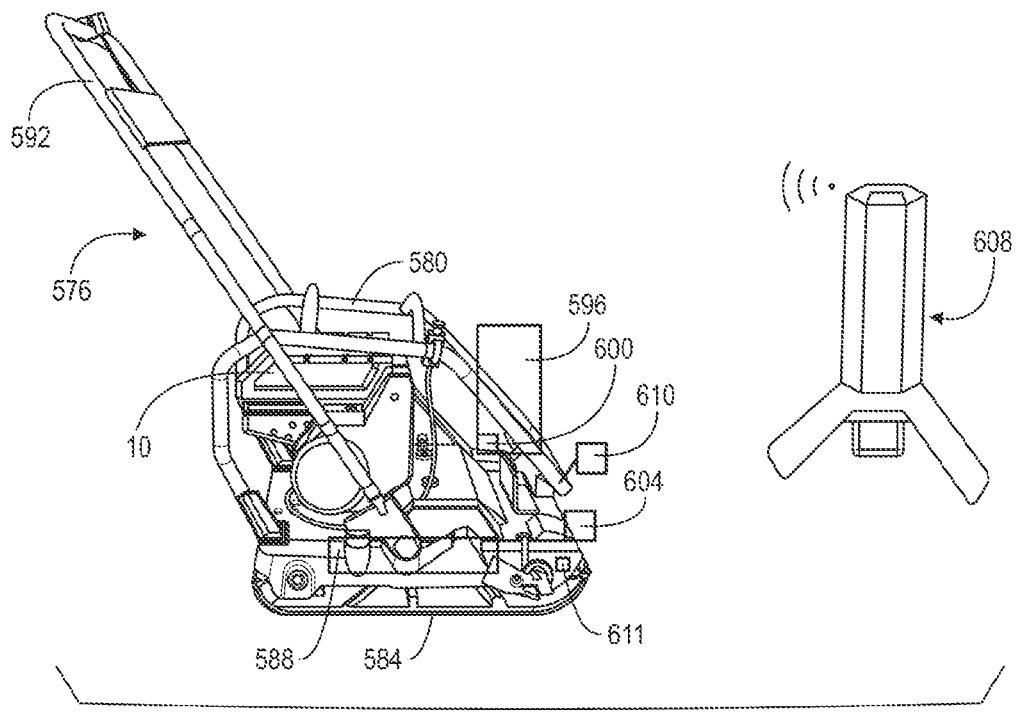
FIG. 30 is a perspective view of a compactor including the stand-alone motor unit of FIG. 42.

FIG. 30 illustrates a compactor 576 including a frame 580 supporting the stand-alone motor unit 10, a vibrating plate 584, and a vibration mechanism 588 intermediate the motor unit 10 and vibrating plate 584, such that the motor unit 10 can drive the vibration mechanism 588 to drive the vibrating plate 584. The frame 580 includes a handle 592 and also supports a water tank 596 with a valve 600 through which water or other liquid can be applied to the surface to be compacted or the vibrating plate 584. In some embodiments, the compactor 576 includes a paint sprayer 604 to spray and demarcate lines or boundaries in and around the compacting operation.

In operation, an operator can grasp the handle 592 and activate the motor unit 10 to drive the vibrating plate 584 to compact soil or asphalt, including granular, mixed materials that are mostly non-cohesive. During operation, the operator may control the valve 600 to allow water from the water tank 596 to be applied to the compacted surface, such that in some applications, the water allows the compacted particles to create a paste and bond together, forming a denser or tighter finished surface. In addition, the water from the water tank 596 prevents asphalt or other material from adhering to the vibrating plate 584 during operation.

The compactor 576 can be used in parking lots and on highway or bridge construction. In particular, the compactor 576 can be used in construction areas next to structures, curbs and abutments. The compactor 576 can also be used for landscaping for subbase and paver compaction. The compactor 576 including the motor unit 10 possesses advantages over a conventional compactor with by an internal combustion engine, some of which are discussed below. For instance, the motor 36 of the motor unit 10 can run forward or reverse, allowing the operator to shift directional bias of the vibration mechanism 588. Thus the vibration mechanism 588 is configured to move or "walk" itself forward or reverse, depending on how the operator has shifted the directional bias of the vibration mechanism 588.

In addition, the electronic processor 302 of the motor unit 10 can, for example:
- sense the levelness of compaction, such as the grade or pitch, by communicating with an auxiliary sensor device such as a surveying and grading tool 608;
- sense the degree of compactness, such as whether the material being compacted is loose or sufficiently tight, by communicating with an auxiliary or onboard device 610 such as a durometer probe, ultrasound, accelerometer, or gyroscope. However, in other embodiments, the electronic processor 302 can simply monitor the current drawn by the motor 36 to sense the level of compactness;
- turn ON/OFF the motor unit 10—and ultimately the vibration mechanism 588, change a speed of the motor unit 10, and output direction and steering of the compactor system 576;
- use sensors 611 on the compactor system 576 that are in communication with the electronic processor 302 to detect where a compacted surface dips and in response, control the paint sprayer 604 to mark where more material is needed at the detected dip; and
- control the valve 600 of the water tank 596 to adjust the flow rate to the vibrating plate or compacted surface.

Test specifications of the compactor 576 appear in Table 9 below:

TABLE 9

|  | Full Speed |
| --- | --- |
| Motor Speed (RPM) | 19,663 |
| Average Current (Amperes) | 26.4 |
| Peak Current (95%) (Amperes) | 32 |
| Instantaneous Peak Current (Amperes) | 52 |
| Average Voltage (V) | 71.9 |
| Average Power (HP) | 2.55 |
| Peak Power (95%) (HP) | 3.24 |
| Runtime (Minutes) | 12.78 |

The values listed in Table 9 were measured during a full discharge cycle of the battery pack 50 (i.e., full charge to shutoff due to the voltage of the battery pack 50 dropping below a predetermined value).

Figure 31:
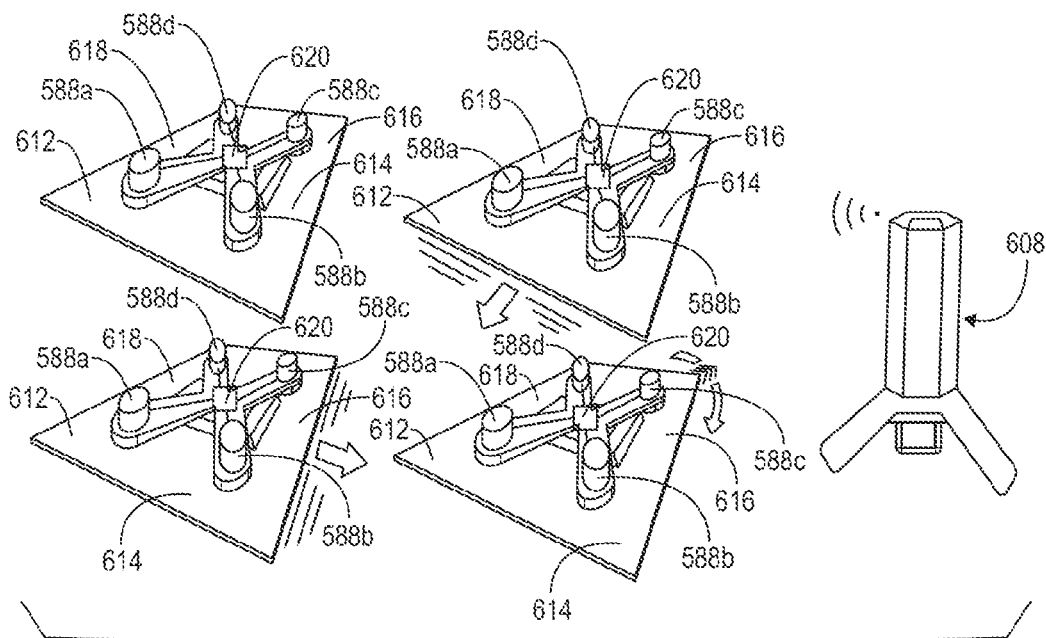
FIG. 31 is a schematic view of a vibration mechanism of the compactor of FIG. 30.

In another embodiment of a compactor 576 shown schematically in FIG. 31, the vibration mechanism 588 is a multi-motor drive system with four separate vibration mechanisms 588a, 588b, 588c, 588d, each having its own motor and each configured to respectively vibrate an individual quadrant 612, 614, 616, 618 of the vibrating plate 584. Each vibration mechanism 588a, 588b, 588c, 588d, is controlled by a controller 620 of the compactor 576. Thus, depending on readings from the auxiliary or onboard sensor devices 608, 610 described above, the controller 620 can select which quadrant 612, 614, 616, 618 requires vibration. In some embodiments, the controller 620 may receive instructions from an operator via, e.g., a remote control. In some embodiments, the controller 620 can control the vibration mechanisms 588a, 588b, 588c, 588d to move the compactor 576 forward or reverse, as well as steer or turn the compactor 576 via the vibration plate 584.

Figure 32:
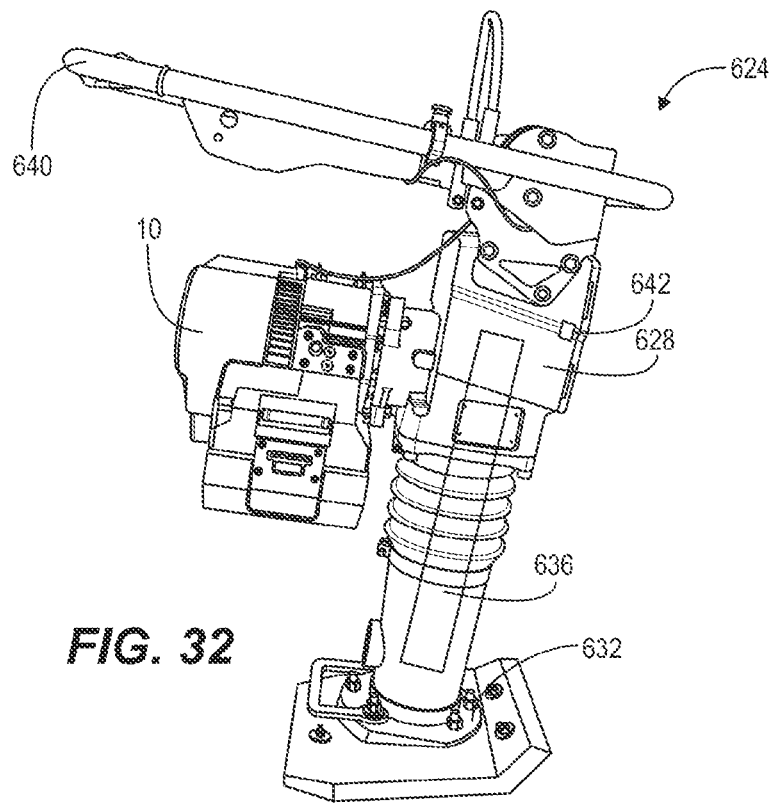
FIG. 32 is a perspective view of a rammer including the stand-alone motor unit of FIG. 42.

FIG. 32 illustrates a rammer 624 including a body 628 supporting the stand-alone motor unit 10, a vibrating plate 632, and a vibration mechanism 636 intermediate the motor 10 and vibrating plate 632, such that the motor unit 10 can drive the vibration mechanism 636 to drive the vibrating plate 632. The rammer 624 includes a handle 640 extending from the body 628 to enable an operator to manipulate the rammer 624.

In operation, an operator can grasp the handle 640 and activate the motor unit 10 to drive the vibrating plate 632 to compact cohesive and mixed soils in compact areas, such as trenches, foundations and footings. The rammer 624 including the motor unit 10 possesses advantages over a conventional rammer driven with an internal combustion engine, some of which are discussed below.

For instance, the electronic processor 302 of the motor unit 10 can, for example:
- turn ON/OFF the motor unit 10—and ultimately the vibration mechanism 636, change a speed of the motor unit 10;
- provide a delayed start of the motor unit 10—all of which can occur without direct user input (e.g., via sensors or programs); and
- utilize preset modes for compacting soft, hard, loose, or tight material.

The electronic processor 302 can also input data from sensors 642 on the rammer 624 to detect whether the frequency and/or amplitude of the vibrating plate is within a predetermined range, such that the control electronics 42 can precisely control the speed of the motor unit 10 and adjust the frequency of vibration of the vibration mechanism 636. In this manner, the electronic processor 302 can prevent amplified vibration or resonance and ensure that the rammer 624 is under control when the operator wishes to lower the output speed and reduce the rate of compaction. Also, this ensures that vibration energy is being efficiently transferred into the surface material instead of the operator.

Test specifications of the rammer 624 appear in Table 10 below:

TABLE 10

|  | Full Speed |
| --- | --- |
| Motor Speed (RPM) | 19,863 |
| Average Current (Amperes) | 19.7 |
| Peak Current (95%) (Amperes) | 28 |
| Instantaneous Peak Current (Amperes) | 56 |
| Average Voltage (V) | 72.7 |
| Average Power (HP) | 1.92 |
| Peak Power (95%) (HP) | 2.76 |
| Runtime (Minutes) | 15.73 |

The values listed in Table 10 were measured during a full discharge cycle of the battery pack 50 (i.e., full charge to shutoff due to the voltage of the battery pack 50 dropping below a predetermined value).

Figure 33:
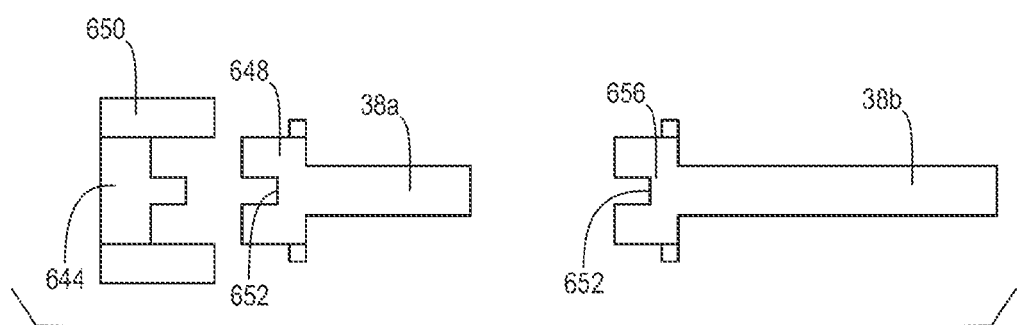
FIG. 33 is a schematic view of coupling arrangement for a gear train of the motor unit of FIG. 42 and a female shaft subassembly.

As shown in FIG. 33, in some embodiments, the gear train 110 of the motor unit 10 includes a terminal male shaft section 644 to which a first female shaft subassembly 648 can mount within a gearbox 650 of the motor unit 10. The first female shaft subassembly 648 includes a first power take-off shaft 38a configured to drive a first tool and a female socket 652 that mates with the male shaft section 644. In the embodiment of FIG. 33, a second female shaft subassembly 656 is provided with the female socket 652 and a second power take-off shaft 38b configured to drive a second tool that is different than the first tool. Thus, the first and second female shaft subassemblies 648, 656 may be conveniently swapped in and out of mating relationship with the male shaft section 644 to allow an operator to quickly and conveniently adapt the motor unit 10 to drive different first and second tools. In contrast, a typical gas engine does not permit such quick or convenient replacement of the power take-off shaft.

Figure 34:
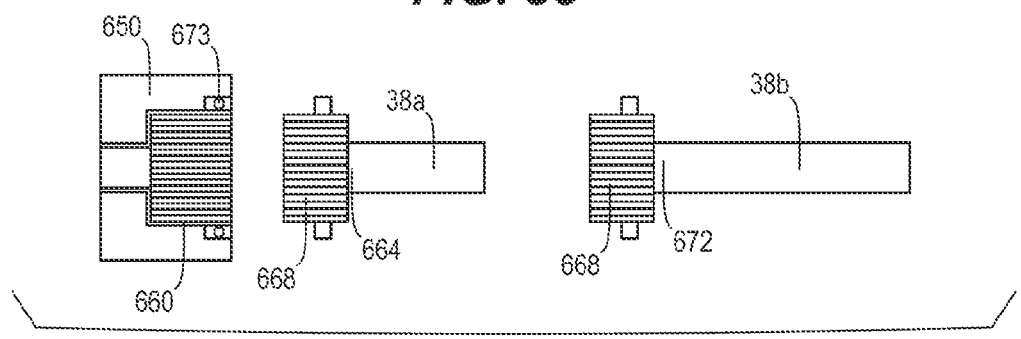
FIG. 34 is a schematic view of coupling arrangement for a gear train of the motor unit of FIG. 42 and a male shaft subassembly.

As shown in FIG. 34, in some embodiments, the gear train 110 of the motor unit 10 includes a terminal female shaft section 660 to which a first male shaft subassembly 664 can mount within the gearbox 650 of the motor unit 10. The first male shaft subassembly 664 includes the first power take-off shaft 38a configured to drive the first tool and a male shaft section 668 that mates with the female shaft section 660. In the embodiment of FIG. 34, a second male shaft subassembly 672 is provided with the male shaft section 668 and the second power take-off shaft 38b configured to drive the second tool. Thus, the first and second male shaft subassemblies 664, 672 may be conveniently swapped in and out of mating relationship with the female shaft section 660 to allow an operator to quickly and conveniently adapt the motor unit 10 to drive different first and second tools. In contrast, a typical gas engine does not permit such quick or convenient replacement of the power take-off shaft. In some embodiments, the male shaft section 668 mates with the female shaft section 660 via a splined connection. In the embodiment illustrated in FIG. 34, the first and second male shaft subassemblies 664, 672 are axially retained to the gearbox 650 via a retaining ring 673 on the gearbox 650.

Figure 35:
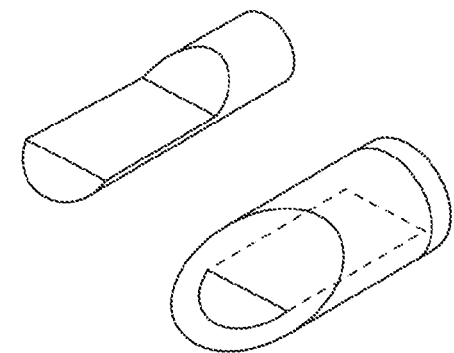
FIG. 35 is a perspective view of a half-circle shaft with female bore coupling arrangement for the coupling mechanism of FIG. 33 or 34.
Figure 36:
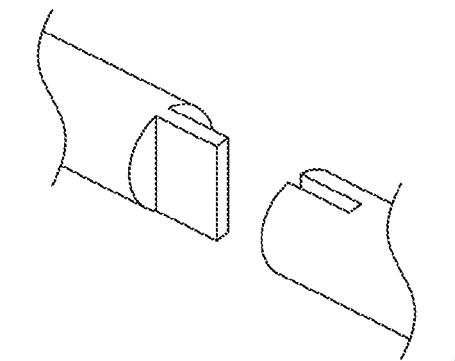
FIG. 36 is a perspective view of a tongue and groove coupling arrangement for the coupling mechanism of FIG. 33 or 34.
Figure 37:
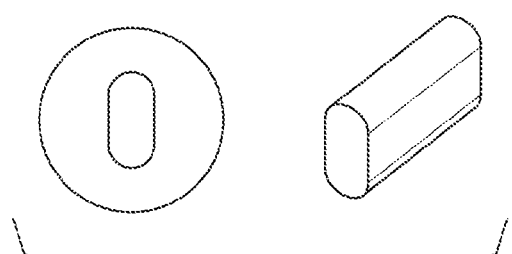
FIG. 37 is a perspective view of a double D coupling arrangement for the coupling mechanism of FIG. 33 or 34.
Figure 38:
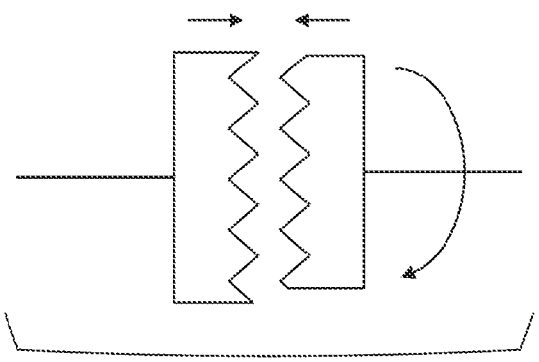
FIG. 38 is a perspective view of a serrated coupling arrangement for the coupling mechanism of FIG. 33 or 34.

In some embodiments, the female socket 652 mates with the male shaft section 644, and the male shaft section 668 mates with the female shaft section 660, via any of the following connection methods: spline-fit (FIG. 34), keyed, half-circle shaft w/female bore (FIG. 35), tongue & groove (FIG. 36), double "D" (FIG. 37), face ratchet bolted together, Morse taper, internal/external thread, pinned together, flats and set screws, tapered shafts, or serrated connections (FIG. 38).

Figure 39:
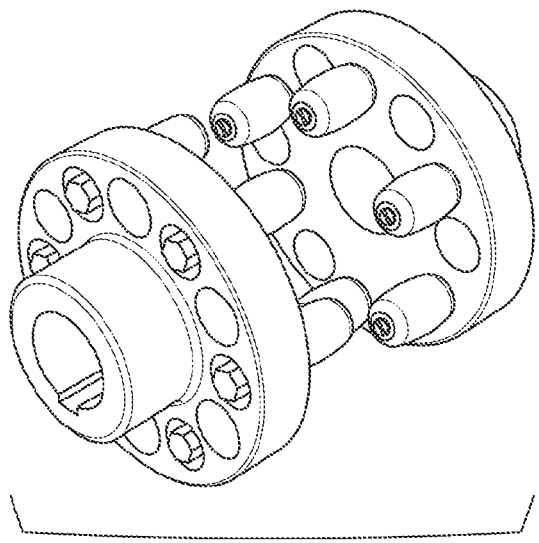
FIG. 39 is a perspective view of a peg coupling arrangement for the coupling mechanism of FIG. 33 or 34.
Figure 40:
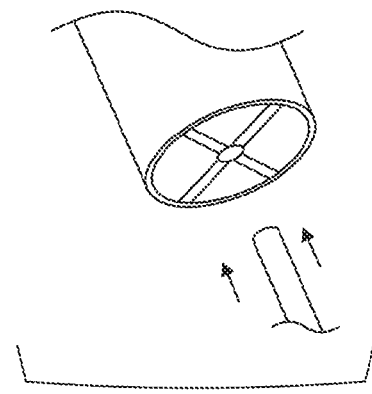
FIG. 40 is a perspective view of a female collar with radial fasteners coupling arrangement for the coupling mechanism of FIG. 33 or 34.

In some embodiments, different types of power take-off shaft subassemblies 38 may couple to the gear train 110 using a quick-connect structure similar to any of the following applications: modular drill, pneumatic quick connect, socket set-style, ball-detent hex coupling, drill chuck, pins filling gaps around shaft, hole saw arbor. In some embodiments, different types of power take-off shaft subassemblies 38 may couple to the gear train 110 using one of the following coupling structures: Spring coupling, c-clamp style, love joy style, plates w/male/female pegs (FIG. 39), or female collar with radial fasteners (FIG. 40).

Figure 41:
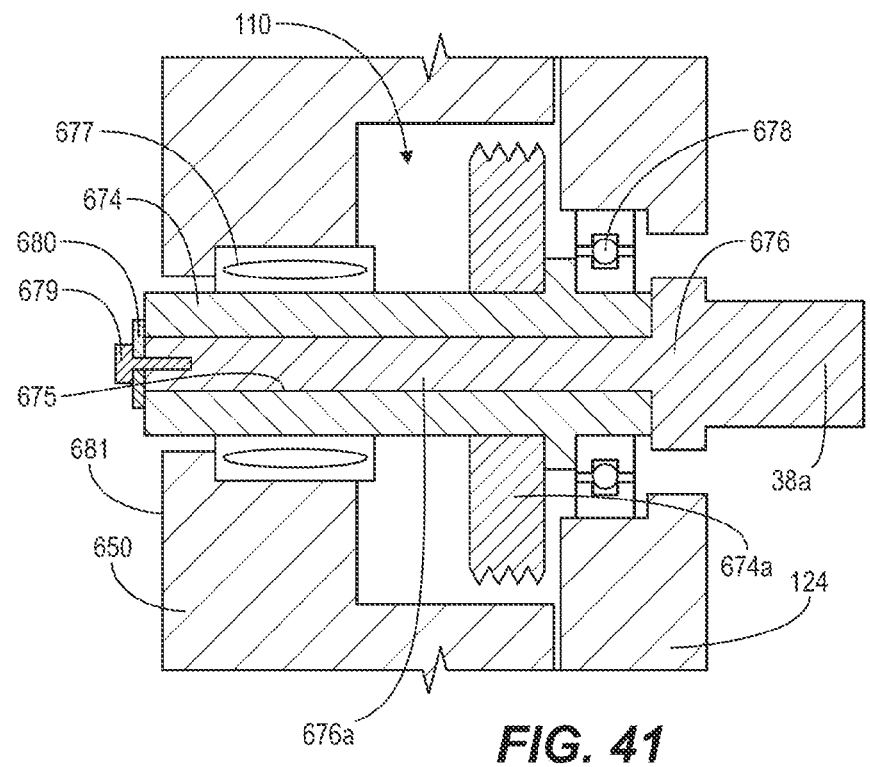
FIG. 41 is a cross-sectional view of a coupling arrangement for a gear train of the motor unit of FIG. 1 and a male shaft subassembly.

In another embodiment shown in FIG. 41, the geartrain 110 includes a female shaft section 674 with a gear 674a and an elongate bore 675 for receiving a stem 676a of a first male shaft subassembly 676 having the first power take-off shaft 38a. The female shaft section 674 is rotatably supported in the gearbox 650 by first and second bearings 677, 678. Once received in the elongate bore 675, the first male shaft subassembly 676 is axially secured to the female shaft section 674 via a fastener 679 inserted into the stem 676a of the first male shaft subassembly 676a while securing a washer 680 between the fastener 679 and the stem 676a of the first male shaft subassembly 676. Thus, unlike the embodiments of FIGS. 33 and 34, the embodiment of FIG. 41 requires the operator to access a side 681 of the gearbox 650 opposite the faceplate 124 to access the fastener 679. In the embodiment of FIG. 41, a second male shaft subassembly having the second power take-off shaft 38b can be inserted in lieu of the first male shaft subassembly 676 to allow an operator to conveniently adapt the motor unit 10 to drive different first and second tools. In contrast, a typical gas engine does not permit such quick or convenient replacement of the power take-off shaft.

Figure 43:
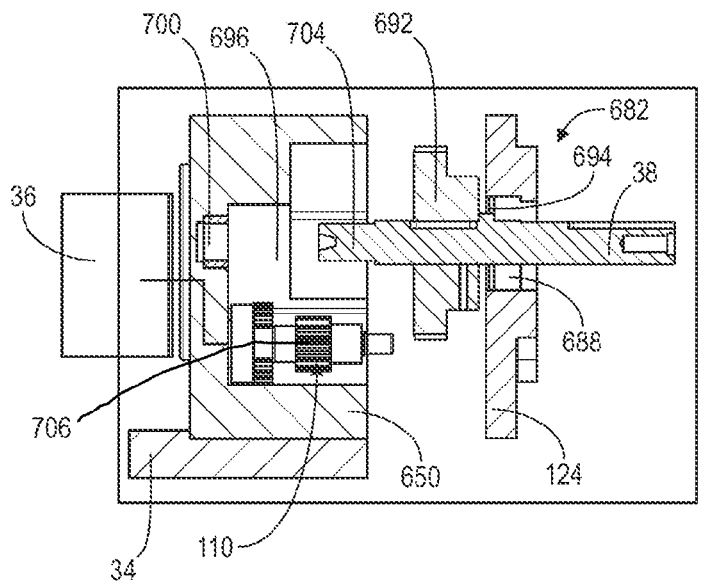
FIG. 43 is a cross-sectional view of a coupling arrangement for a gear train of the motor unit of FIG. 1 and a shaft subassembly.

In an embodiment shown in FIG. 43, a shaft subassembly 682 may be removably coupled to the gearbox 650. Specifically, the shaft subassembly 682 includes the faceplate 124, the power take-off shaft 38 rotatably supported by a first bearing 688 in the faceplate 124, and a first gear 692 arranged on and coupled for rotation with the power take-off shaft 38. In some embodiments, the power take-off shaft 38 is axially constrained with respect to the faceplate 124 with a retaining ring 694. The shaft subassembly 682 is removably received in a recess 696 of the gearbox 650. The recess 696 includes a second bearing 700 for rotatably supporting an end 704 of the power take-off shaft 38 within the recess 696 when the shaft subassembly 682 is received in the recess 696 and coupled to the gearbox 650.

Also, when the shaft subassembly 682 is received in the recess 696 and coupled to the gearbox 650, the first gear 692 is engaged with an upstream gear 706 of the gear train 110, the faceplate 124 covers the gear train 110 and the first gear 692 is the final drive gear of the gear train 110, such that the gear train 110 can drive the power take-off shaft 38 using a first overall reduction ratio. When the shaft subassembly 682 is removed from the gearbox 650, the first gear 692 can be replaced with a second gear, and the upstream gear 706 of the gear train 110 that engages with the first gear 692 can be changed as well. Using the second gear with the shaft subassembly 682 and a different gear as the upstream gear results in a second overall reduction ratio of the gear train 110. The second overall reduction ratio is different than the first overall reduction ratio, such that an operator can reconfigure the shaft subassembly 682 for driving different tools by swapping between the first gear 692 and the second gear. Also, when the shaft subassembly 682 is removed from the gearbox 650, at least a portion of the gear train 110 is exposed, thus enabling an operator to replace, repair, or access certain gears within the gear train 110, such as the upstream gear 706. In other embodiments, instead of just the first gear 692, the entire shaft subassembly 682 can be changed out for a different subassembly to change the reduction ratio.

Figure 44:
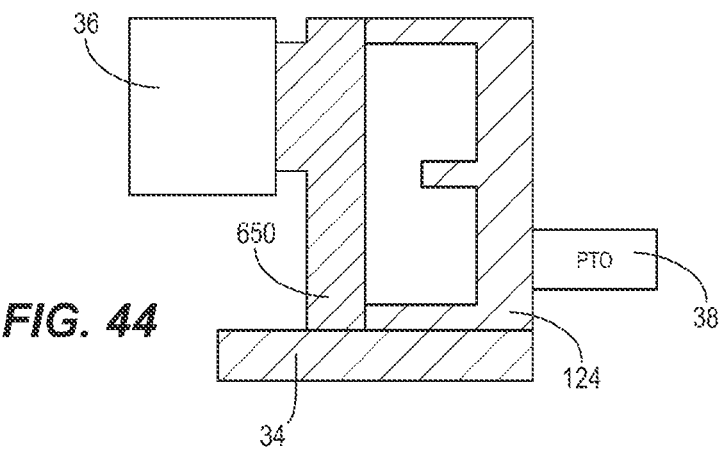
FIG. 44 is a cross-sectional view of a coupling arrangement for a gear train of the motor unit of FIG. 1 and a shaft subassembly.

As shown in FIG. 43, the motor 36 mounts to a portion of the gearbox 650 that has a generally C-shaped cross-section, and the faceplate 124 is part of a shaft subassembly 682 including the power take-off shaft 38, with the faceplate 124 being generally planar. In an alternative embodiment shown in FIG. 44, the geometries are swapped from those of the embodiment of FIG. 43. Specifically, the motor 36 mounts to a portion of the gearbox 650 having a generally planar cross-section and the faceplate 124 has a generally reverse-C-shaped cross-section.

Figure 45:
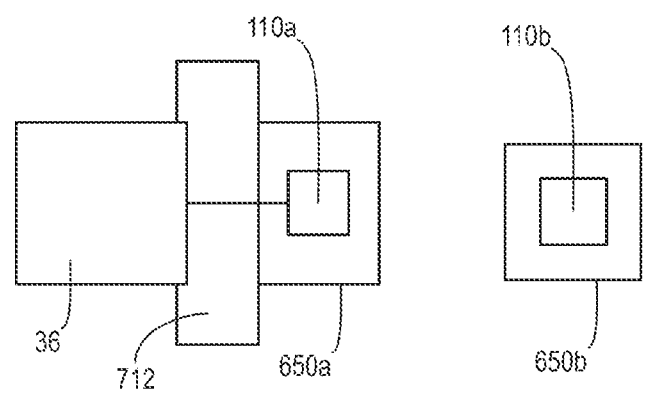
FIG. 45 is a schematic view of a mounting arrangement for a motor and a gearbox of the motor unit of FIG. 42.

As shown in FIG. 45, in some embodiments, a first gearbox 650a with a first gear train 110a is removably attachable to an adapter plate 712 adjacent the motor 36 in the housing 14, such that the output shaft 106 of the motor 36 can drive the first gear train 110a when the first gearbox 650a is attached to the adapter plate 712. A second gearbox 650b with a second gear train 110b that has a different reduction ratio than the first gear train 110a is also removably attachable to the adapter plate 712. Thus, depending on what tool an operator wishes to drive with the motor unit 10, an operator can select either the first or second gearboxes 650a, 650b. In some embodiments, the first and second gearboxes 650a, 650b can attach to the adapter plate 712 via a bayonet connection. In some embodiments, there are a plurality of additional gearboxes respectively having different gear trains than the first and second gear trains 110a, 110b, each of the additional gearboxes being attachable to the adapter plate 712.

Figure 46:
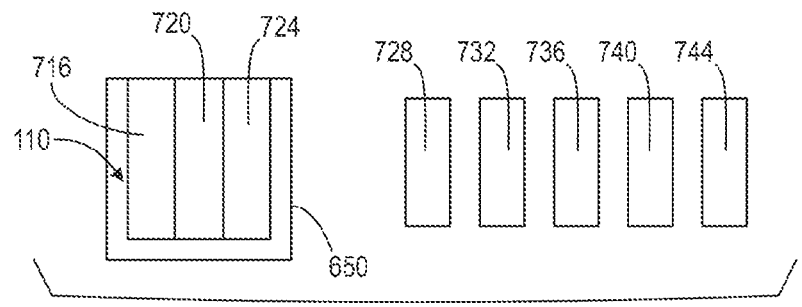
FIG. 46 is a schematic view of a gearbox and geartrain of the motor unit of FIG. 42.

Instead of swappable gearboxes 650a, 650b as in the embodiment of FIG. 45, and instead of embodiments of FIGS. 19 and 43 that allow an operator to change or replace individual gears, in some embodiments the gear train 110 in the gearbox 650 includes a transmission allowing an operator to shift gear sets to change the reduction ratio. In some embodiments, the gear train 110 in the gearbox 650 has a predetermined number of stages that can be arranged in different combinations to produce different outputs. For example, as shown in FIG. 46, the gearbox 650 might include three slots 716, 720, 724 for accepting cartridge-style gear stages 728, 732, 736, 740, 744 (e.g., planetary stages). Thus, depending on the output that an operator desires from the gear train 110, the operator can selectively insert three of the five stages 728, 732, 736, 740, 744 into the three slots 716, 720, 724 in a particular order depending on which tool the operator wishes the motor unit 10 to drive.

Figure 47:
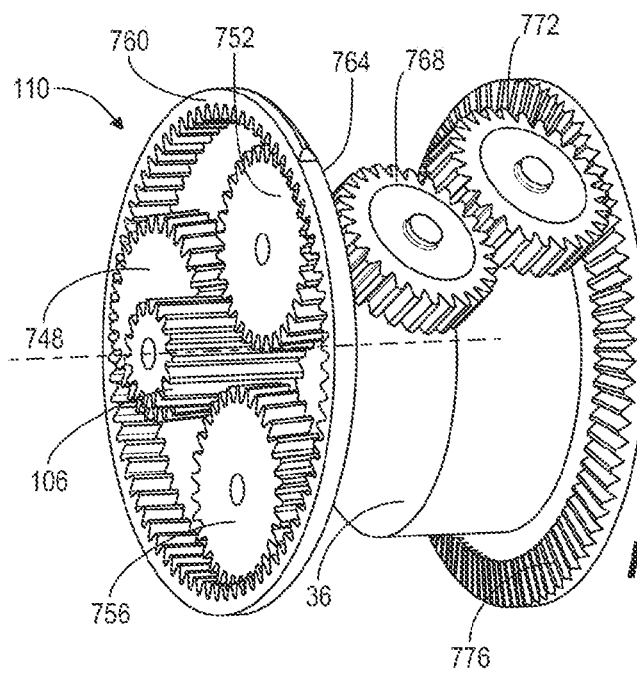
FIG. 47 is a perspective view of an arrangement of a motor and a geartrain of the motor unit of FIG. 42.

As shown in FIG. 47, in some embodiments, the motor 36 is enveloped within the gear train 110 in the gearbox 650. Specifically, the output shaft 106 of the motor 36 acts as a sun gear with three planetary gears 748, 752, 756 between the output shaft 106 and a ring gear 760 that includes a first face gear 764. First and second spur gear 768, 772 are arranged between the first face gear 764 and a second face gear 776.

Figure 48:
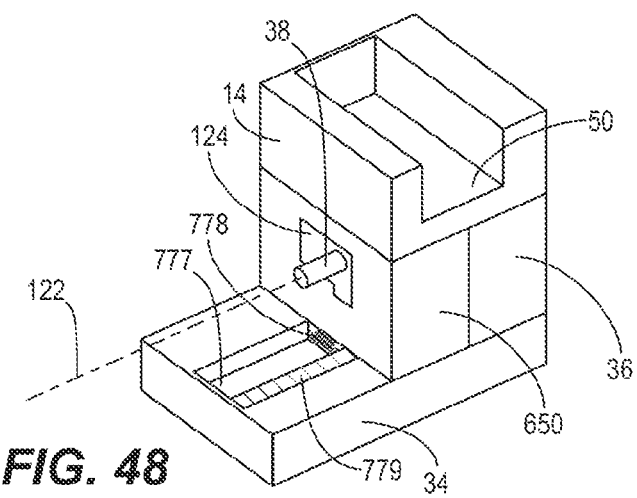
FIG. 48 is a perspective view of a motor unit according to another embodiment of the invention.

As shown in FIG. 48, in some embodiments, the flange 34 is configured to translate all or part of the housing 14 and gearbox 650 with respect to the flange 34 to provide freedom for varying geometries of the power take-off shaft 38. For instance, the flange 34 may include a groove 777 for receipt of a tongue 778 of the housing or gearbox 650 to permit lateral translation. In some embodiments, a locking mechanism 779 may be included to lock the housing 14 at a particular position with respect to the flange 34. The lateral translation of housing 14 with respect to flange 34 permits an operator to slide the housing 14 in a direction away from the tool to which the motor unit 10 is mounted, then service or remove the power take-off shaft 38, without having to decouple the flange 34 from the tool. In some embodiments, the housing 14 can translate with respect to the flange 34 in a direction parallel to, perpendicular to, or both parallel and perpendicular to the rotational axis 122 of the power take-off shaft 38.

Figure 49:
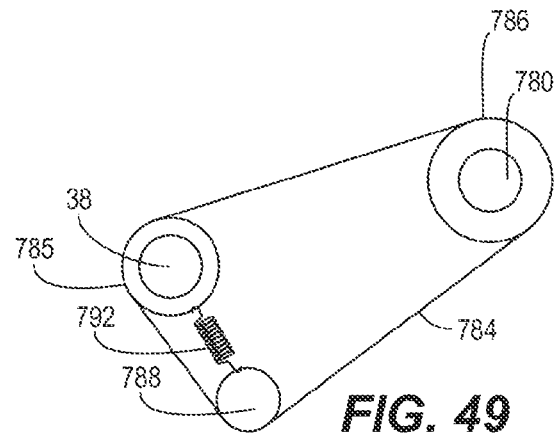
FIG. 49 is a schematic view of a coupling arrangement between a power take-off shaft of the motor unit of FIG. 42 and a tool input shaft.

As shown in FIG. 49, in some embodiments, the power take-off shaft 38 is coupled to an input shaft 780 of a tool via an endless drive member 784 (e.g., a belt or chain) that is coupled to first and second pulleys 785, 786 that are respectively arranged on the power take-off shaft 38 and input shaft 780. In the embodiment of FIG. 49, the motor unit 10 also includes a tensioner 788 with a spring 792 to adjust the tension of the endless drive member 784. In some embodiments, the first pulley 785 can be arranged on the input shaft 780 and the second pulley 786 can be arranged on the power take-off shaft 38 to produce a different gear reduction ratio.

Figure 50:
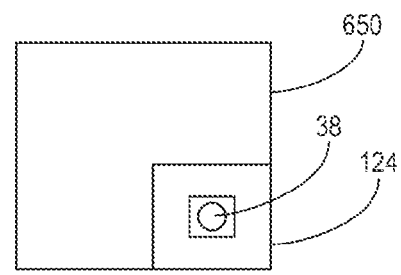
FIG. 50 is a schematic view of a gearbox of the motor unit of FIG. 42.

As shown in FIG. 50, in some embodiments, the gearbox 650 is sectioned to have a quartile faceplate 124 that allows for access to only the power take-off shaft 38.

Figure 51:
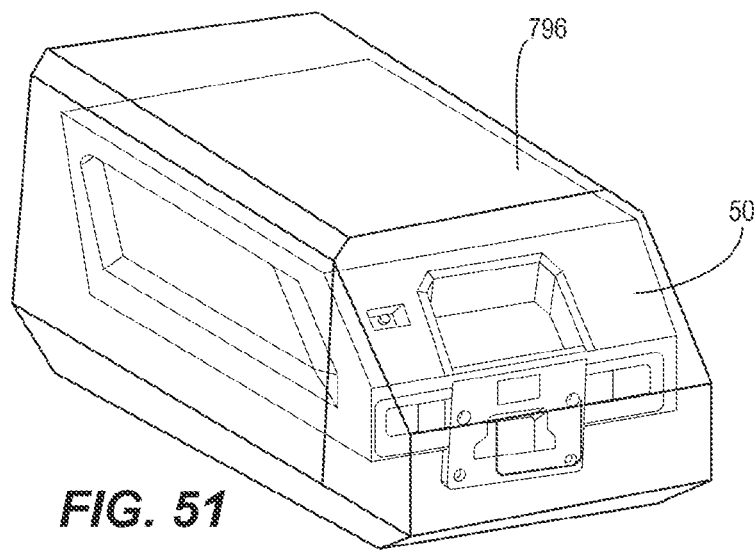
FIG. 51 is a perspective view of the battery of FIG. 4 in a cover.
Figure 52:
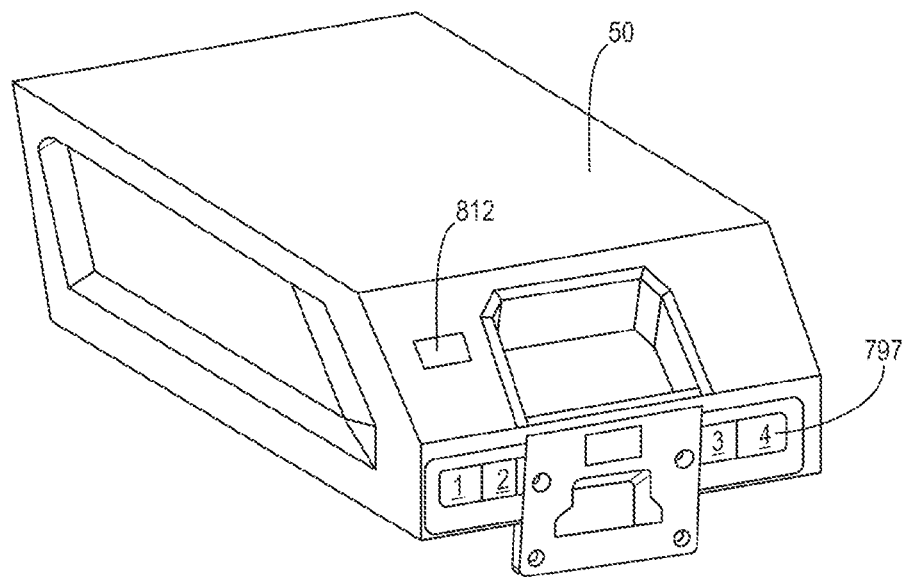
FIG. 52 is a perspective view of a battery for the motor unit of FIG. 42.

As shown in FIG. 51, in some embodiments, the battery 50 can be stored within a cover 796 to protect the electronics from the ingress of water or moisture. In some embodiments, the cover 796 is a hard case cover 796. As shown in FIG. 52, in some embodiments, the battery 50 includes a system lock out apparatus, such as a keypad 797 or a key, which can be utilized to prevent unauthorized individuals from accessing the battery 50, for example, in a scenario in which the battery 50 has been rented along with the motor unit 10.

Because the control electronics 42 of the motor unit 10 don't require intake of ambient air for combustion or exhaust of noxious gases, the control electronics 42 can be fully sealed within a fully sealed waterproof compartment within housing 14. As shown in FIG. 42a, in some embodiments, the housing 14 includes doors 798 that can open and close at various locations on the housing 14 to allow an operator to quickly reconfigure where the air intake and exhaust ports are located for cooling of the motor 36. In some embodiments, the motor unit 10 can operate using AC power from a remote power source, or DC power via the battery 50. Additionally, the motor unit 10 may include an AC power output 799, as a passthrough or inverted to AC power, for connection with an AC power cord of a power tool. In some embodiments, the housing 14 includes inlets 801 (FIG. 42a) for pressurized air for cleaning or to supplement a cooling airflow.

In some embodiments, the motor unit 10 can be mated with a new tool (e.g. one of the pump system 520, jetter 544, compactor 576, or rammer 624) and the memory 306 can be reprogrammed to optimize the motor unit 10 for operation with the new tool. In some embodiments, the electronic processor 302 automatically recognizes which type of new tool the motor unit 10 has been mated with, and governs operation of the motor unit 10 accordingly. In some embodiments, the electronic processor 302 can automatically detect with which tool the motor unit 10 has been mated via Radio Frequency Identification (RFID) communication with the new tool. In another embodiment, the tool may be detected with a resistor inserted into a plug connected to the electronic processor 302. For example, a resistor between 10K and 20K ohms would indicate to the electronic processor 302 that the motor unit 10 system was connected to a power trowel or other tool.

In yet another embodiment, the tool may be detected with a multi-position switch (e.g., a 10-position rotary switch). Each position on the switch would correspond with a different type of tool system.

In yet another embodiment, the tool may be detected with a user interface on the motor unit 10 in which a user selects, from a pre-programmed list, the make and model of tool to which the motor unit 10 is attached. The motor unit 10 would then apply the appropriate system controls for the tool.

In some embodiments, the memory 306 is reprogrammable via either BLUETOOTH or Wi-Fi communication protocols. In some embodiments, the electronic processor 302 has control modes for different uses of the same tool. The control modes may be preset or user-programmable, and may be programmed remotely via BLUETOOTH or Wi-Fi. In some embodiments, the electronic processor 302 utilizes master/slave tool-to-tool communication and coordination, such that the motor unit 10 can exert unidirectional control over a tool, or an operator can use a smartphone application to exert unidirectional control over the motor unit 10.

In some embodiments, the operator or original equipment manufacturer (OEM) is allowed limited access to control the speed of the motor unit 10 through the electronic processor 302 via, e.g., a controller area network (CAN)-like interface. In some embodiments, the electronic processor 302 is capable of a wider range of speed selection with a single gear set in the gear train 110 than a gasoline engine. For example, the control electronics 42 are configured to drive the motor 36 at less than 2,000 RPM, which is lower than any speed a gasoline engine is capable of, which permits the associated tool to have a greater overall runtime over a full discharge of the battery 50, than a gasoline engine. Additionally the control electronics 42 are configured to drive the motor at more than 3,600 RPM, which is higher than any speed a gasoline engine is capable of, and with the capability to deliver more torque. The wider range of speeds of motor 36 offers greater efficiency and capability than a gasoline engine. In some embodiments, the operator could have access to control the current drawn by the motor 36 in addition to the speed.

In some embodiments, the electronic processor 302 is configured to log and report data. For example, the electronic processor 302 is configured to provide wired or wireless diagnostics for monitoring and reading the status of the motor unit 10. For example, the electronic processor 302 can monitor and log motor unit 10 runtime for example, in a rental scenario. In some embodiments, the motor 36 and the electronic processor 302 use regenerative braking to charge the battery 50. In some embodiments, the motor unit 10 includes a DC output 803 for lights or accessories (FIG. 42). In some embodiments, the electronic processor 302 can detect anomalies or malfunctions of the motor unit 10 via voltage, current, motion, speed, and/or thermocouples. In some embodiments, the electronic processor 302 can detect unintended use of or stoppage of the motor unit 10. If the tool driven by the motor unit 10 (e.g. one of the pump system 520, jetter 544, compactor 576, or rammer 624) is not running with the intended characteristics or is not being used correctly or safely, the electronic processor 302 can detect the anomaly and deactivate the motor unit 10. For example, the motor unit 10 can include one or more accelerometers to sense if the motor unit 10 and tool is in the intended orientation. And, if the electronic processor 302 determines that the motor unit 10 is not in the intended orientation (i.e. the tool has fallen over), the electronic processor 302 can deactivate the motor unit 10.

In some embodiments, the motor unit 10 includes accessible sensor ports 802 (FIG. 42) to electrically connect with user-selected sensors for use with the piece of power equipment, such as accelerometers, gyroscopes, GPS units, or real time clocks, allowing an operator to customize the variables to be sensed and detected by the electronic processor 302. In some embodiments, the electronic processor 302 can indicate the status of the battery 50, such as when the battery is running low, to an operator via visual, audio, or tactile notifications. In some embodiments, the electronic processor 302 can operate an auxiliary motor that is separate from the motor 36 to drive an auxiliary device such as a winch. The auxiliary motor may be internal or external to the motor unit 10.

Figure 53:
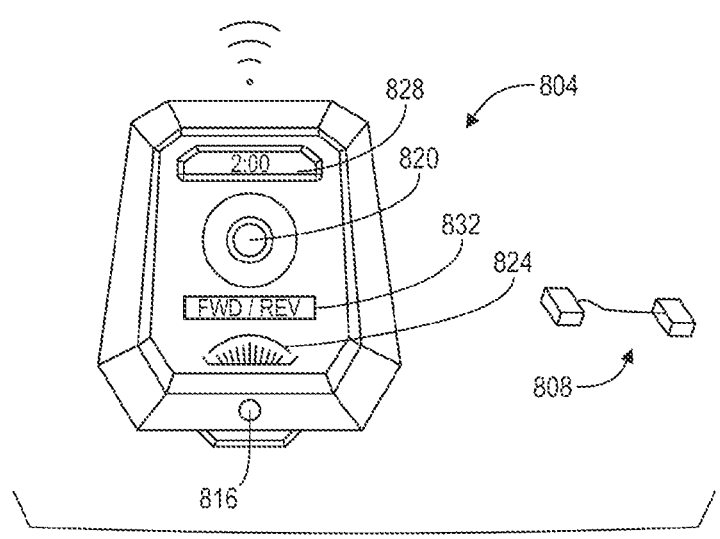
FIG. 53 is a plan view of a remote control for use with the motor unit of FIG. 42.

In some embodiments, the motor unit 10 can include digital controls on a customizable user interface, such as a touch display or a combination of knobs and buttons. In contrast, an analog gasoline engine does not include such digital controls. In some embodiments, the user interface for the motor unit 10 can be modular, wired, or wireless and can be attachable to the motor unit 10 or be hand held. In some embodiments, the motor unit 10 can be controlled with a remote control 804 that includes status indicators for certain characteristics of the motor unit 10, such as charge of the battery 50 and the temperature, as shown in FIG. 53. In some embodiments, the motor unit 10 can provide status indications with a remote, programmable device. In some embodiments, the remote control 804 can include a USB cord 808 that plugs into a USB port 812 on the battery 50 (FIG. 52), or a USB port elsewhere on the motor unit 10, such that the remote control 804 can be charged by the battery 50. In some embodiments the remote control 804 can be charged wirelessly from the battery 50. The remote control 804 can include a variety of controls, such as:

a button 816 to turn the motor unit 10 on or off;
a joystick 820 to steer the tool (e.g., the compactor 576);
a dial 824 to adjust the flow rate of the tool (e.g. the pump system 520 or jetter 544);
a timer 828 for a delayed start or stop of the tool; and
a switch 832 to select forward or reverse directions of the power take-off shaft 38.

The remote control 804 can also control the operating pressure of the tool (e.g. the pump system 520 or jetter 544), or other operating characteristics of the tool.

In an embodiment shown in FIGS. 54-58, the housing 14 of the motor unit 10 is split into a base 836 having the first, second, third, fourth, fifth, and sixth sides, 18, 22, 26, 28, 30, 32, and a battery module 840 that is removably coupled to the base 836. As explained in further detail below (with ref to FIGS. 78-82), the motor unit 10 of FIGS. 54-58 has a different faceplate 124' than the faceplate 124. The battery module 840 includes the battery receptacle 54 for receiving the battery pack 50, as described above. The battery module 840 also includes a pair of opposed side walls 844, a rear wall 848, and a front wall 852 opposite the rear wall 848. The side walls 844 are longer than the rear and front walls 848, 852, such that the battery module 844 defines a battery module axis 854 that is parallel to the side walls 844. The battery pack 50 is removable from the battery receptacle 54 by sliding the battery pack 50 in a direction away from the rear wall 848 in a direction parallel to or coaxial with the battery module axis 854.

Figure 56:
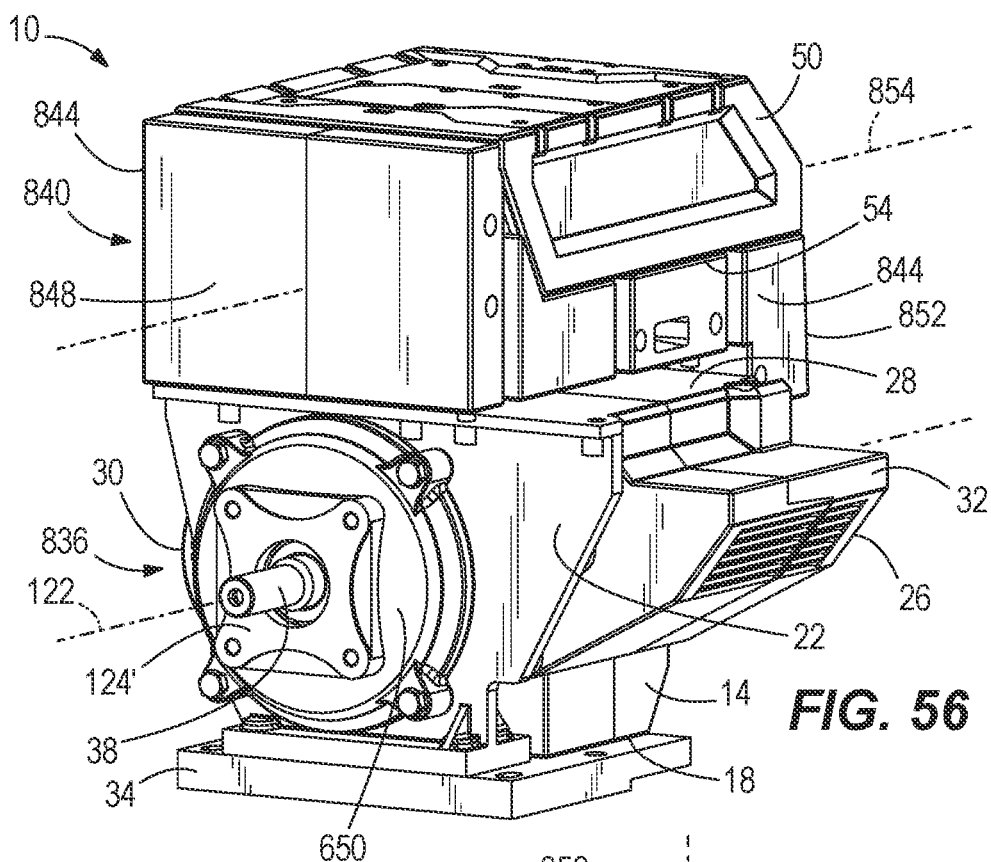
FIG. 56 is a perspective view of the stand-alone motor unit of FIG. 54, with a battery module in a second position, for a horizontal mounting application.
Figure 57:
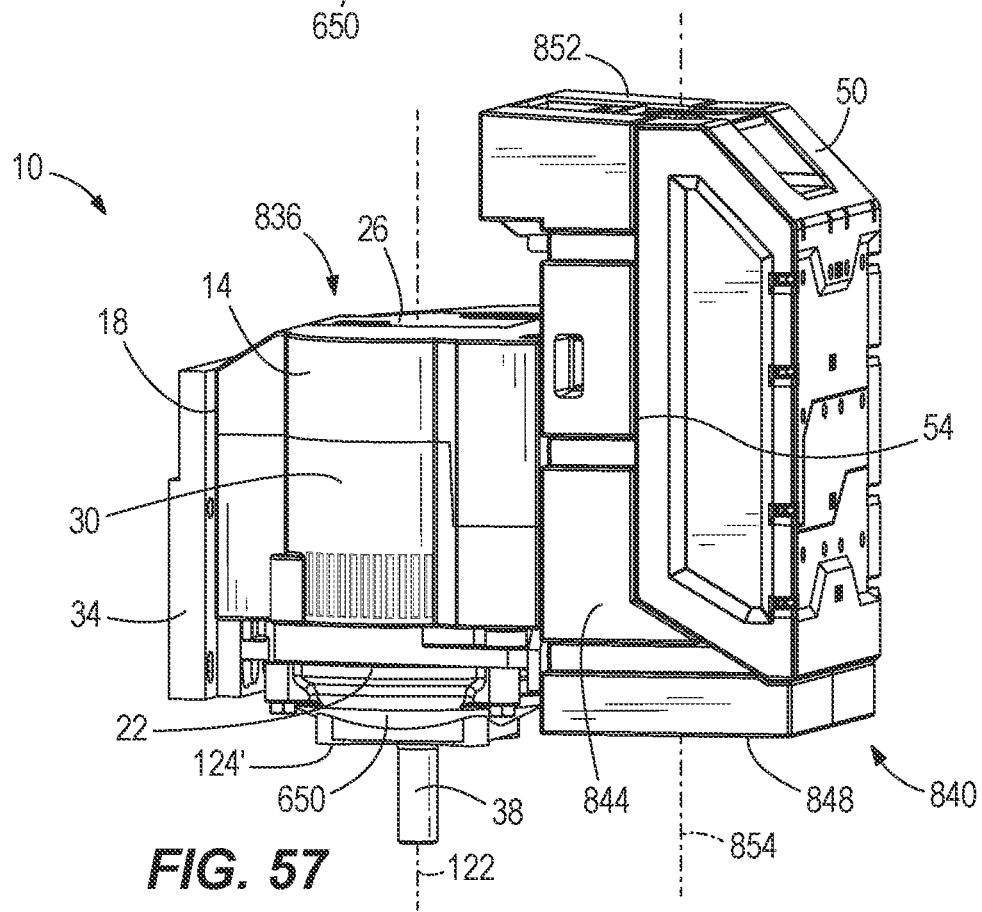
FIG. 57 is a perspective view of the stand-alone motor unit of FIG. 54, with a battery module in a second position, for a vertical mounting application.

The battery module 840 also includes a plurality of coupling members, such as fasteners 856 (FIGS. 55 and 58), configured to mate with a plurality of receiving elements, such as bores 860 on the fourth side 28 of the base 836, such that the battery module 840 can be secured to the fourth side 28 of base 836. The bores 860 are arranged on the fourth side 28 such that the battery module 840 is configured to be coupled to the base 836 in a first position (FIG. 54) or a second position (FIGS. 56 and 57). Thus, in some embodiments, there may be twice as many bores 860 as fasteners 856, to facilitate the two different positions of the battery module 840 with respect to the base 836. In some embodiments, there is at least one fastener 856 that is received in a different bore 860 when the battery module 840 is coupled to the base 836 in the first position than when the battery module 840 coupled to the base 836 in the second position. In some embodiments, one of the base 836 and the battery module 840 may include, e.g., an extended wire harness 858 (FIG. 58) to facilitate the electrical connection between the second terminal 78 of the battery receptacle 54, which is in the battery module 840, and the control electronics 42, which are in the base 836.

Figure 54:
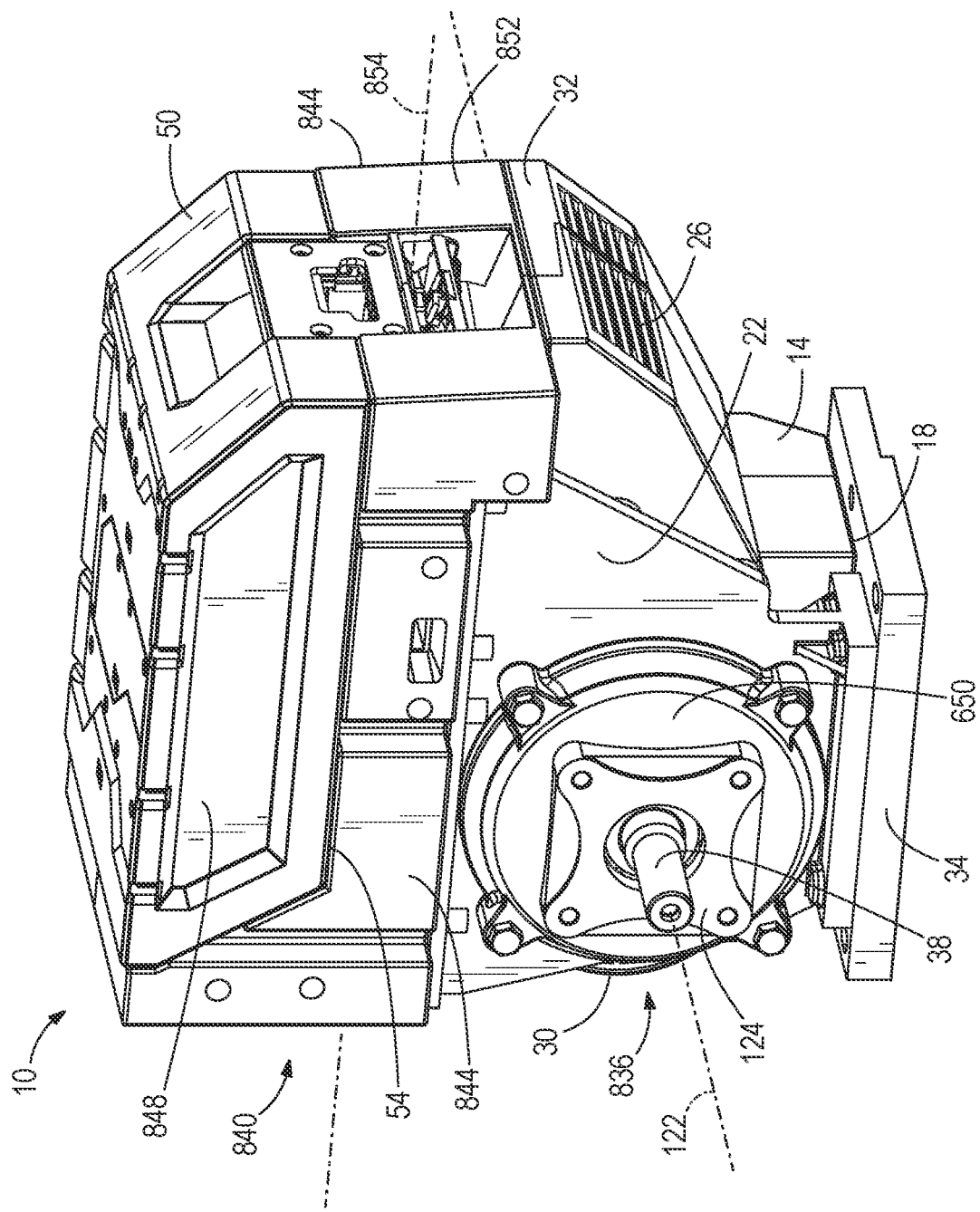
FIG. 54 is a perspective view of a stand-alone motor unit according to another embodiment of the invention, with a battery module in a first position.

In the first position of the battery module 840 shown in FIG. 54, the side walls 844 of the battery module 840 are parallel to the second and third sides 22, 26 of the base 836, the battery module axis 854 is perpendicular to the rotational axis 122 of the power take-off shaft 38, the rear and front walls 848, 852 of the battery module 840 are perpendicular to the second side and third sides 22, 26 of the base 836, and the battery module 840 is removable in a direction away from the fifth side 30 of the base 836. In the second position of the battery module shown in FIGS. 56 and 57, the side walls 844 of the battery module 840 are perpendicular to the second and third sides 22, 26 of the base 836, the battery module axis 854 is parallel to the rotational axis 122 of the power take-off shaft 38, the rear and front walls 848, 852 of the battery module 840 are parallel to the second and third sides 22, 26 of the base 836, and the battery module 840 is removable in a direction away from the second side 22 of the base 836.

Thus, when the operator or original equipment manufacturer (OEM) wants the motor unit 10 in an arrangement in which the battery pack 50 needs to be removable in the space above the sixth side 32 of the base 836, or there needs to be free space above the power take-off shaft 38 and second side 22 of the base 836, the operator or OEM can elect to couple the battery module 840 to the base 836 in the first position shown in FIG. 54. Thus, the first position of the battery module 840 may be useful in, e.g., high vibration applications, horizontal power take-off shaft 38 applications (FIG. 54), or vertical power take-off shaft 38 applications.

Alternatively, when the operator or OEM wants the motor unit 10 in an arrangement in which the battery pack 50 needs to be removable in a space above the third side 26 of the base 836, or there needs to be free space above the fifth and sixth sides 30, 32 of the base 836, the operator or OEM can elect to couple the battery module 840 to the base 836 in the second position shown in FIGS. 56 and 57. Thus, the second position of the battery module 840 may be useful in, e.g., high vibration applications, horizontal power take-off shaft 38 applications (FIG. 56), or vertical power take-off shaft 38 applications (FIG. 57).

Figure 55:
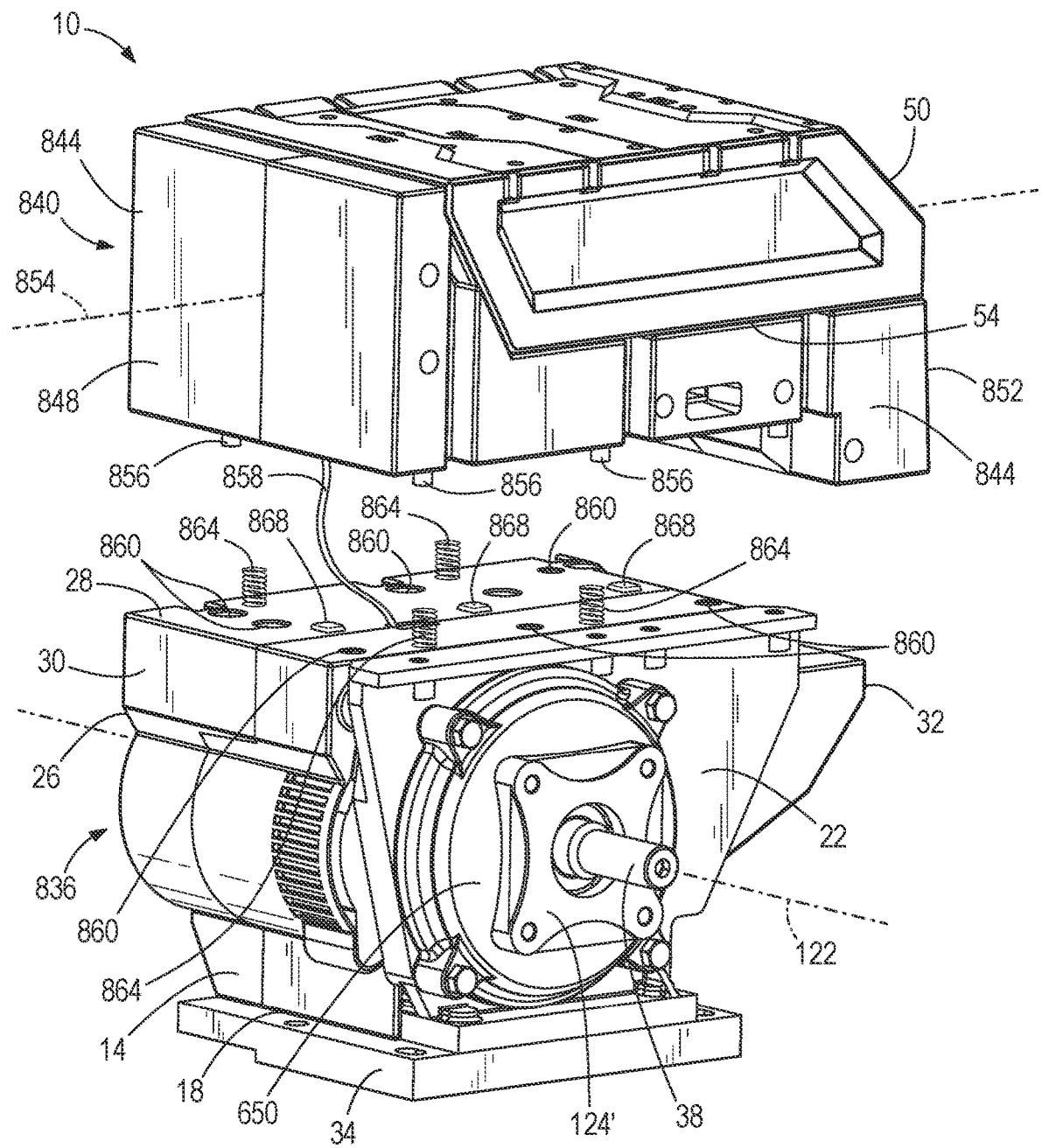
FIG. 55 is a perspective view of the stand-alone motor unit of FIG. 54, with a battery module removed from a base.
Figure 58:
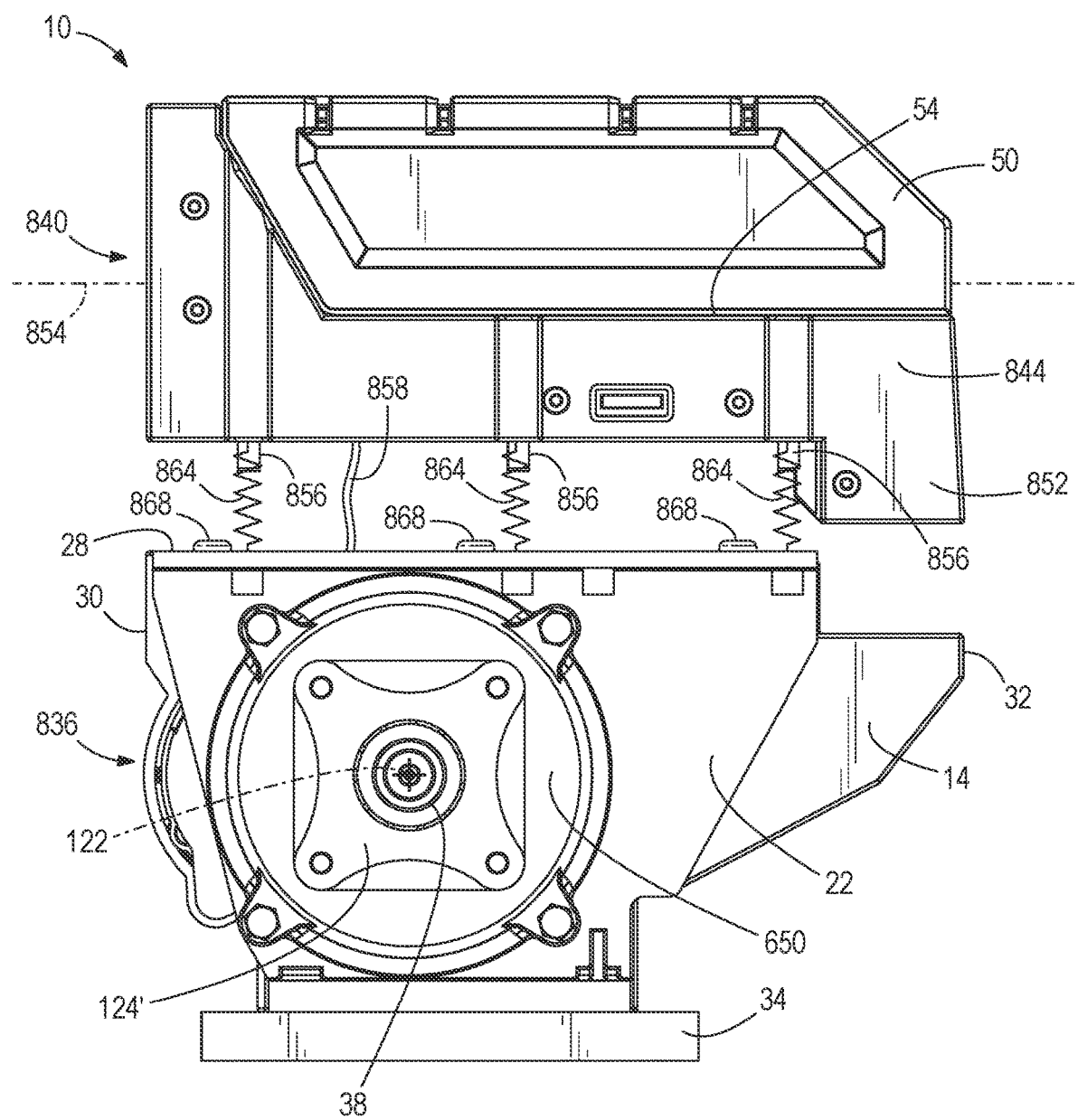
FIG. 58 is a plan view of the stand-alone motor unit of FIG. 54, with a battery module removed from a base.

As shown in FIGS. 55 and 58, in some embodiments, the base 836 includes a plurality of vibration damping members, such as springs 864 and/or elastomeric spacers 868, that inhibit vibration transferred from the base 836 to the battery module 840 during operation of the motor unit 10. Thus, vibration transferred to the battery pack 50 is inhibited, increasing the lifespan of the battery pack 50, the battery receptacle 54, and the base 836.

FIGS. 59-66 illustrate a motor 36a for the motor unit 10 that is different than the motor 36. The motor 36a includes a stator 872, a rotor 876 rotatable relative to the stator 872, and a housing 880 in which the rotor 876 and stator 872 are arranged. The motor 36a also includes an adapter plate 884 coupled to the housing 880 and a back cover 888 coupled to the housing 880. The housing 880 is sized to accommodate the specific diameter of the rotor 876. In some embodiments, the rotor 876 has a diameter ranging from 70 mm to 120 mm.

Figure 59:
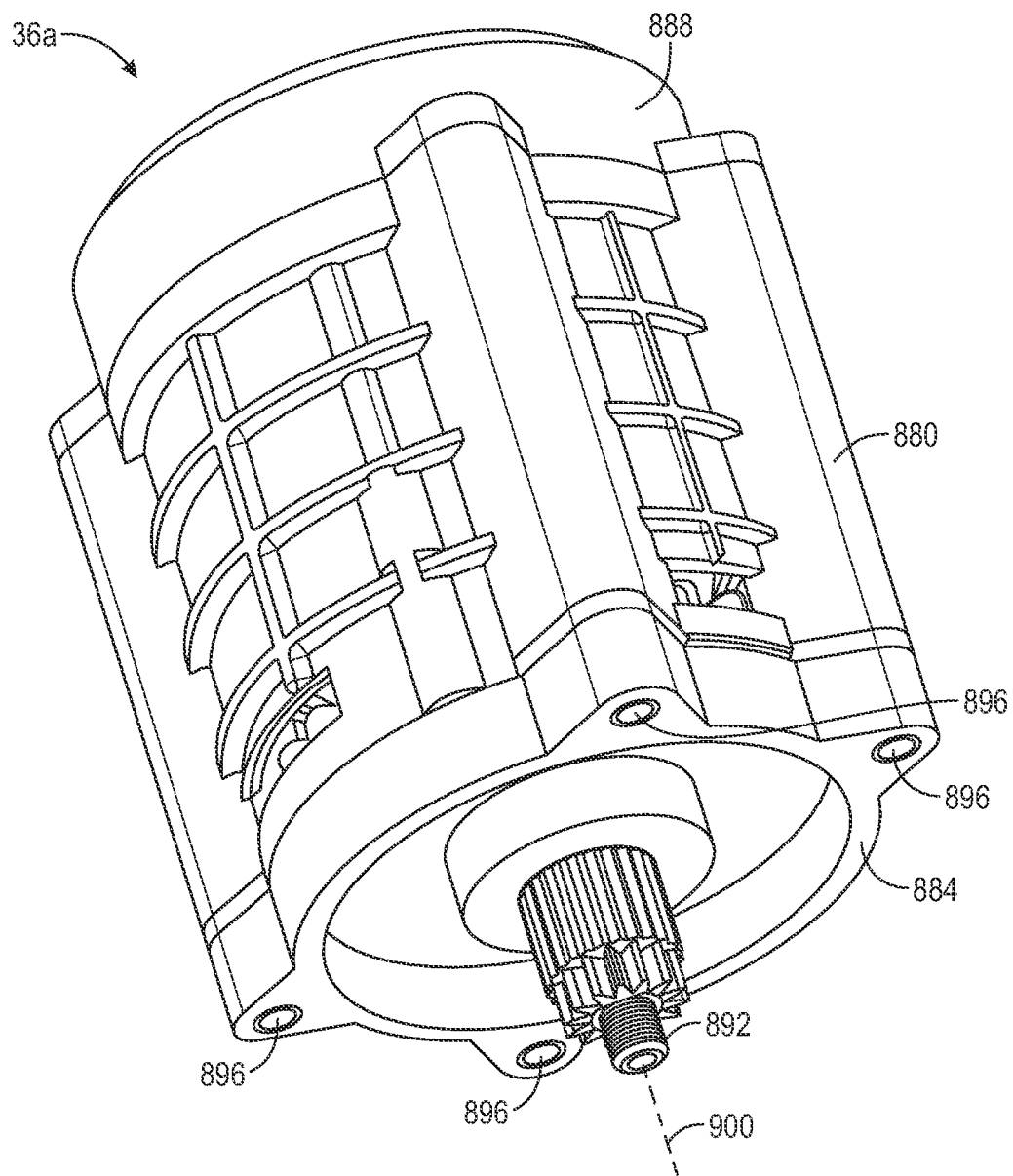
FIG. 59 is a perspective view of another embodiment of a motor of the stand-alone motor unit of FIG. 1.
Figure 61:
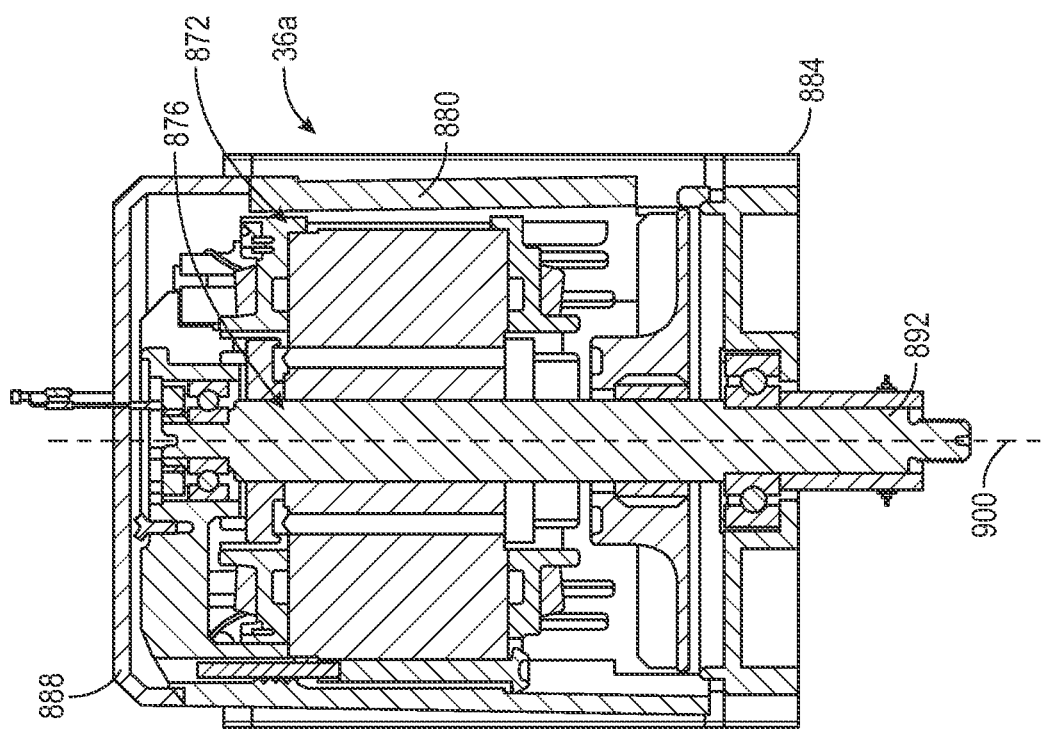
FIG. 61 is a cross-sectional view of the motor of FIG. 59.
Figure 60:
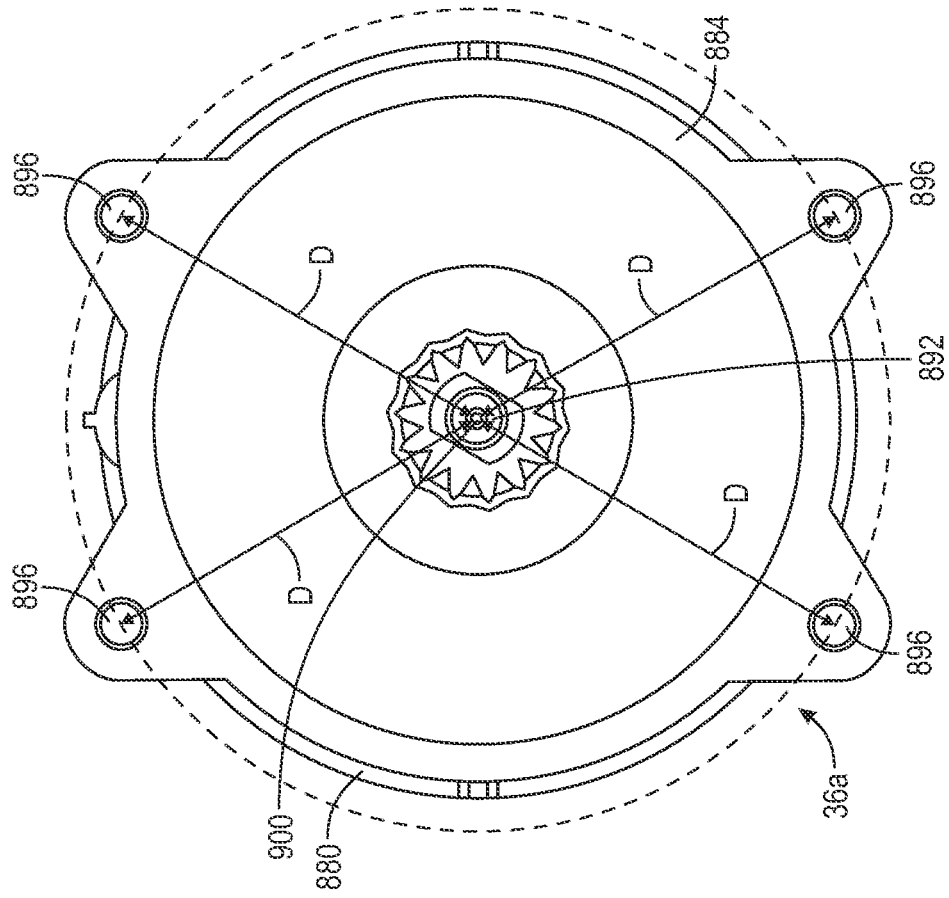
FIG. 60 is a plan view of the motor of FIG. 59.
Figure 62:
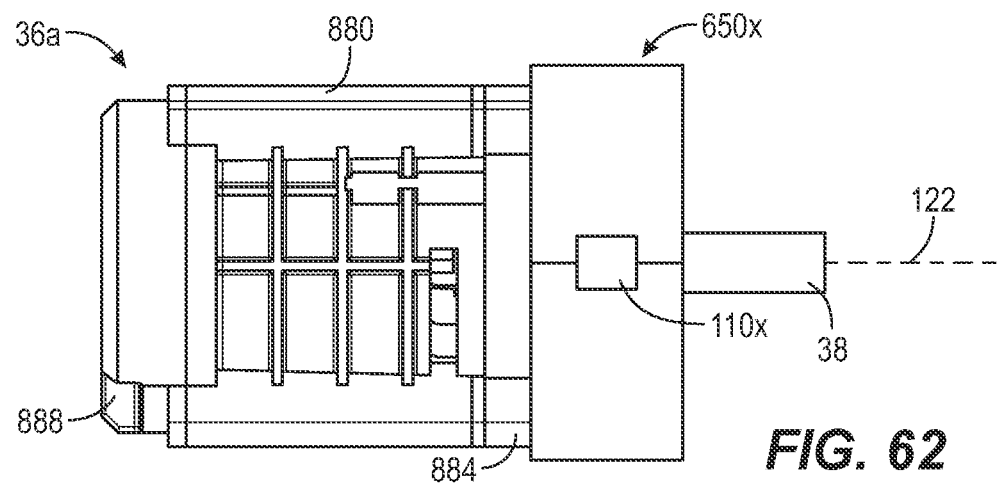
FIG. 62 is a plan view of the motor of FIG. 59 coupled to a first gearbox.
Figure 63:
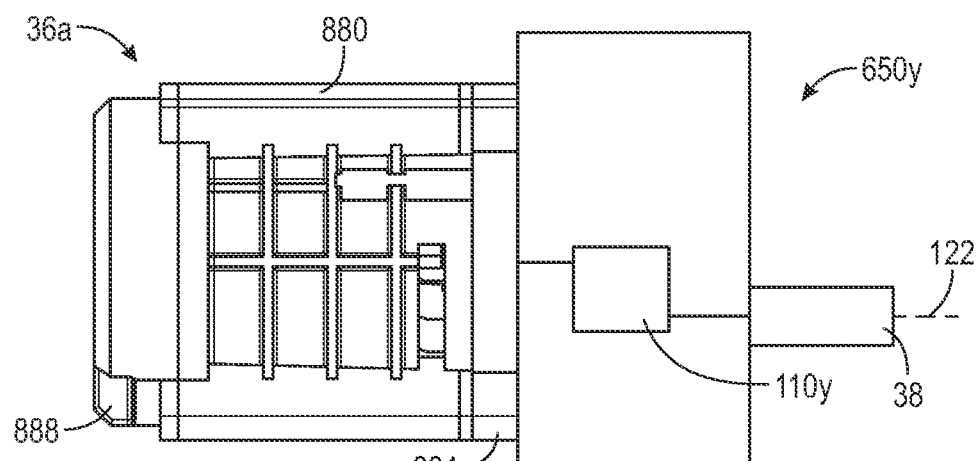
FIG. 63 is a plan view of the motor of FIG. 59 coupled to a second gearbox.
Figure 64:
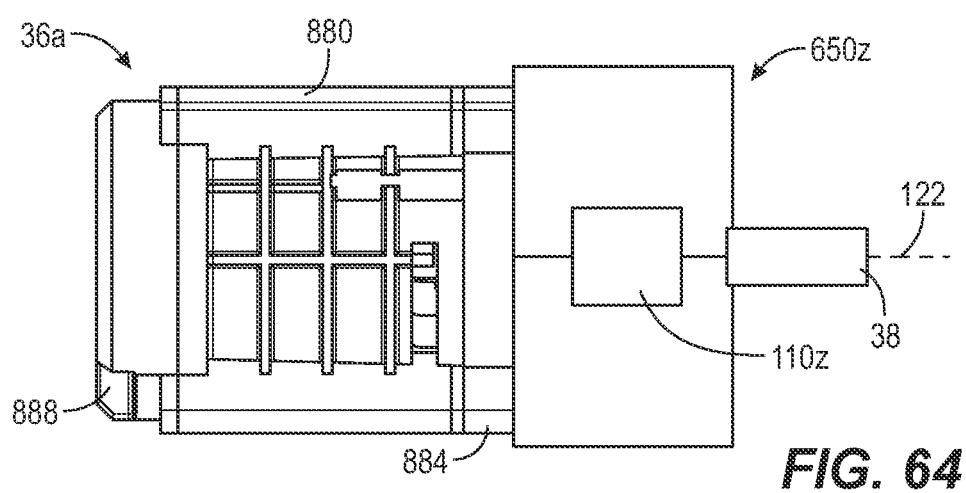
FIG. 64 is a plan view of the motor of FIG. 59 coupled to a third gearbox.

An output shaft 892 of the rotor 876 protrudes from the adapter plate 884. As shown in FIGS. 59 and 60, the adapter plate 884 includes first plurality of holes 896 defining a first hole pattern. As shown in FIG. 60, each of the holes 896 is the same distance D away from a rotational axis 900 defined by the output shaft 892. A variety of different gearboxes 650x (FIG. 62), 650y (FIG. 63), and 650z (FIG. 64) each have a second plurality of holes defining a second hole pattern that is identical to the first hole pattern defined by the first plurality of holes 896. Thus, when at least two holes of the second hole pattern of one of the gearboxes 650x, 650y, 650z are aligned with at least two of the first plurality of holes 896, the selected gearbox 650 may be coupled to the adapter plate 884 by, e.g., inserting fasteners through the aligned holes in the first and second hole patterns. In some embodiments, the fasteners may extend through the back cover 888, the housing 880, the adapter plate 884, and the selected gearbox 650. When one of the gearboxes 650x, 650y, 650z is coupled to the adapter plate 884, the output shaft 892 extends into the selected gearbox 650. In some embodiments, in addition to being coupled to the adapter plate 884 of the motor 36a, the selected gearbox 650 is also coupled to the housing 14 of the motor unit 10. In some embodiments, the selected gearbox 650 is not coupled to the housing 14 of the motor unit 10. In some embodiments, the gearbox 650 is coupled to the housing 14 and the motor 36a is coupled to the gearbox 650, but not the housing 14. In some embodiments, the motor 36a is coupled to the housing 14, as well as the gearbox 650.

A power take-off shaft 38 extends from each of the gearboxes 650x, 650y, 650z and the gearboxes 650x, 650y, 650z respectively include different gear trains 110x, 110y, 110z for transferring torque from the output shaft 892 to the power take-off shaft 38. For instance, the gear train 110x may be a planetary gear train, the gear train 110y may be a 2-stage gear train, and the gear train 110z may be a transmission. Thus, depending on the piece of power equipment the operator wants to use with the motor unit 10, and the type of speed reduction from the motor 36a to the power take-off shaft 38 the operator wants to achieve, the operator can couple one of the gearboxes 650x, 650y, 650z to the adapter plate 884 of the motor 36a.

In some embodiments, the first hole pattern defined by the first holes 896 is identical to a second hole pattern on the piece of power equipment 904 itself. Thus, when the at least two holes of the second hole pattern of the power equipment 904 are aligned with at least two holes of the first hole pattern defined by the plurality of holes 896, the power equipment 904 may be coupled to the adapter plate 884 by, e.g., inserting the fasteners 900 through aligned holes in the first and second hole patterns. Thus, the output shaft 892 drives the power equipment 904 directly (FIG. 65) or via a pulley 908 (FIG. 66) used to drive a belt 912.

Figure 67:
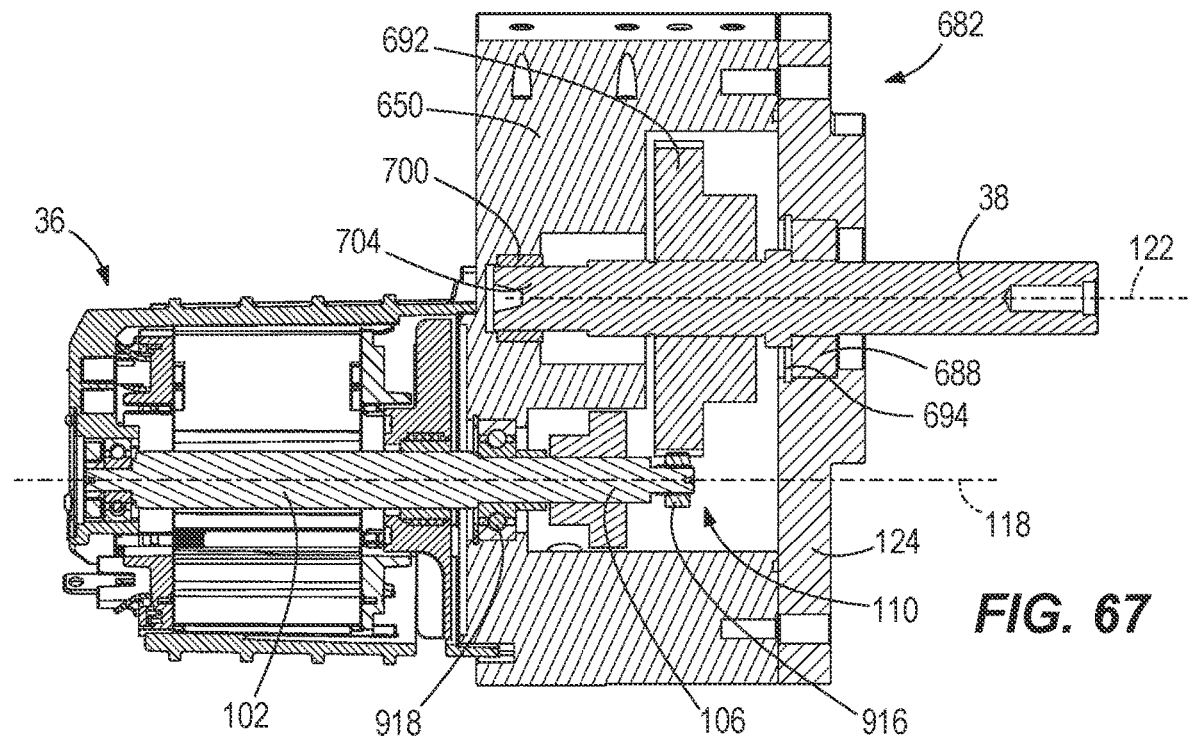
FIG. 67 is a cross-sectional view of the stand-alone motor unit of FIG. 42.

FIG. 67 illustrates an embodiment similar to the embodiment shown in FIG. 43, with the following difference explained below. Specifically, the first gear 692 is meshingly engaged with and driven by a pinion 916 on the output shaft 106 of the motor 36 when the shaft subassembly 682 is coupled to the gearbox 650. The motor 36 is coupled to the gearbox 650 and the output shaft 106 is supported by a bearing 918 in the gearbox 650.

Figure 66:
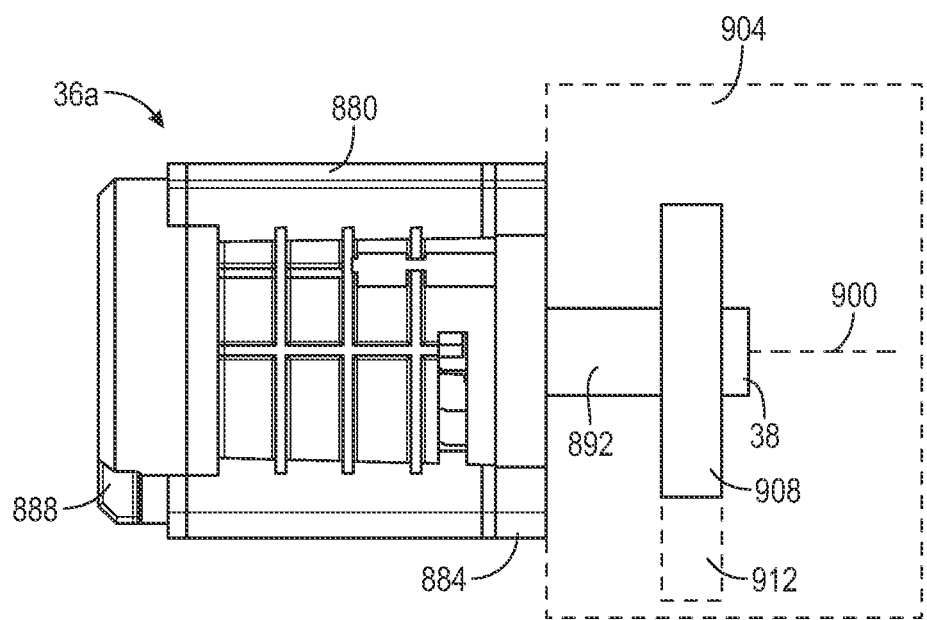
FIG. 66 is a plan view of the motor of FIG. 59 coupled to a piece of power equipment.
Figure 68:
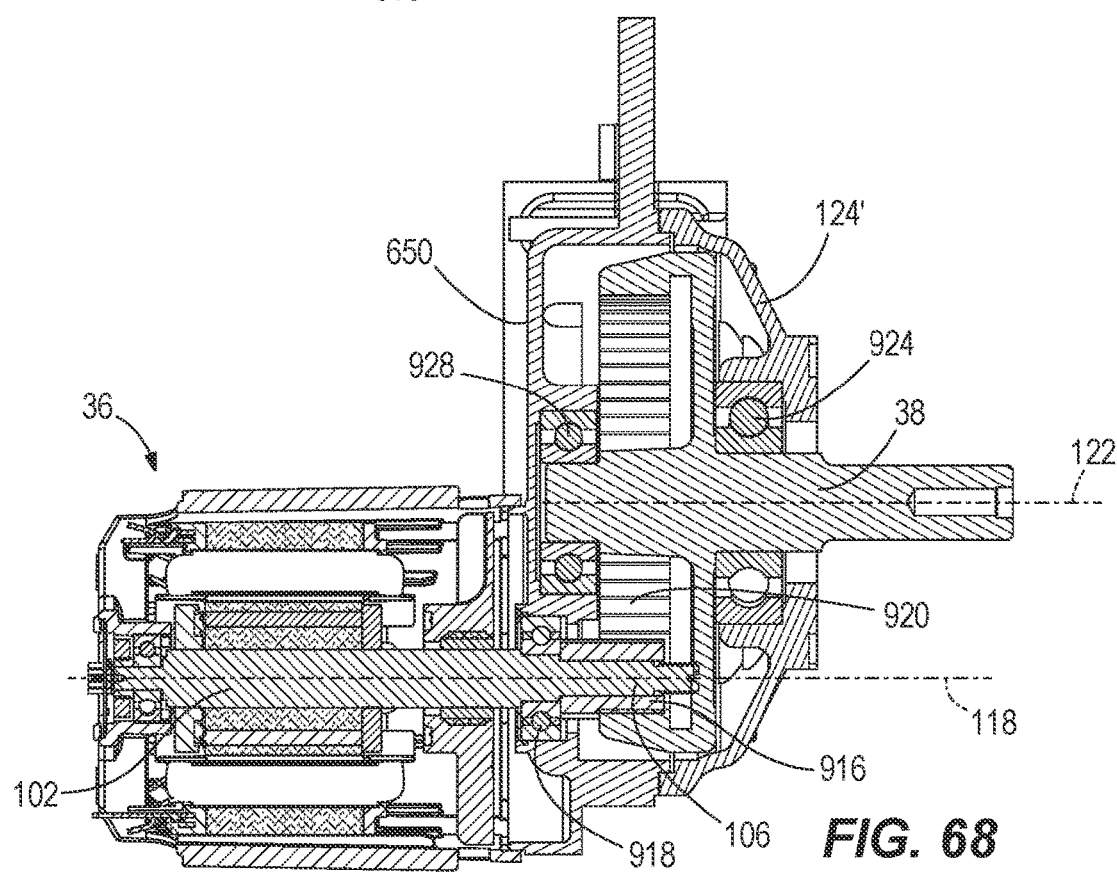
FIG. 68 is a cross-sectional view of a stand-alone motor unit of FIG. 54.

In an embodiment shown in FIG. 68, an internal ring gear 920 is coupled to or integrally formed on the power take-off shaft 38, which is supported by a first bearing 924 in the removable faceplate 124 and a second bearing 928 in the gearbox 650. The internal ring gear 920 is meshingly engaged with and driven by the pinion 916 on the output shaft 106 of the motor 36, and the motor 36 is coupled to the gearbox 650. Thus, the removable faceplate 124 may be removed to swap out the internal ring gear 920 for other gears. For instance, in other embodiments, instead of the internal ring gear 920, the gear train 110 could include single or multiple stage spur (FIGS. 11 and 47) or helical gear sets, single or multistage planetary gearset planetary gears (FIGS. 10, 46, 47, and 62), hydraulic coupling, or a belt/chain drive (FIGS. 49 and 66). In the embodiments illustrated in FIGS. 67 and 68, the rotational axis 118 of the output shaft 106 is parallel to the rotational axis 122 of the power take-off shaft 38. However, in other embodiments, the rotational axis 118 of the output shaft 106 is coaxial with the inline with the rotational axis 122 of the power take-off shaft 38. In still other embodiments, the rotational axis 118 of the output shaft 106 is perpendicular to the rotational axis 122 of the power take-off shaft 38. In still other embodiments, the rotational axis 118 of the output shaft 106 forms an oblique angle with respect to the rotational axis 122 of the power take-off shaft 38 with the use of bevel gears or worm gears.

As discussed in many embodiments above, the motor unit 10 includes a gear train 110 to lower the rotational speed output by the power take-off shaft 38, as compared with the rotational speed of the motor 36. Generally, DC brushless motors, such as the motor 36, operate most efficiently at high speeds, ranging between 15,000 and 30,000 RPM. However, the desired output speed of the power take-off shaft 38 is generally in a range of 2,000-3,600 RPM, which is roughly equivalent to the speed of a power take-off shaft of a 150-250 cc class V small combustion engine that the motor unit 10 is intended to replace.

In some embodiments, other electric motors could be used, such as outer rotor motors, AC induction motors, or brushed motors. In some embodiments, the gear train 110 could include internal ring gear(s) (e.g. FIG. 68), planetary gears (FIGS. 10, 46, 47, and 62), belts and/or chains (FIGS. 49 and 66), bevel gears (FIG. 12), helical or spur gears (FIGS. 11 and 47) or even viscous fluid coupling.

Figure 65:
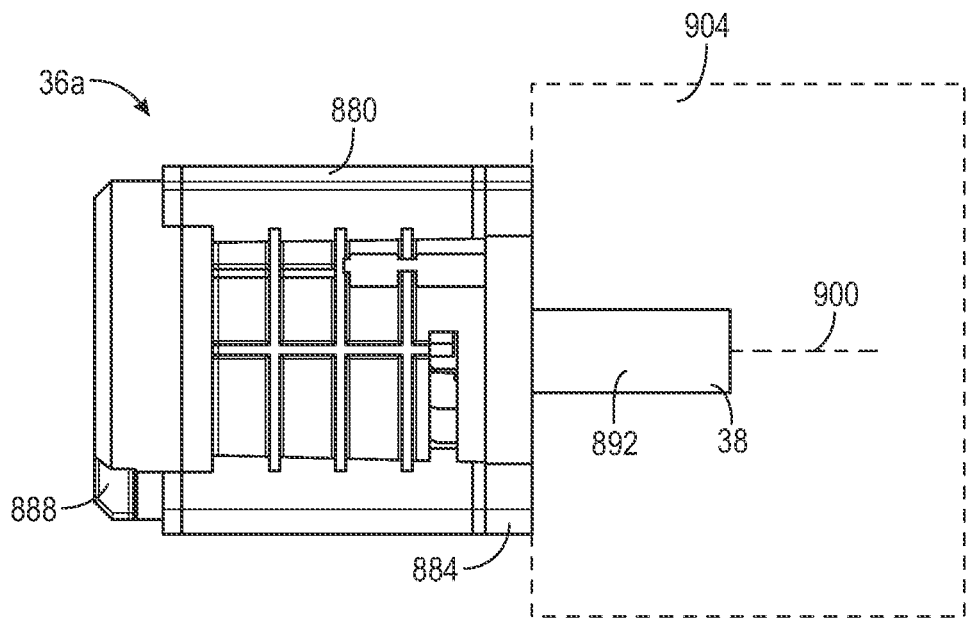
FIG. 65 is a plan view of the motor of FIG. 59 coupled to a piece of power equipment.

In addition to using a gear train 110 to provide a reduced rotational speed to the power take-off shaft 38, motor speed control can be used to reduce the rotational speed of the motor 36, and thus the power take-off shaft 38. Because the exact gear reduction ratio of the gear train 110 is known, the electronic processor 302 of the motor unit 10 can accurately control the speed of the motor 36 to achieve the desired speed of the power take-off shaft 38. Also, as shown in the embodiments of FIGS. 8, 65, and 66, the output shaft 106 is also the power take-off shaft 38, such that the motor 36 directly drives the power take-off shaft 38 without any intermediate gear train. Thus, in the embodiments of FIGS. 8, 65 and 66, the rotational speed of the motor 36 is the same as the rotational speed of the power take-off shaft 38. In some embodiments, the gear train 110 may be configured to increase the rotational speed of the power take-off shaft 38 to a value greater than the rotational speed of the motor 36. "Gearing up" may be useful in, e.g., applications in which the piece of power equipment is a vacuum cleaner being driven by the power take-off shaft 38.

Figure 69:
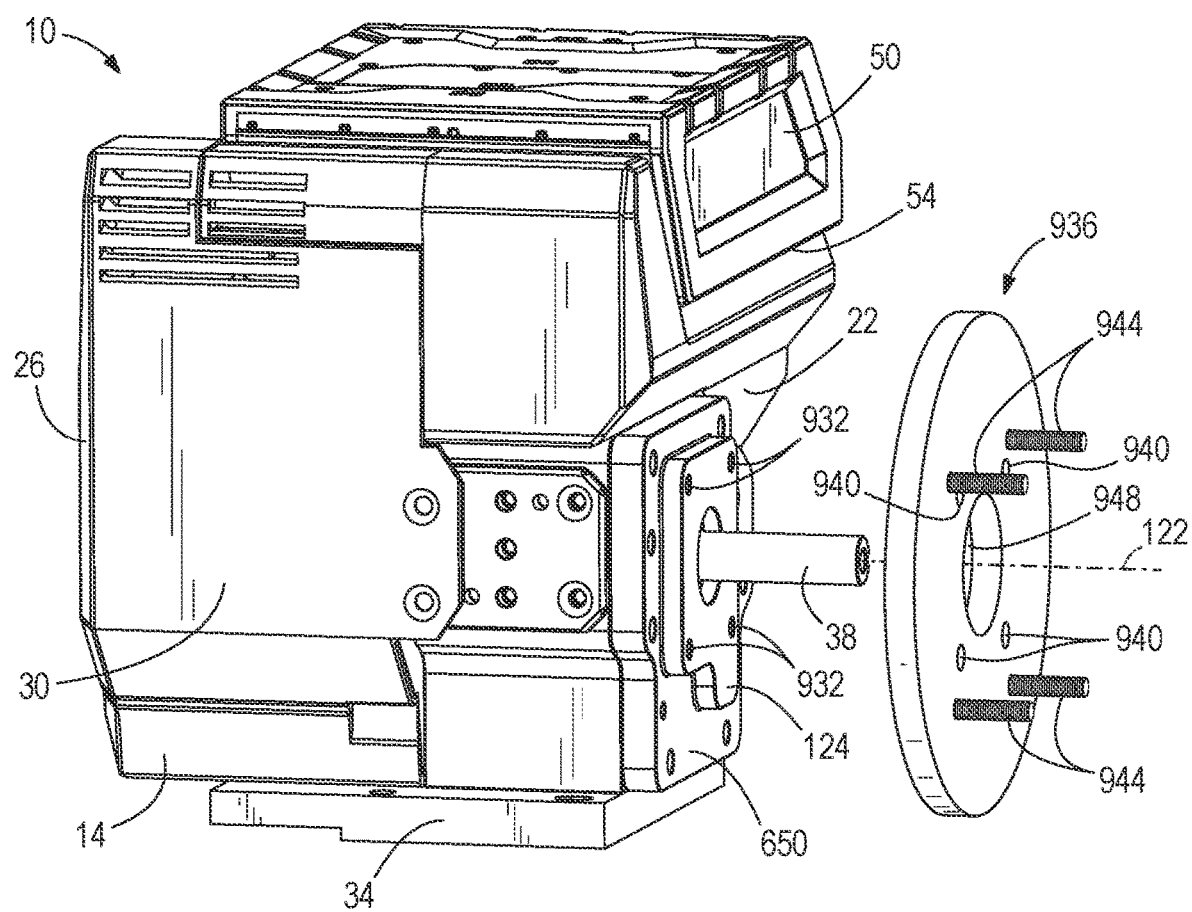
FIG. 69 is a perspective view of the stand-alone motor unit of FIG. 42 with an adapter plate configured to be coupled thereto.
Figure 70:
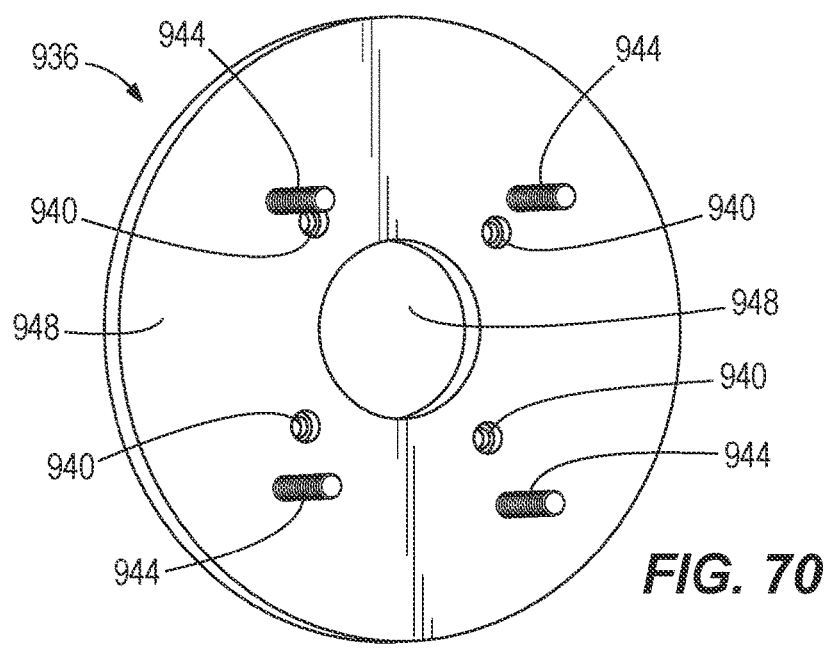
FIG. 70 is a perspective view of the adapter plate of FIG. 69.
Figure 71:
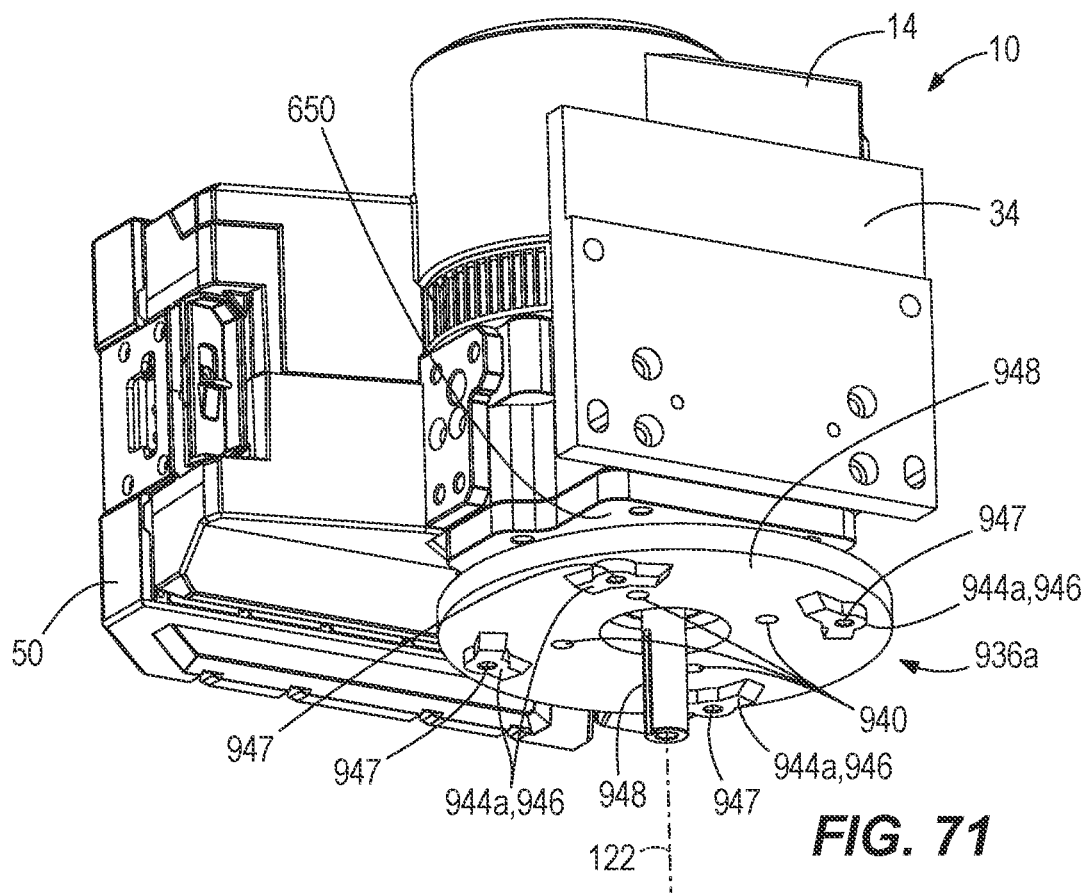
FIG. 71 is a perspective view of the stand-alone motor unit of FIG. 42 with an another embodiment of an adapter plate coupled thereto.

In an embodiment shown in FIGS. 69-71, the faceplate 124 includes a first plurality of holes 932 defining a first hole pattern. In other embodiments, the faceplate 124 is omitted and the first plurality of holes 932 defining the first hole pattern can be on the second side 22 of the housing 14 or the gearbox 650. An adapter plate 936 includes a second plurality of holes 940 defining a second hole pattern that is identical to the first hole pattern, such that when the second holes 940 are aligned with the first holes 932, the adapter plate 936 is configured to be coupled to the faceplate 124.

In some embodiments, the first and second hole patterns are the hole patterns shown in the Flange A mounting pattern from the SAE International Surface Vehicle Recommended Practice Manual, J609, section (R) "Mounting Flanges and Power Take-Off Shafts for Small Engines", issued May 1958 and revised July 2003 ("the SAE J609"), which is incorporated herein by reference. Thus, the adapter plate 936 is not needed when the motor unit 10 is to be used with a piece of power equipment utilizing the SAE J609 Flange A mounting pattern, because the first plurality of holes 932 defining the SAE J609 Flange A mounting pattern can be used to mount the piece of power equipment directly to the faceplate 124. In other embodiments, the first plurality of holes 932 could define other mounting patterns besides the SAE J609 Flange A mounting pattern, such as the SAE J609 Flange Patterns B, C, D, E or F mounting patterns.

The adapter plate 936 also includes a first set of mounting elements 944 configured to align with a second set of mounting elements on a piece of power equipment, such that the adapter plate 936 can be coupled to the piece of power equipment. The adapter plate 936 of FIGS. 69 and 70 has mounting elements 944 that are dowel pins configured to align with a second set of mounting elements on, for example, a rammer. However, a different adapter plate 936*a* of FIG. 71 has mounting elements 944*a* that are protrusions 946 with holes 947 configured to align with a second set of mounting elements on, for example, a lawn mower, log splitter, or earth auger, in a vertical power take-off shaft 38 mounting arrangement. The mounting elements 944*a* could have a pattern of holes as laid out in the SAE J609 Flange Patterns B, C, D, E or F mounting patterns.

In other embodiments, the mounting elements 944 may include studs or fasteners. In some embodiment, the studs could be threaded. The adapter plate 936 also includes a through bore 948 for passage of the power take-off shaft 38. In some embodiments, the adapter plate 936 includes a piloting member configured to pilot the adapter plate 936 onto the piece of power equipment, such that first set of mounting elements 944 of the adapter plate 936 are forced to align with the second set of mounting elements on the piece of power equipment. In some embodiments, the second holes 940 are recessed mounting holes so that fasteners can be arranged sub-flush on equipment side 948 of the adapter plate 936 to allow the adapter plate 936 to sit flat on the power equipment to which it is mounted.

Figure 71A:
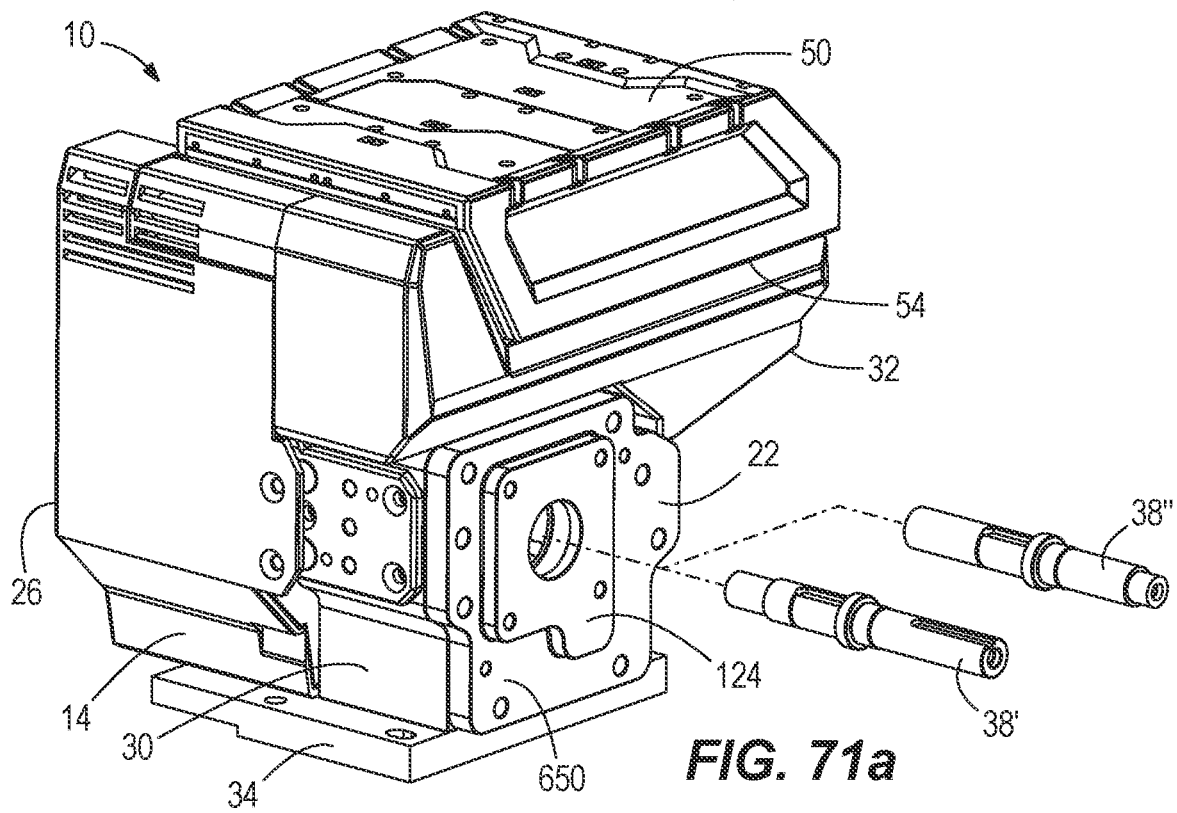
FIG. 71a is a perspective view of the stand-alone motor unit of FIG. 42 with a a pair of power-take off shafts configured to be coupled removably thereto.

As shown in FIG. 71*a*, the motor unit 10 can be provided to an OEM without a power take-off shaft 38 assembled. The OEM could then select an appropriate power take-off shaft 38', 38" for the application needed and assemble the selected power take-off shaft 38 to the motor unit 10. In some embodiments, the faceplate 124 of the gearbox 650 would need to be removed to assemble the different power take-off shafts 38', 38".

Figure 72:
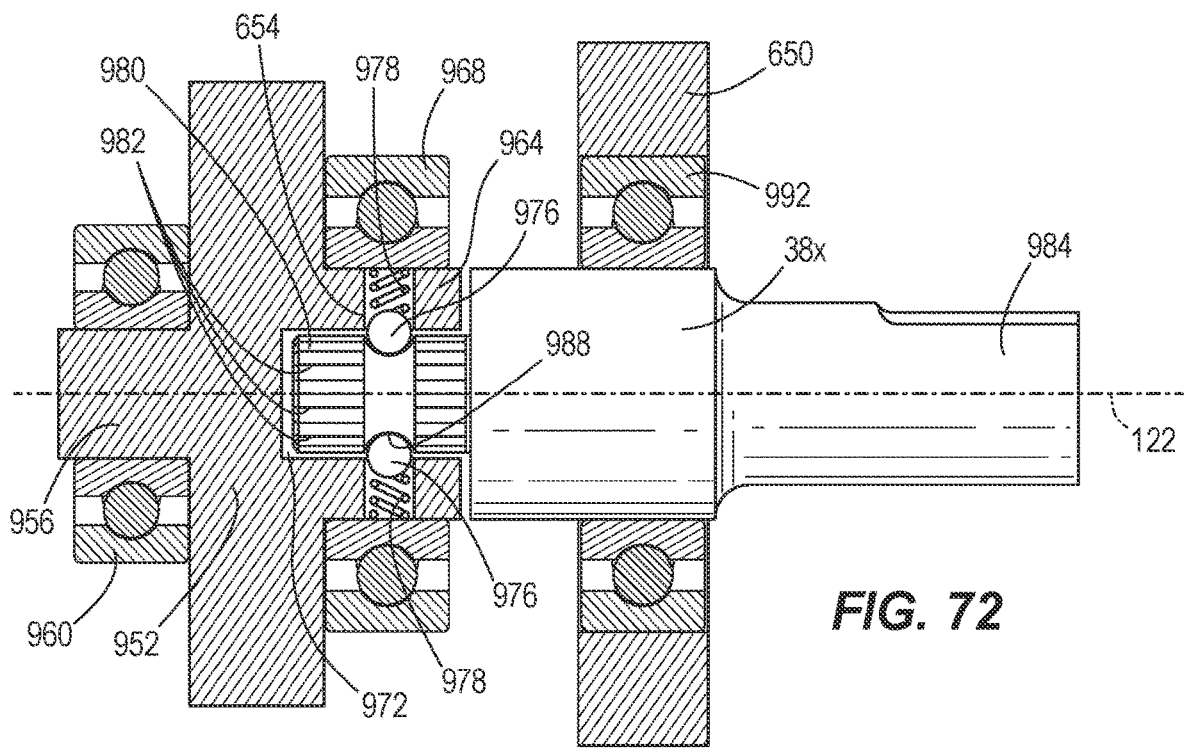
FIG. 72 is a cross-sectional view of a power take-off shaft coupled to a drive gear of the stand-alone motor unit of FIG. 42.

When swapping out different power take-off shafts 38, a variety of different methods can be used to axially retain the power take off shaft 38, as shown in FIGS. 72-76. In FIG. 72, a final drive gear 952 of the gear train 110 has a journal 956 rotatably supported by a first bearing 960, a shaft carrier 964 rotatably supported by a second bearing 968, a recess 972 in the shaft carrier 964, and a plurality of ball detents 976 biased into the recess 972 by, e.g., springs 978. A power take-off shaft 38*x* shown in FIG. 72 includes a splined portion 980 having splines 982 configured to be received in the recess 972, and a driving end 984 configured to drive the piece of power equipment. The splined portion 980 includes a circumferential recess 988.

When the splined portion 980 of the power-take off shaft 38*x* is inserted into the recess 972 of the final drive gear 952, the splines 982 engage with corresponding splines of the recess 972, such that the power-take off shaft 38*x* is coupled for rotation with the final drive gear 952. In other embodiments, instead of a splined portion 980 with splines 982, the power take-off shaft 38*x* could include a D-shape, hex shape, or other key and keyway mating connection with the recess 972 to enable co-rotation with the drive gear 952. Also, when the splined portion 980 is received into the recess 972, the ball detents 976 are biased into the circumferential recess 988, such that the power take-off shaft 38*x* is axially locked with respect to the final drive gear 952. When the power-take off shaft 38*x* is secured in the final drive gear 952, the power take-off shaft 38*x* is rotatably supported with respect to the gearbox 650 (illustrated), faceplate 124, or adapter plate 936 by a third bearing 992. The power take-off shaft 38*x* can be removed by the operator pulling on the driving end 984 to overcome the biasing force of the detents 976 and move them out of the circumferential recess 988. Then the operator can insert a different power take-off shaft that also has the splined portion 980 with the circumferential recess 988, but has a different driving end configured to drive a different piece of power equipment than the power take-off shaft 38*x*.

Figure 73:
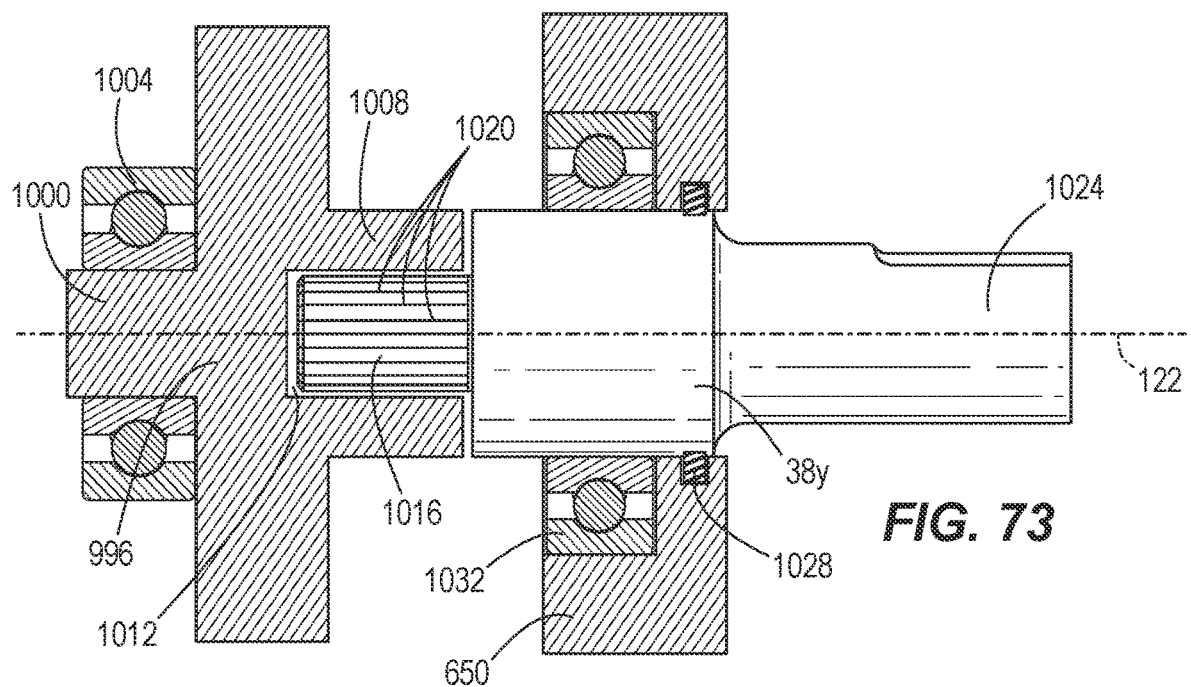
FIG. 73 is a cross-sectional view of a power take-off shaft coupled to another embodiment of a drive gear of the stand-alone motor unit of FIG. 42.

In another embodiment shown in FIG. 73, a final drive gear 996 of the gear train 110 has a journal 1000 rotatably supported by a first bearing 1004, a shaft carrier 1008, and a recess 1012 in the shaft carrier 1008. A power take-off shaft 38y shown in FIG. 74 includes a splined portion 1016 having splines 1020 configured to be received in the recess 1012, and a driving end 1024 configured to drive the piece of power equipment. In other embodiments, instead of a splined portion 1016 with splines 1020, the power take-off shaft 38y could include a D-shape, hex shape, or other key and keyway mating connection with the recess 1012 to enable co-rotation with the drive gear 996. The power take-off shaft 38y includes a snap ring 1028, or clip, configured to axially retain the power take-off shaft 38y to one of the gear box 650, faceplate 124, or adapter plate 936, depending on how the motor unit 10 is configured for that particular application. The power take-off shaft 38y is rotatably supported with respect to the snap ring 1028 by a second bearing 1032.

Figure 74:
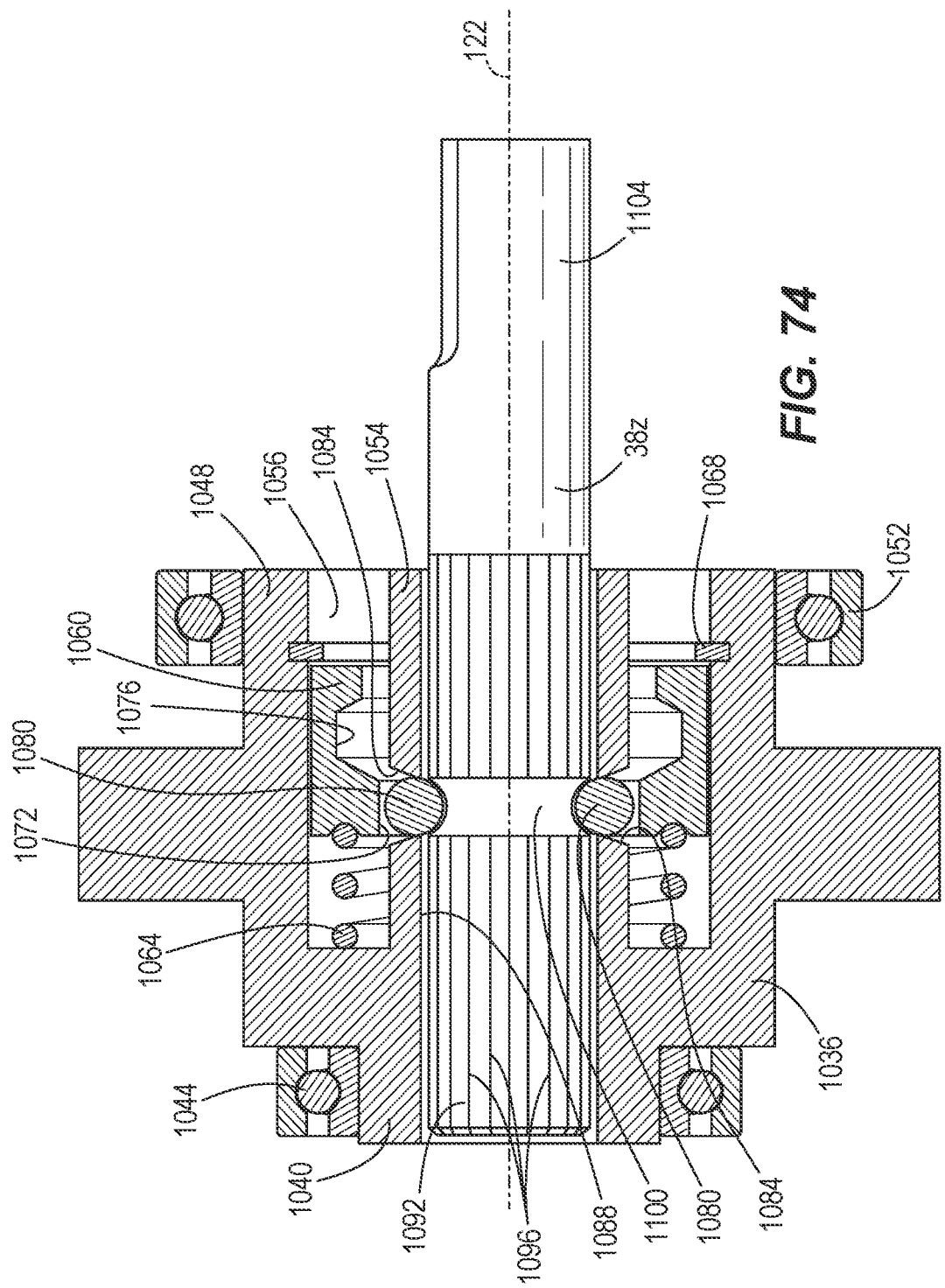
FIG. 74 is a cross-sectional view of a power take-off shaft coupled to another embodiment of a drive gear of the stand-alone motor unit of FIG. 42.

In another embodiment shown in FIG. 74, a final drive gear 1036 of the gear train 110 has a first journal 1040 supported by a first bearing 1044, a second journal 1048 supported by a second bearing 1052, a shaft carrier 1054, and a circumferential recess 1056 between the shaft carrier 1054 and the second journal 1048. A quick release collar 1060 is arranged in the recess 1056 and is biased away from the first journal 1040 by a compression spring 1064, but is prevented from being biased out of the recess 1056 by a retaining clip 1068 set in the recess 1056. The collar 1060 includes a circumferential lip 1072 and circumferential recess 1076 adjacent the circumferential lip 1072. A plurality of ball detents 1080 are set in a plurality of radial bores 1084 extending through the shaft carrier 1054. The collar 1060 is biased by the spring 1064 to a first position (FIG. 74), in which the circumferential lip 1072 is axially aligned with the ball detents 1080, such that the detents 1080 are forced into a passage 1088 in the shaft carrier 1054. The collar 1060 is moveable from the first position to a second position, in which the circumferential recess 1076 is axially aligned with the ball detents 1080. A power take-off shaft 38z includes a splined portion 1092 with splines 1096 and a circumferential groove 1100, and a driving end 1104 configured to drive the piece of power equipment.

In operation of the embodiment shown in FIG. 74, the collar 1060 is moved to the second position by the operator and the splined portion 1092 of the power take-off shaft 38z is inserted into the passage 1088 of the shaft carrier 1054, such that splines 1096 of the splined portion 1092 mate with corresponding splines in the passage 1088, thus coupling the power take-off shaft 38z for rotation with the final drive gear 1036. In other embodiments, instead of a splined portion 1092 with splines 1096, the power take-off shaft 38z could include a D-shape, hex shape, or other key and keyway mating connection with the passage 1088 to enable co-rotation with the drive gear 1036. As the power take-off shaft 38z is inserted, the ball detents 1080 are pushed by the power take-off shaft 38z radially outward into the circumferential recess 1076 of the collar 1060. Once the power take-off shaft 38z has been inserted, the collar 1060 is released and biased back to the first position by the spring 1064, causing the detents 1080 to be pushed by the circumferential lip 1072 of the collar 1060 to a radially inward position in which they are arranged in the circumferential grove 1100 of the power take-off shaft 38z, thus axially locking the power take-off shaft 38z with respect to the final drive gear 1036. If the power take-off shaft 38z is attempted to be removed from the passage 1088 before moving the collar 1060 to the second position, the circumferential lip 1072 prevents the detents 1080 from moving radially outward, and thus the power take-off shaft 38z cannot be moved axially.

To remove the power take-off shaft 38z from the final drive gear 1036, the collar 1060 is first moved to the second position by the operator and the power take-off shaft 38z is then pulled from the passage 1088. As the power take-off shaft 38z moves out of the passage 1088, the detents 1080 are pushed by the power take-off shaft 38z radially outward into the circumferential recess 1076 of the collar 1060. Then the operator can insert a different power take-off shaft that also has the splined portion 1092 with the circumferential recess 1100, but has a different driving end configured to drive a different piece of power equipment than the power take-off shaft 38z.

Figure 75:
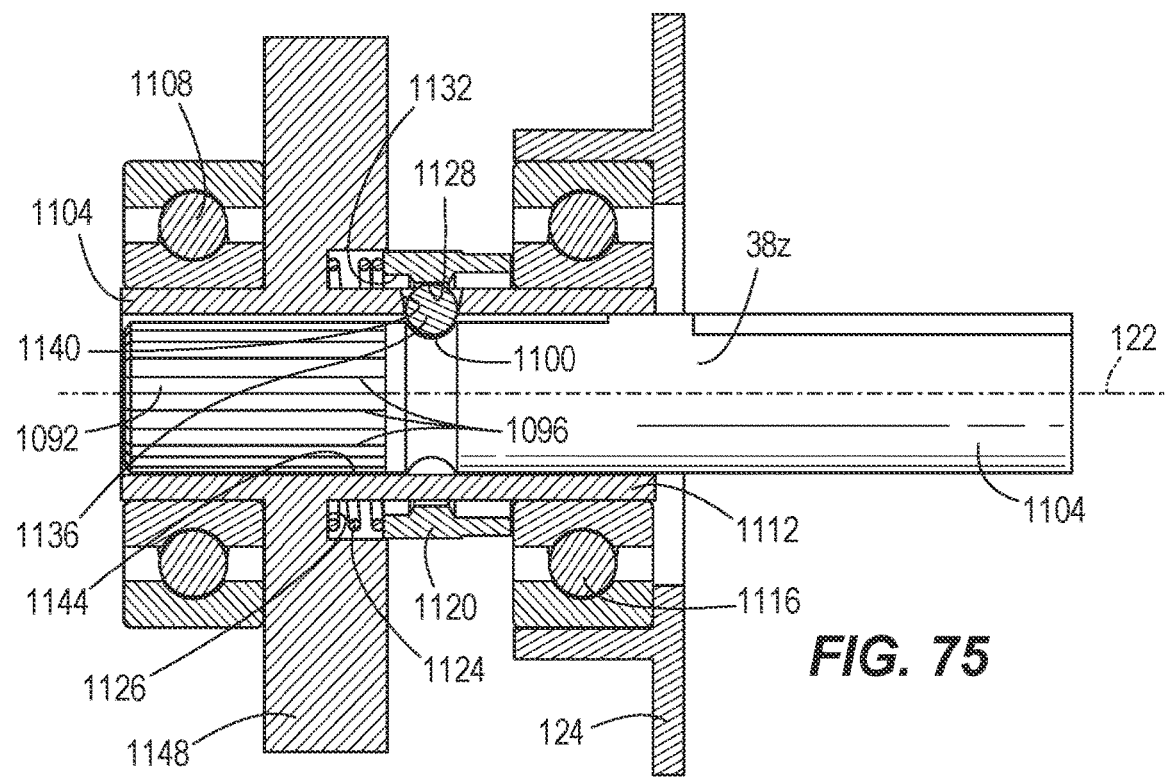
FIG. 75 is a cross-sectional view of a power take-off shaft coupled to another embodiment of a drive gear of the stand-alone motor unit of FIG. 42.

In another embodiment shown in FIG. 75, a final drive gear 1100 of the gear train 110 has a first journal 1104 supported by a first bearing 1108, a shaft carrier 1112 supported by a second bearing 116 arranged in the faceplate 124 of the gear box 650. A quick release collar 1120 is arranged around the shaft carrier 1112 and is biased away from the first journal 1104 by a compression spring 1124 seated in a recess 1126 in the final drive gear 1100. The release collar 1120 abuts against the second bearing 1116 when the faceplate 124 is coupled to the gearcase 650.

The collar 1120 includes a circumferential lip 1128 and circumferential recess 1132 adjacent the circumferential lip 1128. A plurality of ball detents 1136 are set in a plurality of bores 1140 extending through the shaft carrier 1112. As noted above, when the faceplate 124 is coupled to the gearbox 650, the collar 1120 is biased by the spring 1124 to a first position, in which the collar 1120 abuts the second bearing 1116, such that the circumferential lip 1128 is axially aligned with the ball detents 1136, and the detents 1136 are thus forced by the circumferential lip 1128 into a passage 1144 in the shaft carrier 1112. When the faceplate 124, and thus the second bearing 1116, is removed from the gearbox 650, the collar 1120 is moveable from the first position to a second position, in which the circumferential recess 1132 is axially aligned with the ball detents 1136.

In operation of the embodiment shown in FIG. 75, the faceplate 124 is not yet coupled to the gearbox and the collar 1120 is thus in the second position. The splined portion 1092 of the power take-off shaft 38z is inserted into the passage 1144 of the shaft carrier 1112, such that splines 1096 of the splined portion 1092 mate with corresponding splines in the passage 1144, thus coupling the power take-off shaft 38z for rotation with the final drive gear 1100. In other embodiments, instead of a splined portion 1092 with splines 1096, the power take-off shaft 38z could include a D-shape, hex shape, or other key and keyway mating connection with the passage 1144 to enable co-rotation with the drive gear 1100. Once the power take-off shaft 38z has been inserted, the faceplate 124 is coupled to the gearbox 650, thus causing the collar 1120 to be moved from the second position to the first position, causing the detents 1136 to be pushed by the circumferential lip 1128 of the collar 1120 to a radially inward position in which they are arranged in the circumferential recess 1100 of the power take-off shaft 38z, thus axially locking the power take-off shaft 38z with respect to the final drive gear 1100. If the power take-off shaft 38z is attempted to be removed from the passage 1144 before moving the collar 1120 to the second position, the circumferential lip 1128 prevents the detents 1136 from moving radially outward, and thus the power take-off shaft 38z cannot be moved axially.

To remove the power take-off shaft 38z from the final drive gear 1100, the faceplate 124, and thus the second bearing 1116, is removed from the gearbox 650. As the faceplate 124 is removed, the collar 1120 is biased by the spring 1124 from the first position to the second position, in which the circumferential recess 1132 is axially aligned with the ball detents 1136. The operator then pulls the power take-off shaft 38z from the passage 1144. As the power take-off shaft 38z is pulled from the passage 1144, the detents 1136 are pushed by the power take-off shaft 38z radially outward into the circumferential recess 1132 of the collar 1120. Then the operator can insert a different power take-off shaft 38 that also has the splined portion 1092 with the circumferential recess 1100, but has a different driving end configured to drive a different piece of power equipment than the power take-off shaft 38z.

Figure 76:
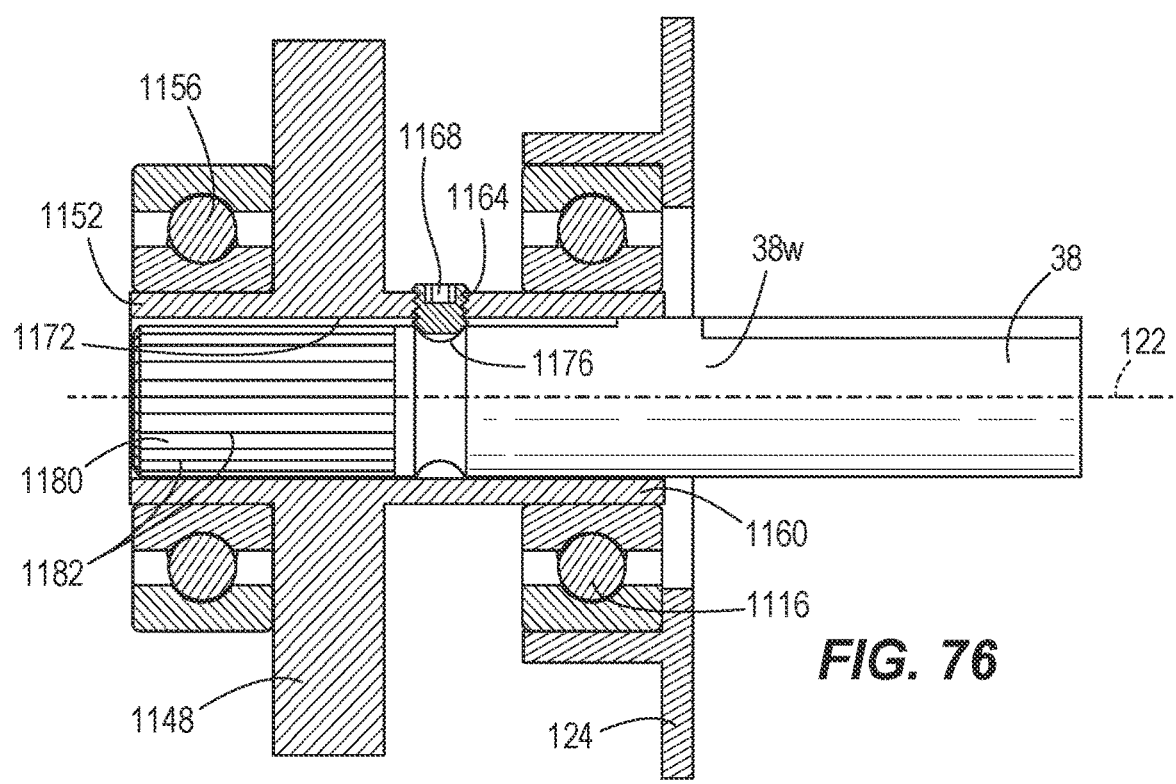
FIG. 76 is a cross-sectional view of a power take-off shaft coupled to another embodiment of a drive gear of the stand-alone motor unit of FIG. 42.

In another embodiment shown in FIG. 76, a final drive gear 1148 of the gear train 110 has a first journal 1152 supported by a first bearing 1156 and a shaft carrier 1160 supported by a second bearing 1116 arranged in the faceplate 124 of the gear box 650. The shaft carrier 1160 includes a threaded bore 1164 for a set screw 1168 that is radially moveable into or out of a passage 1172 in the shaft carrier 1160. To install a power take-off shaft 38w, an operator inserts the power take-off shat 38w into the passage 1172 until a circumferential groove 1176 in the shaft 38w is axially and circumferentially aligned with the bore 1164 of the shaft carrier 1160. The operator then screws the set screw 1168 radially inward to engage the circumferential recess 1176 of the power take-off shaft 38w, such that the power take-off shaft 38w is axially coupled to the final drive gear 1148. Also, because the power take-off shaft 38w has a splined portion 1180 having splines 1182 that mates with a corresponding splined portion in the passage 1172, the power take-off shaft 38w is coupled for rotation with the final drive gear 1148. In other embodiments, instead of a splined portion 1180 with splines 1182, the power take-off shaft 38z could include a D-shape, hex shape, or other key and keyway mating connection with the passage 1172 to enable co-rotation with the drive gear 148.

In order to remove the power take-off shaft 38w, the operator simply unscrews the set screw 1168 until it is out of the circumferential groove 1176 and passage 1172, and then removes the power take-off shaft 38w. Then the operator can insert a different power take-off shaft 38 that also has the splined portion 1180 with the circumferential groove 1176, but has a different driving end configured to drive a different piece of power equipment than the power take-off shaft 38w. In other embodiments, instead of a circumferential groove 1176, the power take-off shaft 38w could include a radial bore to receive the set screw 1168, thus enabling both axial retention and co-rotation with the drive gear 1148.

Thus, with interchangeable adapter plates 936, 936a, and interchange power take-off shafts 38, such as the power take-off shaft 38a, 38b, 38w, 38x, 38y, 38z and their corresponding mounting arrangements described above and shown in FIGS. 33, 34 and 72-76, the motor unit 10 can be customized to mate with and drive a variety of different pieces of power equipment. Indeed, the power take-off shaft 38 could have the dimensions of any of the power take-off shaft Extensions for horizontal crankshaft engines defined in the SAE J609, such as the dimensions of Extensions 1, 2, 3, 4, 4a, 4b, 6, 6a, 6b, or 8.

Figure 77:
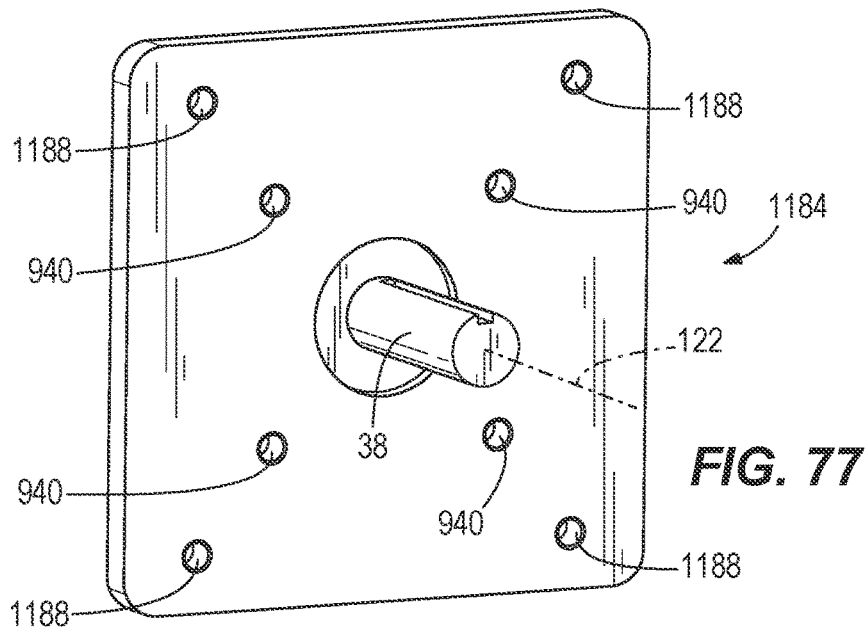
FIG. 77 is a perspective view of an adapter plate configured to be coupled to the stand-alone motor unit of FIG. 42.

In another embodiment shown in FIG. 77, like the embodiment of FIGS. 69-71, the faceplate 124 includes the first plurality of holes 932 defining a first hole pattern. However, unlike the embodiment of FIGS. 69-71, instead of a through bore 948, the embodiment of FIG. 77 includes an adapter plate 1184 having a rotatable power take-off shaft 38. Depending on the desired application, the power take-off shaft 38 could have the dimensions of any of the extensions defined in the SAE J609, such as extensions 1, 2, 3, 4, 4a, 4b, 6, 6a, 6b, or 8.

Like the adapter plate 936 of FIGS. 69-71, the adapter plate 1184 includes the second plurality of holes 940 defining the second hole pattern that is identical to the first hole pattern, such that when the second holes 940 are aligned with first holes 932 of the faceplate 124, the adapter plate 1104 is configured to be coupled to the faceplate 124.

The adapter plate 1104 also includes a third plurality of holes 1188 defining a third hole pattern that is different than the first and second hole patterns and identical to a fourth hole pattern on a certain piece of power equipment. Thus, after the adapter plate 1104 has been coupled to the faceplate 124, the adapter plate 1104 is configured to be coupled to the piece of power equipment when the third hole pattern is aligned with the fourth hole pattern. When the adapter plate 1104 is coupled to both the faceplate 124 and the piece of power equipment, the power take-off shaft 38 is configured to receive torque from the motor 36 via the geartrain 110 to thereby drive the piece of power equipment. In some embodiments, the third hole pattern could be one of the SAE J609 Flange Patterns B, C, D, E or F mounting hole patterns.

Unlike the adapter plate 936, the adapter plate 1184 does not require an operator to swap out power take-off shafts 38, because the power take-off shaft 38 is included as part of the adapter plate 1184. Thus, different adapter plates 1184 can be created with different combinations of third hole patterns and power take-off shafts 38 directed to certain types of equipment. Some examples are listed in the table below. However, the combinations and permutations of the adapter plate 1184 are not limited to these examples, and the adapter plate 1184 can have its third hole pattern and power take-off shaft 38 modified to mate with any application.

|  | Example 1 | Example 2 | Example 3 | Example 4 | Example 5 |
| --- | --- | --- | --- | --- | --- |
| Third hole pattern of adapter plate 1104 | SEA J609 Flange A | SEA J609 Flange A | SEA J609 Flange A | SEA J609 Flange B | SEA J609 Flange C |
| Type of power take-off shaft 38 for adapter plate 1104 | SAE J609 Extension 3 | SAE J609 Extension 5 | SAE J609 Extension 7 | SAE J609 Extension 3 | SAE J609 Extension 7 |

Figure 78:
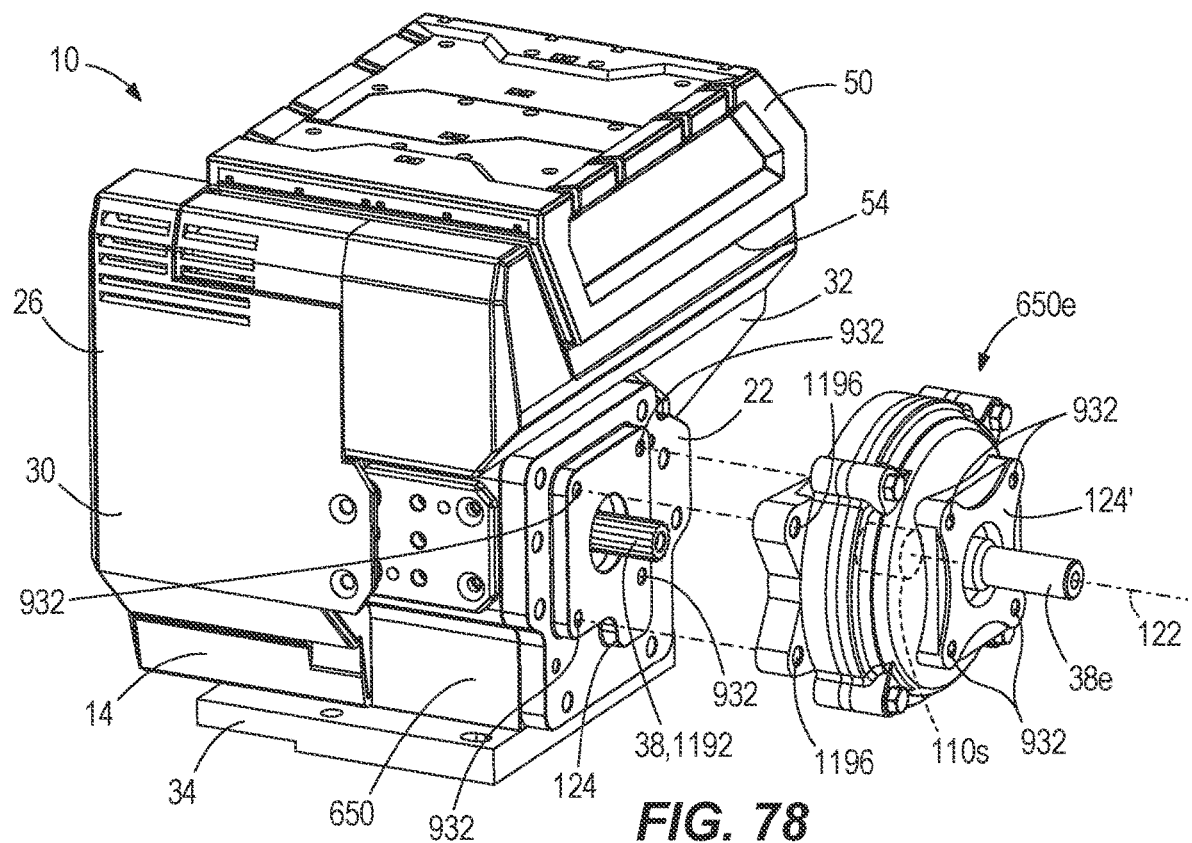
FIG. 78 is a perspective view a stand-alone motor unit according to another embodiment of the invention, with an external gearbox configured to be coupled thereto.

In an embodiment of the motor unit 10 shown in FIG. 78, the motor unit 10 includes the gearbox 650 with the faceplate 124, and the power take-off shaft 38 with a pinion 1192. An external gearbox 650e is coupled to the faceplate 124 via the first plurality of holes 932 defining a first hole pattern, which match a corresponding pattern of holes 1196 on the external gearbox 650e. The external gearbox 650e has a faceplate 124' that also has the first plurality of holes 932 defining the first hole pattern, such that the faceplate 124' can couple to the piece of power equipment by aligning the first hole pattern with an identical hole pattern on the piece of power equipment. The external gearbox 650e has a power take-off shaft 38e that receives torque via the motor 36, the gear train 110 of the gearbox 650, the power take-off shaft 38 with pinion 1192, and a second gear train 110s of external gearbox 650e. Thus, the external gear box 650e can be coupled to the faceplate 124 and used to achieve additional gear reduction that would not be achievable with the gearbox 650 alone.

Figure 79:
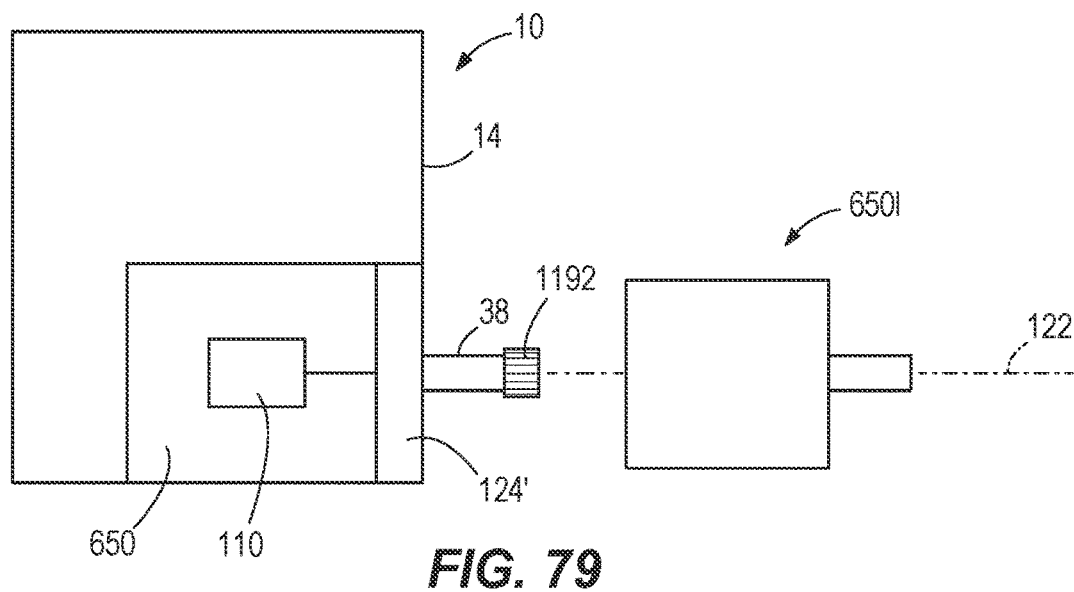
FIG. 79 is a schematic view of a stand-alone motor unit according to another embodiment of the invention, with a legacy gearbox configured to be coupled thereto.
Figure 80:
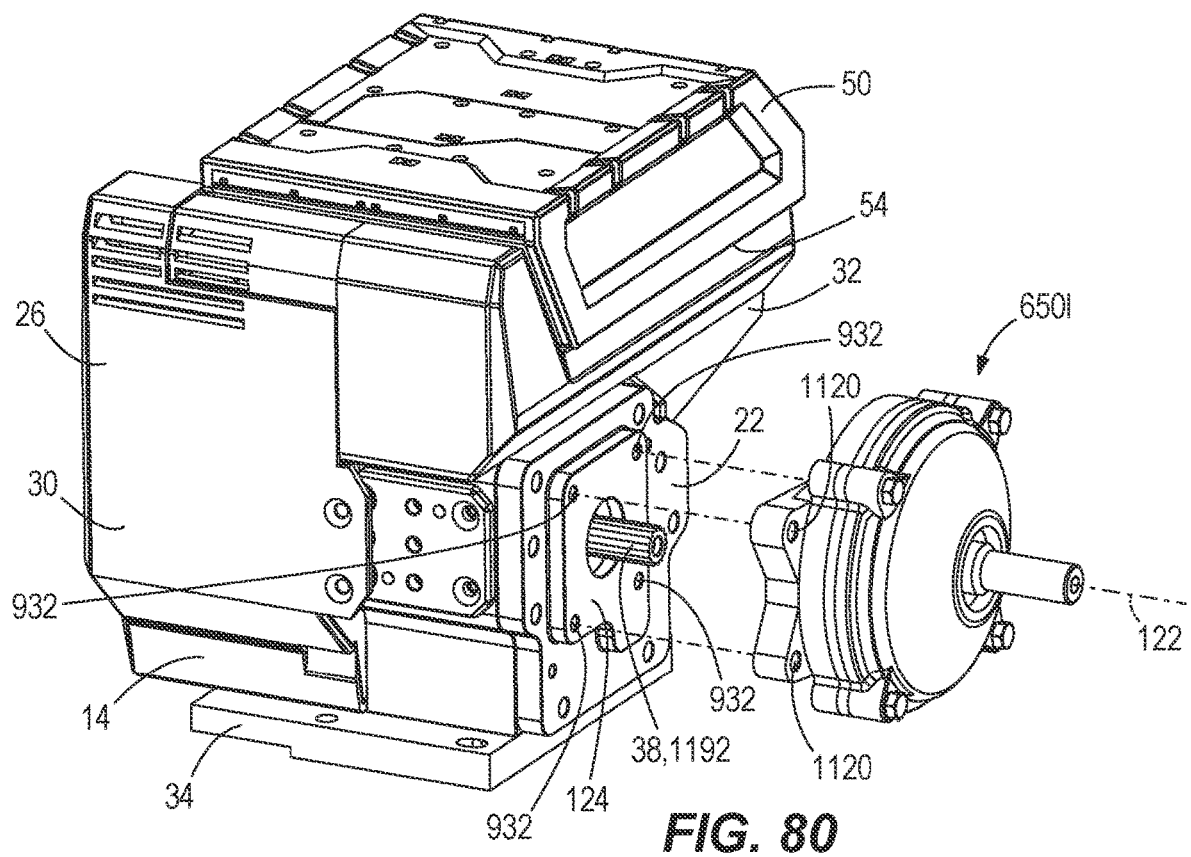
FIG. 80 is a perspective view of the stand-alone motor unit of FIG. 79, with the legacy gearbox configured to be coupled thereto.

In an embodiment of the motor unit 10 shown in FIGS. 79 and 80, the first plurality of holes 932 of the face plate 124 has a SAE J609 Flange A mounting hole pattern. Thus, the motor unit 10 is ready, without alteration, to be coupled to a legacy gearbox 6501 of a piece of power equipment that has a corresponding pattern of holes 1120 that align with the first plurality of holes 932. Thus, the legacy gearbox 6501 could be easily installed to the motor unit 10 and/or serviced.

Figure 81:
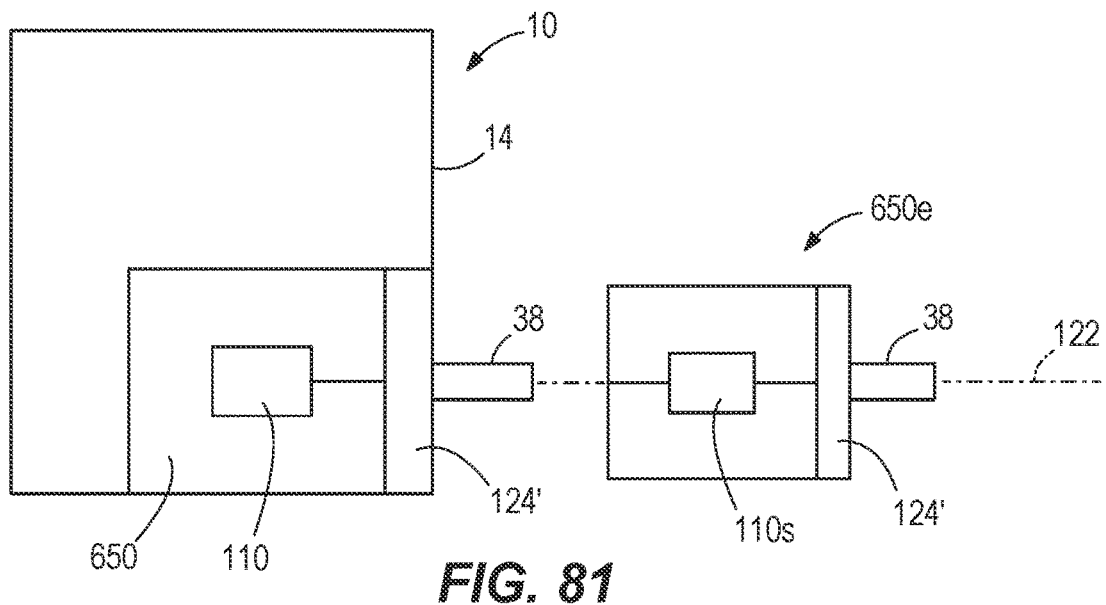
FIG. 81 is a schematic view of a stand-alone motor unit according to another embodiment of the invention, with an gearbox configured to be coupled thereto.
Figure 82:
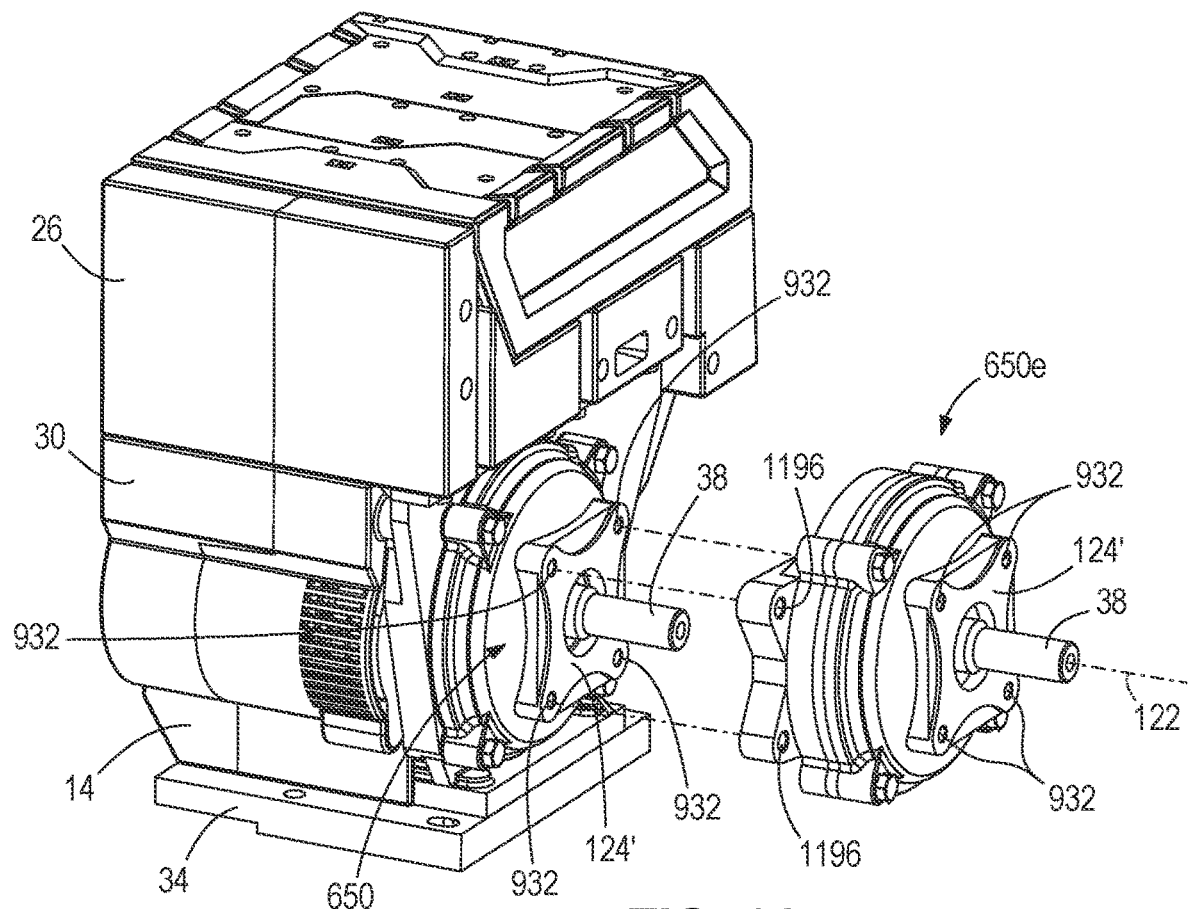
FIG. 82 is a perspective view of the stand-alone motor unit of FIG. 81, with the external gearbox configured to be coupled thereto.

In an embodiment shown in FIGS. 81 and 82, the motor unit 10 includes the gearbox with a faceplate 124', and the power take-off shaft 38 having a keyway shaft, such as the J609 Extension 3 shaft. The external gearbox 650e is coupled to the faceplate 124' via the first plurality of holes 932 defining a first hole pattern, which match the corresponding pattern of holes 1196 on the external gearbox 650e. The external gearbox 650e has the same faceplate 124' as the faceplate 124' of the gearbox 650, and thus the same first plurality of holes 932. Thus, the external gear box 650e can be coupled to the faceplate 124, and then to the piece of power equipment by aligning the first plurality of holes 932 of the gearbox 650 with the piece of power equipment. The external gear box 650e can thus be used to achieve additional gear reduction that would not be achievable with the gearbox 650 alone. The faceplate 124' also has the same power take-off shaft 38 as the power take-off shaft 38 of the motor unit 10, such that these parts would be easy to swap between the gearbox 650 and external gearbox 650e. Thus, an operator or OEM could use the external gearbox 650e to achieve a mechanical reduction, but still have the option to swap the power take-off shaft 38 to be the J609 Extension 5 shaft, and to replace faceplate 124' to utilize a new J609 flange mounting pattern. Also, the power take-off shaft 38 of the external gearbox 650e thus receives torque via the motor 36, the gear train 110 of the gearbox 650, the power take-off shaft 38 of the motor unit 10, and the second gear train 110s of external gearbox 650e.

Figure 83:
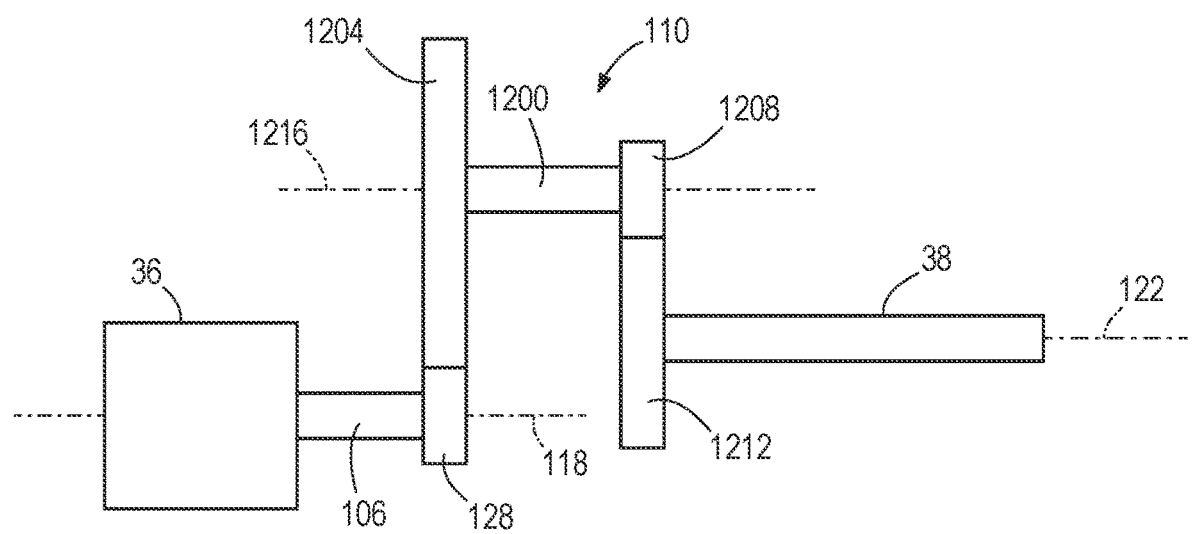
FIG. 83 is a schematic view of a motor, a multi stage spur gear train, and a power take-off shaft of the stand-alone motor unit of FIG. 1.

FIG. 83 schematically illustrates another embodiment of the gear train 110 for transferring torque from the motor 36 to the power take-off shaft 38. Specifically, the gear train 110 includes an intermediate shaft 1200 having a first spur gear 1204 engaged with the motor pinion 128 on the output shaft 106, and a second spur gear 1208 engaged with a third spur gear 1212 on the power take-off shaft 38. The intermediate shaft 1200 defines an intermediate axis 1216 that is parallel to both the rotational axis 118 of the output shaft 106 and the rotational axis 122 of the power take-off shaft 38. Thus, in the multi-stage spur gear embodiment of FIG. 83, torque is transferred from the output shaft 106 to the intermediate shaft 1200 and then to the power take-off shaft 38, via the first, second, and third spur gears 1204, 1208, 1212. The multi-stage spur gear arrangement of the gear train 110 permits the individual gears 1204, 1208, 1212 to have smaller diameters than, for example, the gears in the single stage spur gear train arrangement of FIG. 11. Also, in some embodiments, the first, second, and third spur gears 1204, 1208, 1212 are removable and replaceable with different gears to allow the operator to achieve different gear reduction ratios.

Figure 84:
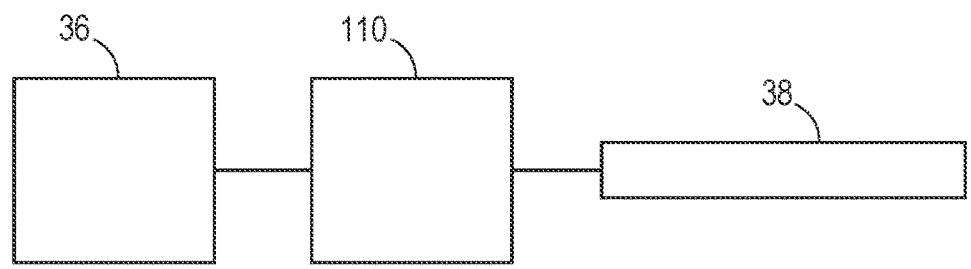
FIG. 84 is a schematic view of motor, a gear train, and a power take-off shaft of the stand-alone motor unit of FIG. 1.

FIG. 84 schematically illustrates several other embodiments of the gear train 110 for transferring torque from the motor 36 to the power take-off shaft 38.

In a first embodiment of FIG. 84, the gear train 110 includes a multi-speed transmission capable of shifting one or more gears to change the reduction ratio of the gear train 110, and thus the rotational output speed of the power take-off shaft 38, without changing the speed of the motor 36. The motor 36 typically operates at a high speed so when the output shaft 106 speed is reduced, the motor 36 may not be capable of producing adequate power across the entire operating range of a gas engine. For example, if the motor 36 was geared to provide the full-speed, wide open throttle (WOT) performance of a small gas engine, it would be difficult for the power take-off shaft 38 to also match the torque performance of that gas engine at lower speeds. An additional gearset (or sets) with a multi-speed transmission extends the total output speed and torque range to the power take-off shaft 38. Thus, the arrangement of FIG. 84 enable the motor unit 10 to achieve a wider range of speeds for the power take-off shaft 38.

In a second embodiment of FIG. 84, the gear train 110 includes a planetary gear set. A planetary gear set allows a compact design envelope to achieve a desired gear reduction ratio, as compared with a single stage spur gear (FIG. 11) or multi-stage spur gear (FIG. 83) arrangement. Smaller gears could be produced using less material and cheaper manufacturing methods (e.g.: powder metallurgy versus CNC machining).

In a third embodiment of FIG. 84, the gear train 110 includes a continuously variable transmission ("CVT"). In some embodiments, the CVT is an electronically controlled CVT ("eCVT"). Using a CVT or eCVT in the motor unit 10 provides OEMs and users flexibility when choosing different gear ratios, and/or a program could be used to determine the correct output speed for a particular application.

Various features of the invention are set forth in the following claims.

What is claimed is:

1. A stand-alone motor unit for use with a piece of power equipment, the motor unit comprising:
 a base having a first side and a second side adjacent the first side;
 an electric motor arranged in the base and including an output shaft;
 a power take-off shaft receiving torque from the motor and protruding from the second side of the base;
 a battery pack;
 a battery module removably coupled to the base, the battery module including a side wall and a battery receptacle for receiving the battery pack, such that when the battery module is coupled to the base and the battery pack is received in the battery receptacle, the battery pack provides power to the motor,
 wherein the battery module is configured to be coupled to the base in a first position, in which the side wall of the battery module is parallel with the second side of the base, and
 wherein the battery module is configured to be coupled to the base in a second position, in which the side wall is perpendicular to the second side of the base.

2. The stand-alone motor unit of claim 1, wherein the battery module includes a front wall and a rear wall that are both adjacent to the side wall, and wherein the side wall is longer than both of the front and rear walls, such that the battery module defines a battery module axis that is parallel with the side wall.

3. The stand-alone motor unit of claim 2, wherein the battery pack is removable from the battery receptacle by sliding the battery pack away from the rear wall in a direction parallel or coaxial with the battery module axis.

4. The stand-alone motor unit of claim 2, wherein the base includes a third side opposite the second side, a fourth side opposite the first side, and a fifth side extending between the second and third sides, and wherein in the first and second positions of the battery module, the battery module is coupled to the fourth side of the base.

5. The stand-alone motor unit of claim 4, wherein the fourth side of the base includes a plurality of vibration damping members to inhibit vibration transferred from the base to the battery module when the battery module is coupled to the base.

6. The stand-alone motor unit of claim 4, wherein in the first position of the battery module, the battery module axis is perpendicular to a rotational axis of the power take-off shaft, the rear and front walls of the battery module are perpendicular to the second side of the base, and the battery pack is removable in a direction away from the fifth side of the base.

7. The stand-alone motor unit of claim 6, wherein in the second position of the battery module, the battery module axis is parallel with a rotational axis of the power take-off shaft, the rear and front walls of the battery module are parallel with the second side of the base, and the battery module is removable in a direction away from the second side of the base.

8. The stand-alone motor unit of claim 1, wherein the battery module includes a plurality of coupling members configured to mate with a plurality of receiving elements on the base.

9. The stand-alone motor unit of claim 8, wherein there are more receiving elements than coupling members.

10. The stand-alone motor unit of claim 8, wherein there is at least one coupling member that is mated with a different receiving element when the battery module is coupled to the base in the first position than when the battery module coupled to the base in the second position.

11. The stand-alone motor unit of claim 8, wherein the coupling members are fasteners and the receiving elements are bores.

12. The stand-alone motor unit of claim 1, wherein the base includes control electronics to control the electric motor, and wherein one of the base or the battery module includes a wire harness to provide an electrical connection between the battery pack and the control electronics when the battery module is coupled to the base and the battery pack is received in the battery receptacle.

13. The stand-alone motor unit of claim 1, wherein the base includes a plurality of vibration damping members to inhibit vibration transferred from the base to the battery module when the battery module is coupled to the base.

14. The stand-alone motor unit of claim 13, wherein the plurality of vibration damping members includes at least one of a spring or an elastomeric spacer.

15. A stand-alone motor unit for use with a piece of power equipment, the motor unit comprising:
a base having a first side and a second side adjacent the first side;
an electric motor arranged in the base and including an output shaft;
a power take-off shaft receiving torque from the motor and protruding from the second side of the base, the power take-off shaft defining a rotational axis;
a battery pack;
a battery module removably coupled to the base, the battery module defining a battery module axis and including a battery receptacle for receiving the battery pack, such that when the battery module is coupled to the base and the battery pack is received in the battery receptacle, the battery pack provides power to the motor,
wherein the battery module is configured to be coupled to the base in a first position, in which the battery module axis is non-parallel with the rotational axis of the power take off shaft, and
wherein the battery module is configured to be coupled to the base in a second position, in which the battery module axis is parallel with the rotational axis of the power take off shaft.

16. The stand-alone motor unit of claim 15, wherein the battery pack is removable from the battery receptacle by sliding the battery pack in a direction parallel or coaxial with the battery module axis.

17. The stand-alone motor unit of claim 15, wherein the base includes a third side opposite the second side, a fourth side opposite the first side, and a fifth side extending between the second and third sides, and wherein in the first and second positions of the battery module, the battery module is coupled to the fourth side of the base.

18. The stand-alone motor unit of claim 17, wherein the fourth side of the base includes a plurality of vibration damping members to inhibit vibration transferred from the base to the battery module when the battery module is coupled to the base.

19. The stand-alone motor unit of claim 17, wherein in the first position of the battery module, the battery module axis is perpendicular to a rotational axis of the power take-off shaft, the rear and front walls of the battery module are perpendicular to the second side of the base, and the battery pack is removable in a direction away from the fifth side of the base.

20. The stand-alone motor unit of claim 19, wherein in the second position of the battery module, the rear and front walls of the battery module are parallel with the second side of the base, and the battery module is removable in a direction away from the second side of the base.

21. The stand-alone motor unit of claim 15, wherein the battery module includes a plurality of coupling members configured to mate with a plurality of receiving elements on the base.

22. The stand-alone motor unit of claim 21, wherein there are more receiving elements than coupling members.

23. The stand-alone motor unit of claim 21, wherein there is at least one coupling member that is mated with a different receiving element when the battery module is coupled to the base in the first position than when the battery module is coupled to the base in the second position.

24. The stand-alone motor unit of claim 21, wherein the coupling members are fasteners and the receiving elements are bores.

25. The stand-alone motor unit of claim 15, wherein the base includes control electronics to control the electric motor, and wherein one of the base or the battery module includes a wire harness to provide an electrical connection between the battery pack and the control electronics when the battery module is coupled to the base and the battery pack is received in the battery receptacle.

26. The stand-alone motor unit of claim 15, wherein the base includes a plurality of vibration damping members to inhibit vibration transferred from the base to the battery module when the battery module is coupled to the base.

27. The stand-alone motor unit of claim 26, wherein the plurality of vibration damping members includes at least one of a spring or an elastomeric spacer.

* * * * *